United States Patent
Koivisto et al.

(10) Patent No.: US 11,210,537 B2
(45) Date of Patent: Dec. 28, 2021

(54) OBJECT DETECTION AND DETECTION CONFIDENCE SUITABLE FOR AUTONOMOUS DRIVING

(71) Applicant: NVIDIA Corporation, San Jose, CA (US)

(72) Inventors: Tommi Koivisto, Uusimaa (FI); Pekka Janis, Uusimaa (FI); Tero Kuosmanen, Uusimaa (FI); Timo Roman, Uusimaa (FI); Sriya Sarathy, Santa Clara, CA (US); William Zhang, Los Altos, CA (US); Nizar Assaf, Campbell, CA (US); Colin Tracey, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 7 days.

(21) Appl. No.: 16/277,895

(22) Filed: Feb. 15, 2019

(65) Prior Publication Data

US 2019/0258878 A1   Aug. 22, 2019

Related U.S. Application Data

(60) Provisional application No. 62/631,781, filed on Feb. 18, 2018.

(51) Int. Cl.
*G06K 9/00* (2006.01)
*G06K 9/46* (2006.01)
(Continued)

(52) U.S. Cl.
CPC ......... *G06K 9/00825* (2013.01); *B60W 50/00* (2013.01); *G01S 7/417* (2013.01);
(Continued)

(58) Field of Classification Search
CPC ...... G05D 1/00; G05D 1/0246; G06K 9/4628; G06K 9/3241; G06K 9/6218;
(Continued)

(56) References Cited

U.S. PATENT DOCUMENTS 9,373,057 B1 * 6/2016 Erhan ................. G06K 9/6202
10,157,331 B1   12/2018 Qiaochu et al.
(Continued)

FOREIGN PATENT DOCUMENTS

EP   1 930 863 A2   6/2008
EP   1930868 A2    6/2008
(Continued)

OTHER PUBLICATIONS

International Search Report and Written Opinion dated Apr. 22, 2020 in International Application No. PCT/US2019/068766.
(Continued)

*Primary Examiner* — Syed Haider
(74) *Attorney, Agent, or Firm* — Shook, Hardy & Bacon L.L.P.

(57) ABSTRACT

In various examples, detected object data representative of locations of detected objects in a field of view may be determined. One or more clusters of the detected objects may be generated based at least in part on the locations and features of the cluster may be determined for use as inputs to a machine learning model(s). A confidence score, computed by the machine learning model(s) based at least in part on the inputs, may be received, where the confidence score may be representative of a probability that the cluster corresponds to an object depicted at least partially in the field of view. Further examples provide approaches for determining ground truth data for training object detectors, such as for determining coverage values for ground truth
(Continued)

objects using associated shapes, and for determining soft coverage values for ground truth objects.

21 Claims, 20 Drawing Sheets

(51) Int. Cl.
| | | |
|---|---|---|
| G06K 9/62 | (2006.01) | |
| B60W 50/00 | (2006.01) | |
| G06N 3/04 | (2006.01) | |
| G01S 7/41 | (2006.01) | |
| G05D 1/02 | (2020.01) | |
| G06N 3/08 | (2006.01) | |
| G06K 9/32 | (2006.01) | |
| G06K 9/48 | (2006.01) | |
| G01S 13/86 | (2006.01) | |
| G01S 7/48 | (2006.01) | |
| G01S 17/931 | (2020.01) | |
| G01S 13/931 | (2020.01) | |

(52) U.S. Cl.
CPC ....... *G05D 1/0246* (2013.01); *G06K 9/00805* (2013.01); *G06K 9/3241* (2013.01); *G06K 9/46* (2013.01); *G06K 9/4628* (2013.01); *G06K 9/48* (2013.01); *G06K 9/6218* (2013.01); *G06K 9/6256* (2013.01); *G06K 9/6262* (2013.01); *G06K 9/6273* (2013.01); *G06N 3/0445* (2013.01); *G06N 3/0454* (2013.01); *G06N 3/084* (2013.01); *G01S 7/412* (2013.01); *G01S 7/4802* (2013.01); *G01S 13/867* (2013.01); *G01S 17/931* (2020.01); *G01S 2013/9318* (2020.01); *G01S 2013/9323* (2020.01); *G06N 3/0472* (2013.01); *G06N 3/0481* (2013.01)

(58) Field of Classification Search
CPC ...... G06K 9/6256; G06K 9/46; G06K 9/6273; G06K 9/00825; G06K 9/48; G06K 9/00805; G06K 9/6262; G06N 3/0454; G06N 3/084; G06N 3/0445; G06N 3/0481; G06N 3/0472; G01S 7/417; G01S 2013/9323; G01S 13/867; G01S 7/412; G01S 2013/9318; G01S 7/4802; G01S 17/931; B60W 50/00
See application file for complete search history.

(56) References Cited

U.S. PATENT DOCUMENTS

| | | | |
|---|---|---|---|
| 2004/0016870 A1 | 1/2004 | Pawlicki et al. | |
| 2004/0252864 A1 | 12/2004 | Peng et al. | |
| 2005/0196034 A1 | 9/2005 | Hattori et al. | |
| 2007/0154068 A1 | 7/2007 | Stein et al. | |
| 2008/0266396 A1 | 10/2008 | Stein | |
| 2009/0088941 A1 | 4/2009 | Tsuchiya et al. | |
| 2009/0256840 A1 | 10/2009 | Varadhan et al. | |
| 2010/0322476 A1 | 12/2010 | Kanhere et al. | |
| 2013/0106837 A1 | 5/2013 | Mukherjee et al. | |
| 2014/0104424 A1 | 4/2014 | Zhang et al. | |
| 2015/0054824 A1* | 2/2015 | Jiang .................... | G06K 9/6284 345/420 |
| 2015/0278578 A1 | 10/2015 | Otsuka et al. | |
| 2015/0346716 A1 | 12/2015 | Scharfe et al. | |
| 2016/0247290 A1 | 8/2016 | Ming-Yu et al. | |
| 2016/0321074 A1 | 11/2016 | Hung et al. | |
| 2017/0061632 A1 | 3/2017 | Lindner et al. | |
| 2017/0116781 A1 | 4/2017 | Babahajiani et al. | |
| 2017/0124717 A1 | 5/2017 | Baruch et al. | |
| 2017/0220876 A1 | 8/2017 | Gao et al. | |
| 2017/0344808 A1* | 11/2017 | El-Khamy ......... | G06K 9/00228 |
| 2017/0371346 A1 | 12/2017 | Mei et al. | |
| 2018/0089833 A1 | 3/2018 | Lewis et al. | |
| 2018/0121273 A1 | 5/2018 | Fortino et al. | |
| 2018/0136332 A1 | 5/2018 | Barfield, Jr. et al. | |
| 2018/0158244 A1 | 6/2018 | Ybanez Zepeda et al. | |
| 2018/0188059 A1 | 7/2018 | Wheeler et al. | |
| 2018/0203959 A1 | 7/2018 | Refsnaes et al. | |
| 2018/0232663 A1 | 8/2018 | Ross et al. | |
| 2018/0267558 A1* | 9/2018 | Tiwari ................. | H04N 13/204 |
| 2018/0300590 A1 | 10/2018 | Briggs et al. | |
| 2018/0304468 A1 | 10/2018 | Holz | |
| 2018/0348374 A1 | 12/2018 | Laddha et al. | |
| 2018/0349746 A1* | 12/2018 | Vallespi-Gonzalez ...................... | G01S 17/89 |
| 2018/0370540 A1 | 12/2018 | Yousuf et al. | |
| 2018/0373980 A1 | 12/2018 | Huval | |
| 2019/0066328 A1 | 2/2019 | Kwant et al. | |
| 2019/0101399 A1 | 4/2019 | Kumar et al. | |
| 2019/0102646 A1 | 4/2019 | Redmon et al. | |
| 2019/0102668 A1 | 4/2019 | Yao et al. | |
| 2019/0129831 A1 | 5/2019 | Goldberg | |
| 2019/0147600 A1* | 5/2019 | Karasev .................. | G06T 17/20 382/107 |
| 2019/0147610 A1* | 5/2019 | Frossard ................... | G06T 7/70 382/103 |
| 2019/0171912 A1* | 6/2019 | Vallespi-Gonzalez ...................... | G06K 9/6282 |
| 2019/0179979 A1 | 6/2019 | Melick | |
| 2020/0143205 A1 | 5/2020 | Yao et al. | |
| 2020/0160559 A1 | 5/2020 | Urtasun et al. | |
| 2020/0175311 A1 | 6/2020 | Xu et al. | |
| 2020/0257306 A1 | 8/2020 | Nisenzon | |
| 2021/0025696 A1 | 1/2021 | Goto et al. | |
| 2021/0089794 A1 | 3/2021 | Chen et al. | |
| 2021/0286923 A1 | 9/2021 | Kristensen et al. | |

FOREIGN PATENT DOCUMENTS

| | | |
|---|---|---|
| KR | 20120009590 A | 2/2012 |
| WO | 2016183074 A1 | 11/2016 |
| WO | 2018/002910 A1 | 1/2018 |

OTHER PUBLICATIONS

International Search Report and Written Opinion dated Apr. 22, 2020 in International Application No. PCT/US2019/068764.

Tateno, K., Tombari, F., Laina, I., & Navab, N. (2017). Cnn-slam: Real-time dense monocular slam with learned depth prediction. In Proceedings of the IEEE Conference on Computer Vision and Pattern Recognition (pp. 6243-6252).

He, L., Wang, G., & Hu, Z. (2018). Learning depth from single images with deep neural network embedding focal length. IEEE Transactions on Image Processing, 27(9), 4676-4689.

Bidlack, C., Hampapur, A., Katkere, A., Feng, L., Kagalwala, F., Kraljevic, T., . . . & Weymouth, T. (May 1994). Visual robot navigation using flat earth obstacle projection. In Proceedings of the 1994 IEEE International Conference on Robotics and Automation (pp. 3374-3381). IEEE.

Kim, W. S., Ortega, A., Lai, P., Tian, D., & Gomila, C. (Jan. 2010). Depth map coding with distortion estimation of rendered view. In Visual Information Processing and Communication (vol. 7543, p. 75430B). International Society for Optics and Photonics.

Asvadi, A., Garrote, L., Premebida, C., Peixoto, P., & Nunes, U. J. (Oct. 2017). Depthcn: vehicle detection using 3d-lidar and convnet. In 2017 IEEE 20th International Conference on Intelligent Transportation Systems (ITSC) (pp. 1-6). IEEE.

Stein, G. P., Mano, O., & Shashua, A. (Jun. 2003). Vision-based ACC with a single camera: bounds on range and range rate accuracy. In IEEE IV2003 Intelligent Vehicles Symposium. Proceedings (Cat. No. 03TH8683) (pp. 120-125) IEEE.

Suorsa, R. E., & Sridhar, B. (1994). A parallel implementation of a multisensor feature-based range-estimation method IEEE transactions on robotics and automation, 10(6), 755-768.

(56) References Cited

OTHER PUBLICATIONS

Christian Szegedy, Wei Liu, Yangqing Jia, Pierre Sermanet, Scott Reed, Dragomir Anguelov, Dumitru Erhan, Vincent Vanhoucke, Andrew Rabinovich, "Going Deeper with Convolutions", https://arxiv.org/abs/1409.4842.
Jonathan Long, Evan Shelhamer, and Trevor Darrell, "Fully convolutional networks for semantic segmentation", CVPR, Nov. 2015.
Jose M. Alvarez, Theo Gevers, Yann LeCun, and Antonio M. Lopez, "Road scene segmentation from a single image", In Proceedings of the 12th European Conference on Computer Vision—vol. Part VII, ECCV'12, pp. 376-389, Berlin, Heidelberg, 2012.
Clemens-Alexander Brust, Sven Sickert, Marcel Simon, Erik Rodner, and Joachim Denzler "Convolutional patch networks with spatial prior for road detection and urban scene understanding", In International Conference on Computer Vision Theory and Applications (VISAPP), 2015.
Rahul Mohan, "Deep deconvolutional networks for scene parsing", CoRR, abs/1411.4101, 2014.
Gabriel L. Oliveira, Wolfram Burgard, Thomas Brox. Efficient Deep Models for Monocular Road Segmentation. IEEE/RSJ International Conference on Intelligent Robots and Systems (IROS 2016).
Marvin Teichmann, Michael Weber, Marius Zoellner, Roberto Cipolla, and Raquel Urtasun. Multinet: Real-time joint semantic reasoning for autonomous driving. arXiv preprint arXiv:1612.07695, 2016.
Q. Wang, J. Gao and Y. Yuan, Embedding Structured Contour and Location Prior in Siamesed Fully Convolutional Networks for Road Detection, in IEEE Transactions on Intelligent Transportation Systems, vol. 19, No. 1, pp. 230-241, Jan. 2018.
C. C. T. Mendes V. Frémont D. F. Wolf. Exploiting fully convolutional neural networks for fast road detection, Proc. IEEE Int. Conf. Robot. Auto. (ICRA), pp. 3174-3179 May 2016.
"Neural Networks", https://www.tensorflow.org/api_guides/python/nn#conv2d_transpose.
Song Han, Jeff Pool, John Tran, William J. Dally, "Learning both Weights and Connections for Efficient Neural Networks", https://arxiv.org/abs/1506.02626.
Pavlo Molchanov, Stephen Tyree, Tero Karras, Timo Aila, Jan Kautz, "Pruning Convolutional Neural Networks for Resource Efficient Inference", https://arxiv.org/abs/1611.06440.
A. Elfes. Sonar-based real-world mapping and navigation. Journal of Robotics and Automation, 1987.
S. Thrun, W. Burgard, and D. Fox. Probabilistic Robotics: Intelligent Robotics and Autonomous Agents. The MIT Press, 2005.
H. Badino, U. Franke, and R. Mester. Free space computation using stochastic occupancy grids and dynamic programming. In ICCV Workshop on Dynamical Vision, 2007.
J. Franke and I. Kutzbach. Fast stereo based object detection for stop and go traffic. In IV, 1996.
"H. Badino, U. Franke, and D. Pfeiffer. The stixel world—a compact medium level representation of the 3d-world. In DAGM, 2009."
H. Hirschmuller. Stereo processing by semiglobal matching and mutual information. PAMI, 2008.
R. Benenson, R. Timofte, and L. Gool. Stixels estimation without depth map computation. In ICCV, 2011.
J. Yao, S. Ramalingam, Y. Taguchi, Y. Miki, and R. Urtasun, "Estimating drivable collision-free space from monocular video," in Applications of Computer Vision, 2015, pp. 420-427.
D. Levi N. Garnett E. Fetaya "Stixelnet: A deep convolutional network for obstacle detection and road segmentation", 26th British Machine Vision Conference (BMVC) 2015.
K. He, X. Zhang, S. Ren, J. Sun, "Deep residual learning for image recognition", Proc. IEEE Conf. Comput. Vis. Pattern Recognit (CVPR), 2016.
"Systems and Methods for Safe and Reliable Autonomous Vehicles", U.S. Appl. No. 62/584,549, filed Nov. 10, 2017.
""System and Method for Controlling Autonomous Vehicles", U.S. Appl. No. 62/614,466, filed Jan. 7, 2018."
"System and Method for Safe Operation of Autonomous Vehicles", U.S. Appl. No. 62/625,351, filed Feb. 2, 2018.
"Conservative Control for Zone Driving of Autonomous Vehicles", U.S. Appl. No. 62/628,831, filed Feb. 9, 2018.
"Systems and Methods for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for autonomous vehicles", U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Methods for Accurate Real-time Lane and Road Boundary Detection for Autonomous Driving", U.S. Appl. No. 62/636,142, filed Feb. 27, 2018.
Neven et al. Towards End-to-End Lane Detection: an Instance Segmentaion Approach. (2018).
Davy Neven et al: "Towards End-to-End Lane Detection: an Instance Segmentation Approach", Feb. 15, 2018 (Feb. 15, 2018), pp. 1-7, XP055590532, Retrieved from the Internet: URL:https://arxiv.org/pdf/1802.05591.pdf [retrieved on May 21, 2019].
""""What is polyline?"", Webopedia Definition, Accessed Feb. 21, 2019 at: https://www.webopedia.com/TERM/P/polyline.html".
""""Polynomial curve fitting"", 12 pages. Accessed Feb. 21, 2019 at: https://www.mathworks.com/help/matlab/ref/polyfit.html".
"Eural spiral", wikipedia.org, 10 pages. Accessed Feb. 21, 2019 at: https://en.wikipedia.org/wiki/Euler_spiral.
Joffe, Sergey et al., "Batch Normalization: Accelerating Deep Network Training by Reducing Internal Covariate Shift", Mar. 2, 2015, 11 pages. Available at: https://arxiv.org/abs/1502.03167.
"Deshpande, Adit, ""A Beginner's Guide to Understanding Convolutional Neural Networks"", Jul. 20, 2016, 13 pages.Available at: https://adeshpande3.github.io/A-Beginner's-Guide-To-Understanding-Convolutional-Neural-Networks/".
""""What are deconvolutional layers?"", Data Science Stack Exchange, 26 pages. Accessed Feb. 21, 2019 at: https://datascience.stackexchange.com/questions/6107/what-are-deconvolutional-layers".
Chilamkurthy, Sasank, "A 2017 Guide to Semantic Segmentation with Deep Learning", Qure.ai Blog, Jul. 5, 2017, 16 pages. Available at: http://blog.qure.ai/notes/semantic-segmentation-deep-learning-review#sec-1.
Kingma, Diederick P. et al., "Adam: A Method for Stochastic Optimization", published as a conference paper at ICLR 2015, 15 pages. Available at: http://blog.qure.ai/notes/semantic-segmentation-deep-learning-review#sec-1.
"F1 score", wikipedia.org, 3 pages. Accessed Feb. 21, 2019 at: https://en.wikipedia.org/wiki/F1_score.
"Virgo, Michael, ""Lane Detection with Deep Learning (Part 1)"""", May 9, 2017, 10 pages.Available at: https://towardsdatascience.com/lane-detection-with-deep-learning-part-1-9e096f3320b7".
"Huval, Brody et al., ""An Empirical Evaluation of Deep Learning on Highway Driving"", Apr. 17, 2015, 7 pages. Available at: https://arxiv.org/pdf/1504.01716.pdf".
"Dipietro, Rob, ""A Friendly Introduction to Cross-Entropy Loss,"""" Version 0.1—May 2, 2016, 10 pages.Available at: https://rdipietro.github.io/friendly-intro-to-cross-entropy-loss/".
International Search Report and Written Opinion dated Aug. 26, 2019 in International patent Application No. PCT/US/2019/022592, 18 pges.
"International Search Report and Written Opinion dated Jul. 24, 2019 in International Patent Application No. PCT/US2019/019656, 15 pages."
Non-Final Office action dated Jun. 24, 2020 in U.S. Appl. No. 16/286,329.
International Search Report and Written Opinion dated Jul. 25, 2019 in International Patent Application No. PCT/US2019/018348, 22 pages.
Tao, A., Barker, J., & Sarathy, S. (2016). Detectnet: Deep neural network for object detection in digits. Parallel Forall, 4.

(56) References Cited

OTHER PUBLICATIONS

Rothe, R., Guillaumin, M., & Van Gool, L. (Nov. 2014). Non-maximum suppression for object detection by passing messages between windows. In Asian conference on computer vision (pp. 290-306). Springer, Cham.
Weber, M., Wolf, P., & Zöllner, J. M. (Jun. 2016). DeepTLR: A single deep convolutional network for detection and classification of traffic lights. In 2016 IEEE Intelligent Vehicles Symposium (IV) (pp. 342-348). IEEE.
Bach, M., Reuter, S., & Dietmayer, K. (Jun. 2017). Multi-camera traffic light recognition using a classifying labeled multi-bernoulli filter. In 2017 IEEE Intelligent Vehicles Symposium (IV) (pp. 1045-1051). IEEE.
Garnett, Noa et al: "Real-Time Category-Based and General Obstacle Detection for Autonomous Driving", 2017 IEEE International Conference on Computer Vision Workshops (ICCVW), IEEE, Oct. 22, 2017 (Oct. 22, 2017), pp. 198-205, XP033303458.
International Search Report and Written Opinion dated Aug. 26, 2019 in International Patent Application No. PCT/US2019/022592, 18 pages.
Jayaraman, A. et al., "Creating 3D Virtual Driving Environments for Simulation-Aided Development of Autonomous Driving and Active Safety", SAE Technical Paper Series, vol. 1, pp. 1-3 (Mar. 28, 2017) (English Abstract Submitted).
Liu, H. et al., "Neural Person Search Machines", IEEE International Conference on Computer Vision (ICCV), IEEE, pp. 493-501 (2017).
International Preliminary Report on Patentability received for PCT Application No. PCT/US2019/018348, dated Aug. 27, 2020, 16 pages.
International Preliminary Report on Patentability received for PCT Application No. PCT/US2019/019656, dated Sep. 3, 2020, 11 pages.
International Preliminary Report on Patentability received for PCT Application No. PCT/US2019/022592, dated Sep. 24, 2020, 11 pages.
International Preliminary Report on Patentability received for PCT Application No. PCT/US2019/024400, dated Oct. 8, 2020, 10 pages.
Notice of Allowance dated Jan. 19, 2021 in U.S. Appl. No. 16/286,329, 8 pages.
Preinterview First Office Action dated Jan. 26, 2021 in U.S. Appl. No. 16/355,328, 5 pages.
First Action Interview Office Action dated Mar. 1, 2021 in U.S. Appl. No. 16/355,328, 4 pages.
Non-Final Office Action dated May 13, 2021 in U.S. Appl. No. 16/728,595, 18 pages.
Notice of Allowance dated Jul. 2, 2021 in U.S. Appl. No. 16/813,306, 13 pages.
International Preliminary Report on Patentability received for PCT Application No. PCT/US2019/068766, dated Jul. 8, 2021, 10 pages.
International Preliminary Report on Patentability received for PCT Application No. PCT/US2019/068764, dated Jul. 8, 2021, 12 pages.
Notice of Allowance dated Jul. 16, 2021 in U.S. Appl. No. 16/728,598, 9 pages.
Notice of Allowance dated Oct. 7, 2021 in U.S. Appl. No. 16/813,306, 9 pages.
Notice of Allowance dated Aug. 31, 2021 in U.S. Appl. No. 16/728,595, 8 pages.
Non Final Office Action dated Oct. 7, 2021 in U.S. Appl. No. 16/366,875, 22 pages.

\* cited by examiner

OBJECT DETECTION AND DETECTION CONFIDENCE SUITABLE FOR AUTONOMOUS DRIVING

CROSS-REFERENCE TO RELATED APPLICATIONS

This application claims the benefit of U.S. Provisional Application No. 62/631,781, filed on Feb. 18, 2018, which is hereby incorporated by reference in its entirety.

BACKGROUND

To operate safely, autonomous vehicles should account for objects—such as vehicles, people, trees, animals, buildings, signs, and poles—when planning paths through the environment. To do so, an object detector may be used to accurately detect objects depicted in an image(s) in real-time (e.g., images captured using one or more sensors mounted on the autonomous vehicle). However, conventional approaches may not have a desired accuracy and as a result, may miss, or generate false or delayed object detections that may lead to improper paths and even collisions.

A conventional system for object detection may use a convolutional neural network (CNN) that provides coverage values and bounding boxes for a grid of spatial element regions of the image. Each coverage value may represent a likelihood that an object is depicted at least partially in a corresponding spatial element region, and the bounding box may be provided around the object for the spatial element region. As objects may occupy multiple spatial element regions of the grid, different coverage values and bounding boxes may correspond to detections of the same object. These detections may be aggregated to particular objects by clustering the detections, and a confidence value may be assigned to each aggregated detection. In some approaches, the maximum coverage value of a cluster may be used as the confidence value. In practice, this approach may lead to false detections or positives, as the maximum coverage value may only correspond to a small portion of the image. Another approach may use a sum of the coverage values of a cluster as the confidence value. However, because the sum is unbounded, the sum may not be directly interpreted as a confidence or probability measure, which may also lead to false or missed detections (e.g., a variable number of detections may be part of a cluster so the sum does not provide a relative measure cross-cluster).

A conventional approach for training the CNN to detect objects depicted in an image may use training images in addition to sets of bounding box coordinates that may each specify a region in a training image in which the CNN should detect an object. To train the CNN to output coverage values for particular spatial element regions, each set of bounding box coordinates may be assigned to a single spatial element region of the grid of spatial element regions of the training image. In particular, the spatial element region assigned to the set of bounding box coordinates is the spatial element region that includes the midpoint of the bounding box. A ground truth tensor used to train the CNN may be populated to assign each spatial element region with a hard coverage value (e.g., a 1 or a 0) depending on whether a set of bounding box coordinates is assigned to the spatial element region.

This approach may train the CNN to attempt to definitively determine whether an object is depicted in a spatial element region, and to assign the object only to that spatial element region. However, in many cases, it may be difficult to assign an object to only one spatial element region, or definitively determine whether an object is depicted in that spatial element region. This may occur, for example, when objects are close to each other in an image (e.g., one occluding another) and/or where an object(s) occupies multiple spatial element regions. As a result of this training approach, the CNN, as described above, may generate false detections from an object detector or false positives for aggregated detections, thereby decreasing the efficacy of the CNN.

SUMMARY

Embodiments of the present disclosure relate to object detection and detection confidence suitable for autonomous driving. In contrast to conventional approaches that determine a confidence value for an aggregated detection that may not be directly interpreted as a confidence or probability measure or may only correspond to a small portion of an image, disclosed approaches allow for the determination of a confidence score (e.g., a scalar value) that may be directly interpreted as a confidence measure and may accurately indicate a probability that an aggregated detection corresponds to an actual object represented in image data. Thus, false or missed detections may be less likely to occur when employing the confidence score.

In some examples, a Machine Learning Model (MLM), such as a multi-layer perceptron network, may be trained to determine the confidence score using features generated from detected objects (e.g., in a field(s) of view of a vehicle). The MLM may learn to account for the complex relationships between detected objects for different spatial element regions in generating the confidence score. Further, the confidence score may be a bounded value that provides direct interpretability while accounting for any number of raw detected objects that are part of an aggregated detection. Thus, use of the confidence score is less likely to lead to false detections compared to conventional approaches, such as those described above.

In further contrast to conventional approaches for training a CNN for object detection that only assign a single spatial element region to a set of bounding box coordinates, disclosed approaches may improve the accuracy of final detected objects by allowing a set of bounding box coordinates to be assigned to multiple spatial element regions (e.g., using an elliptical ground truth that corresponds to multiple spatial element regions) for training, and/or for soft coverage values (e.g., in a range from 1 to 0) to be assigned to spatial element regions in ground truth data used to train the CNN.

In some examples, a size of a shape that is at least partially within an object region (e.g., ground truth bounding box region) is computed using a dimension of the object region. The shape may then be used to determine coverage values for spatial element regions of the training image used to train the CNN (e.g., by drawing at least some of the shape in a ground truth tensor). Provided approaches may further allow for determining a coverage value for a spatial element region when the spatial element region corresponds to multiple object regions (indicating different objects). In further respects, a dead-zone area may be used to spatially separate coverage values that correspond to different object regions (indicating different objects). This may train the CNN to better distinguish between adjacent objects. For example, the CNN trained in this manner may provide lower coverage values for areas between adjacent objects.

BRIEF DESCRIPTION OF THE DRAWINGS

The present systems and methods for object detection and detection confidence suitable for autonomous driving is described in detail below with reference to the attached drawing figures, wherein.

DETAILED DESCRIPTION

Figure 1A:
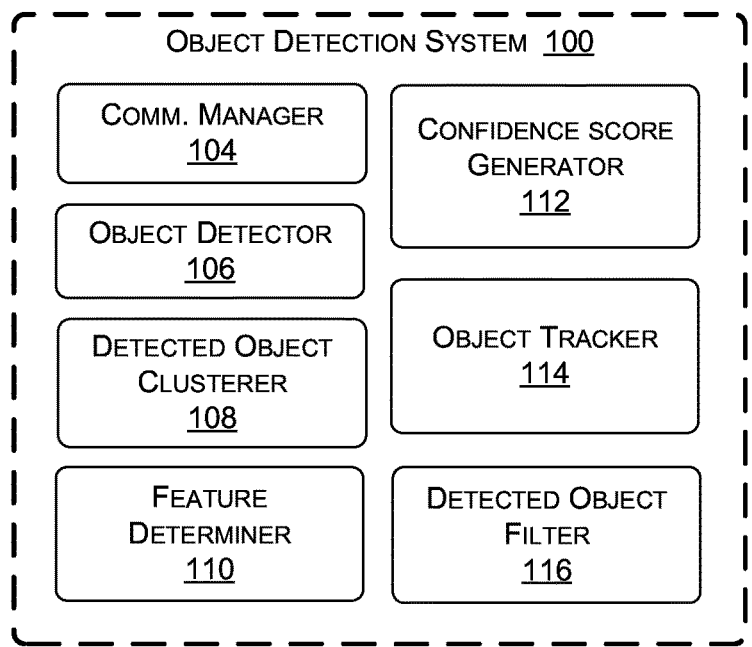
FIG. 1A is an illustration including an example object detection system, in accordance with some embodiments of the present disclosure.

Systems and methods are disclosed herein related to object detection and detection confidence. Disclosed approaches may be suitable for autonomous driving, but may also be used for other applications, such as robotics, video analysis, weather forecasting, medical imaging, etc. The present disclosure may be described with respect to an example autonomous vehicle 1500 (alternatively referred to herein as "vehicle 1500" or "autonomous vehicle 1500"), an example of which is described in more detail herein with respect to FIGS. 15A-15D. Although the present disclosure primarily provides examples using autonomous vehicles, other types of devices may be used to implement that various approaches described herein, such as robots, camera systems, weather forecasting devices, medical imaging devices, etc. In addition, these approaches may be used for controlling autonomous vehicles, or for other purposes, such as, without limitation, video surveillance, video or image editing, video or image search or retrieval, object tracking, weather forecasting (e.g., using RADAR data), and/or medical imaging (e.g., using ultrasound or magnetic resonance imaging (MRI) data).

Machine Learning Model(s) for Confidence Determination

To detect objects represented in an image, a conventional system may use a convolutional neural network (CNN) that provides coverage values and bounding boxes for a grid of spatial element regions of the image. Each coverage value may represent a likelihood that an object is depicted at least partially in a corresponding spatial element region, and the bounding boxes may be provided around the object for the spatial element region. As objects may occupy multiple spatial element regions of the grid, different coverage values and bounding boxes may correspond to detections of the same object. The detections may be aggregated to particular objects by clustering the detections, and a confidence value may be assigned to each aggregated detection. In some approaches, the maximum coverage value of a cluster may be used as the confidence value. When implemented, this approach may lead to false detections or false positives, as the maximum coverage value may only correspond to a small portion of the image. Another approach may use a sum of the coverage values of a cluster as the confidence value. However, because the sum is unbounded, the sum may not be directly interpreted as a confidence or probability measure, which may also lead to false or missed detections.

As a result of these false or missed detections of conventional approaches, paths planned by autonomous vehicles implementing these conventional systems may be inaccurate, thereby leading to control of the autonomous vehicle in a manner that may be less safe than desirable. In addition, because of false or missed detections, additional processing may be required to correct these mistakes (e.g., by performing additional object detections), or the autonomous vehicle may have to correct its path once the mistake is realized, thereby leading to potentially less efficient and effective operation of the autonomous vehicle.

In contrast to conventional approaches, disclosed approaches allow for the determination of a confidence score (e.g., a scalar value) that may be directly interpreted as a confidence measure and may accurately indicate a probability that an aggregated detection corresponds to an actual object represented in image data. Thus, false or missed detections are less likely to occur when employing the confidence score.

In some examples, a Machine Learning Model (MLM), such as a multi-layer perceptron network, may be trained to determine the confidence score using features generated from detected objects (e.g., in a field(s) of view of a vehicle). Non-limiting examples include features based at least in part on a coverage value(s) associated with a cluster, the number of detections of the cluster, and a detected object region(s) associated with the cluster. The MLM may learn to account for the complex relationships between detected objects for different spatial element regions in generating the confidence score. Further, the confidence score may be a bounded value that provides direct interpretability while accounting for any number of raw detected objects that are part of an aggregated detection (e.g., as opposed to conventional approaches where a variable number of detections may be part of a cluster so the sum does not provide a relative measure cross-cluster). Thus, use of the confidence score may be less likely to lead to false detections compared to conventional confidence values.

In further contrast to conventional approaches, such as those that directly use coverage values and bounding boxes, features used by the MLM of the present disclosure to determine a confidence score may be based on a variety of factors. Example factors include parameters such as a number of frames in which the object has been detected, covariance of the tracked object state estimate, statistics on feature points tracked within an object bounding box, optical flow estimates within an object bounding box, correlation with a model of object appearance, estimates of object kinematics, and/or an object trajectory. Other factors include features computed directly from the image data (e.g., from points or pixels) or from the features of one or more primary CNN layers of a CNN used to provide the detected objects, such as the last layer before a layer that predicts detected object locations (e.g., a gridbox output). This may include features within the object bounding box, such as a histogram of oriented gradients. Other examples of factors include an Internal Measurement Unit (IMU) output(s) that corresponds to an orientation of the vehicle, and distance or Three-Dimensional (3D) location estimates of the object, which may be determined by the CNN and/or other sensors, such as LIDAR or RADAR. Further examples of factors include an entire coverage feature map as an activity map, maximum intersection over union between bounding boxes of a detected object cluster, and bottom and width visibility of the detected object (e.g., based on indicators output by the CNN indicating whether the bottom of the detected object is completely visible, and/or whether the whole width of the object is visible).

Training Machine Learning Models for Accurate Object Detection

A conventional approach for training the CNN to detect objects depicted in an image uses training images and sets of bounding box coordinates, each specifying a region in a training image in which the CNN should detect an object. To train the CNN to output coverage values for particular spatial element regions, each set of bounding box coordinates may be assigned to a single spatial element region of the grid of spatial element regions of the training image. In particular, the spatial element region assigned to the set of bounding box coordinates may be the spatial element region that includes the midpoint of the bounding box. A ground truth tensor used to train the CNN may be populated to assign each spatial element region with a hard coverage value (e.g., a 1 or a 0) depending on whether a set of bounding box coordinates is assigned to the spatial element region.

This approach may train the CNN to attempt to definitively determine whether an object is depicted in a spatial element region, and to assign the object only to that spatial element region. However, in many cases, it may be difficult to assign an object to only one spatial element region and/or to definitively determine whether an object is depicted in that spatial element region. This may occur, for example, when objects are close to each other in an image (e.g., one occluding another) and/or where an object(s) occupies multiple spatial element regions. As a result of this difficulty, inaccuracy in object detections may arise, thereby leading to a CNN that is not as useful or accurate as desired in detecting objects in sensor data.

In contrast to these conventional approaches for training a machine learning model(s), disclosed approaches may improve the accuracy of final detected objects by allowing a set of bounding box coordinates to be assigned to multiple spatial element regions (e.g., using an elliptical ground truth that corresponds to multiple spatial element regions) for training, and/or for soft coverage values (e.g., in a range from 1 to 0) to be assigned to spatial element regions in ground truth data used to train the CNN.

In some examples, a size of a shape at least partially within an object region (e.g., ground truth bounding box region) is computed using a dimension of the object region. The shape may then be used to determine coverage values for spatial element regions of the training image used to train the CNN (e.g., by drawing at least some of the shape in a ground truth tensor). For example, a coverage value may be determined for a spatial element region based at least in part on the spatial element region corresponding to a portion of the shape. Elements of ground truth data may be populated using the coverage value(s), and at least one object region value that is representative of the object region, and the ground truth data may be used to train the CNN.

In some cases, the coverage value(s) may be a soft coverage value that corresponds to an anti-aliased portion(s) of the shape. The anti-aliased portion(s) of the shape may be computed, for example, by rendering at least some of the shape at a higher spatial resolution than a ground truth tensor represented by the ground truth data, and downscaling the rendered shape to a spatial resolution of the ground truth tensor. This may result in lower coverage values near the boundary of the shape, and train the CNN to have more certainty in detections for spatial element regions toward the center of the shape (which may be more reliable indicators of presence of an object).

Provided approaches may further allow for determining a coverage value for a spatial element region when the spatial element region corresponds to multiple object regions (indicating different objects). In some examples, the system may determine which object region is the active object region and may use a coverage value for the active object region as the coverage value for the spatial element region (or give the active object region greater weight than the other object regions). The active object region may, in some cases, be set to the object region for the object that has the highest coverage value of the objects. Additionally or alternatively, the active object region may be set to the closest or front most of the objects in the image.

In further respects, a dead-zone area may be used to spatially separate coverage values that correspond to different object regions (indicating different objects). For example, shapes used to generate the coverage values for the different object regions may partially overlap. Using the dead-zone area, coverage values that correspond to an overlapping portion of the shapes may be set to spatially separate the coverage values for the shapes in the ground truth data (e.g., by zeroing out or reducing the coverage values for the dead-zone area). This may train the CNN to better distinguish between adjacent objects. For example, the CNN may provide lower coverage values for areas between adjacent objects.

Now referring to FIG. 1A, FIG. 1A shows an illustration including an example object detection system 100, in accordance with some embodiments of the present disclosure. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

In one or more embodiments, the object detection system 100 includes, for example, a communications manager 104, an object detector 106, a detected object clusterer 108, a feature determiner 110, a confidence score generator 112, an object tracker 114, and a detected object filter 116.

The communications manager 104 may be configured to manage communications received by the object detection system 100 (e.g., comprising sensor data and/or image data) and/or provided by the object detection system 100 (e.g., comprising confidence scores, detected object data, and/or information derived therefrom). Additionally or alternatively, the communications manager 104 may manage communications within the object detection system 100, such as between any of the object detector 106, the detected object clusterer 108, the feature determiner 110, the confidence score generator 112, the object tracker 114, the detected object filter 116 and/or other components that may be included in the object detection system 100 (e.g., within the vehicle 1500).

Figure 1B:
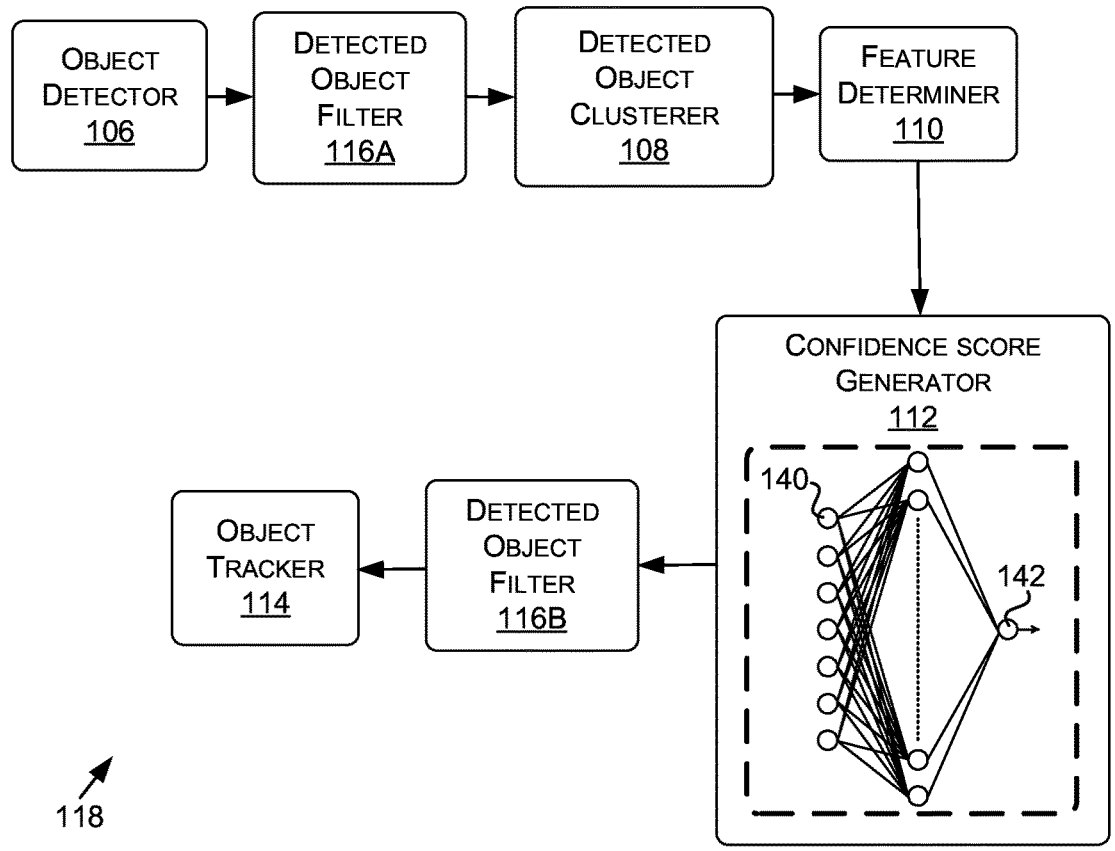
FIG. 1B is a flow diagram illustrating an example process for detecting objects and determining corresponding detection confidence scores, in accordance with some embodiments of the present disclosure.

With reference to FIG. 1B, FIG. 1B is a flow diagram illustrating an example process 118 for detecting objects and determining corresponding detection confidence scores, in accordance with some embodiments of the present disclosure. The object detector 106 may be configured to analyze sensor data, such as image data, received from the communications manager 104 and generate detected object data that is representative of detected objects captured in the sensor data. The detected object clusterer 108 may be configured to generate or determine one or more clusters of the detected objects based at least in part on the detected object data. The feature determiner 110 may be configured to generate or determine features of the clusters for use as inputs to the confidence score generator 112. The confidence score generator 112 may be configured to compute confidence scores for one or more of the clusters based at least in part on the inputs. The object tracker 114 may be configured to track objects and/or detected objects across frames (e.g., video frames) and/or images, such as in a time-domain. The detected object filter 116 of FIG. 1A may include one or more of a detected object filter 116A configured to filter detected objects from the detected object data, or a detected object filter 116B configured to filter clusters from the clusters of detected objects.

Figure 14:
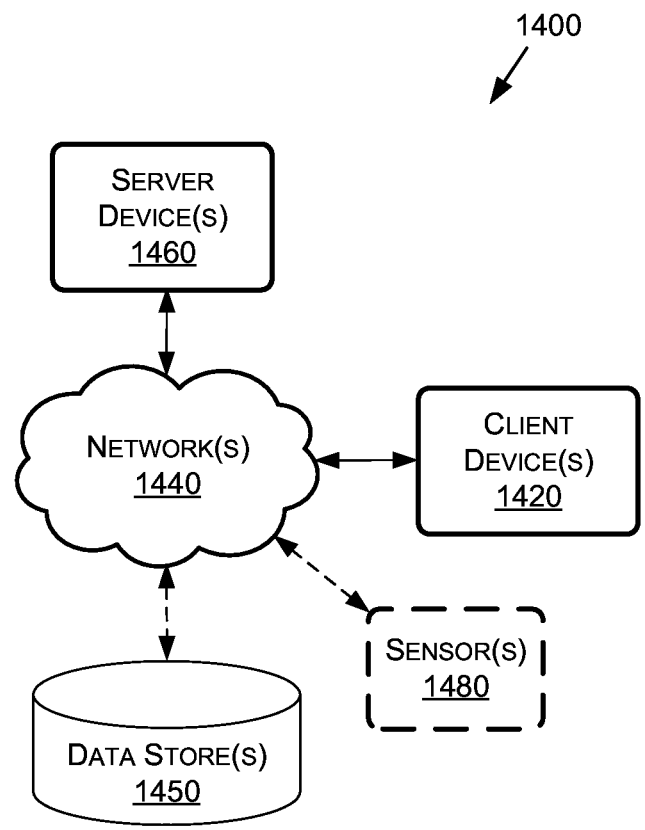
FIG. 14 is an illustration of an example operating environment suitable for use in implementing some embodiments of the present disclosure.

The object detection system 100 may be implemented in an example operating environment 1400 of FIG. 14, in accordance with some embodiments of the present disclosure. For example, the components of FIG. 1A may generally be implemented using any combination of a client device(s) 1420, a server device(s) 1460, or a data store(s) 1450. Thus, the object detection system 100 may be provided via multiple devices arranged in a distributed environment that collectively provide the functionality described herein, or may be embodied on a single device (e.g., the vehicle 1500). Thus, while some examples used to describe the object detection system 100 may refer to particular devices and/or configurations, it is contemplated that those examples may be more generally applicable to any of the potential combinations of devices and configurations described herein. For example, in some embodiments, at least some of the sensors 1480 used to generate one or more portions of the sensor data may be distributed amongst multiple vehicles and/or objects in the environment and/or at least one of the sensors 1480 may be included in the vehicle 1500.

Figure 15A:
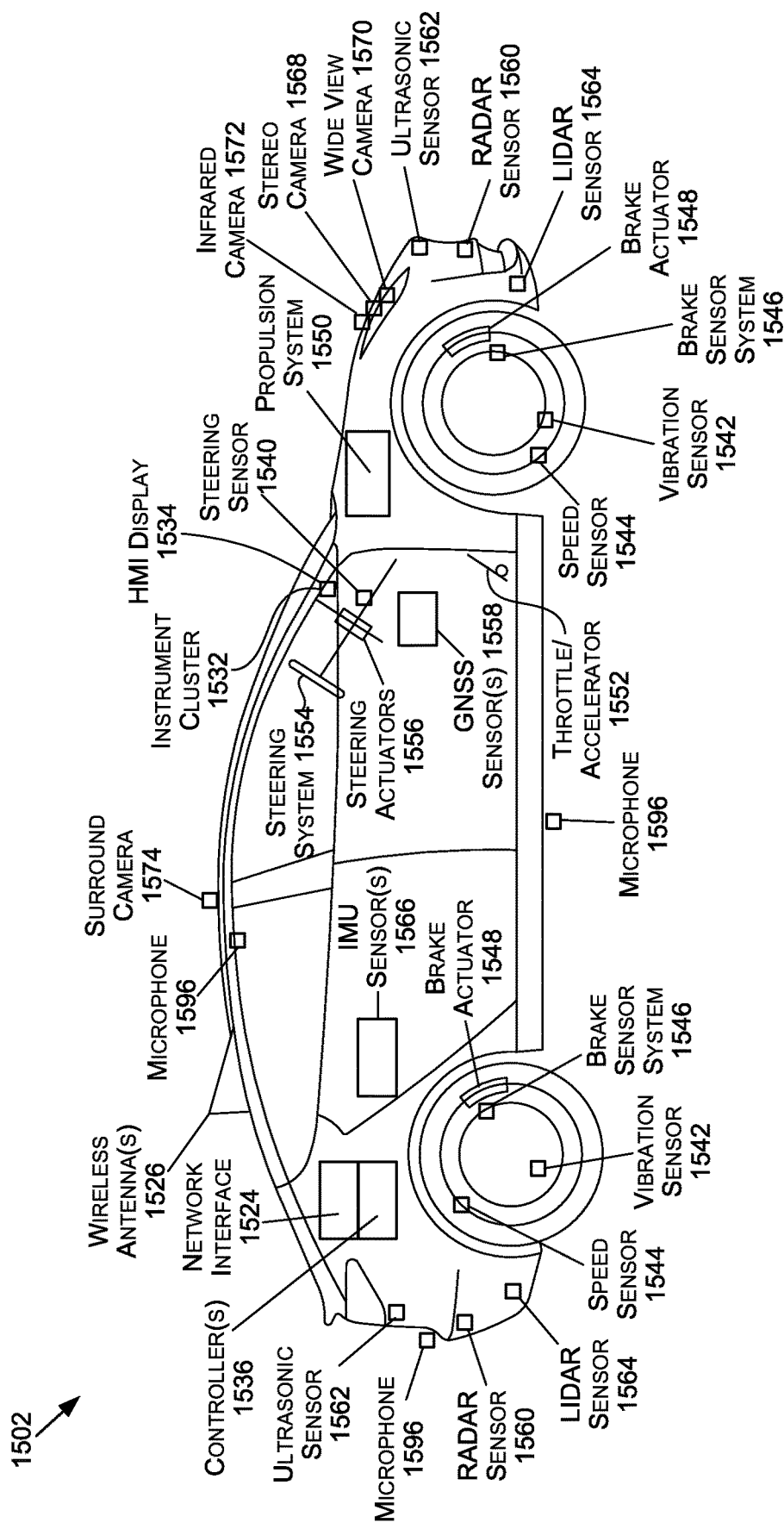
FIG. 15A is an illustration of an example autonomous vehicle, in accordance with some embodiments of the present disclosure.

As mentioned herein, the communications manager 104 may be configured to manage communications received by the object detection system 100 (e.g., comprising sensor data and/or image data) and/or provided by the object detection system 100 (e.g., comprising the confidence scores, detected object data, and/or information derived therefrom). Additionally or alternatively, the communications manager 104 may manage communications within the object detection system 100.

Where a communication is received and/or provided as a network communication, the communications manager 104 may comprise a network interface which may use one or more wireless antenna(s) (wireless antenna(s) 1526 of FIG. 15A) and/or modem(s) to communicate over one or more networks. For example, the network interface may be capable of communication over Long-Term Evolution (LTE), Wideband Code-Division Multiple Access (WCDMA), Universal Mobile Telecommunications Service (UMTS), Global System for Mobile communications (GSM), CDMA2000, etc. The network interface may also enable communication between objects in the environment (e.g., vehicles, mobile devices, etc.), using local area network(s), such as Bluetooth, Bluetooth Low Energy (LE), Z-Wave, ZigBee, etc., and/or Low Power Wide-Area Network(s) (LPWANs), such as Long Range Wide-Area Network (LoRaWAN), SigFox, etc. However, the communications manager 104 need not include a network interface, such as where the object detection system 100 implemented completely on an autonomous vehicle (e.g., the vehicle 1500). In some examples, one or more of the communications described herein may be between components of a computing device 1600 over a bus 1602 of FIG. 16.

Sensor data received by the communications manager 104 may be generated using any combination of the sensors 1480 of FIG. 14. For example, the sensor data may include image data representing an image(s), image data representing a video (e.g., snapshots of video), and/or sensor data representing fields of view of sensors (e.g., LIDAR data from LIDAR sensor(s) 1564, RADAR data from RADAR sensor(s) 1560, image data from a camera(s) of FIG. 15B, etc.).

Figure 2A:
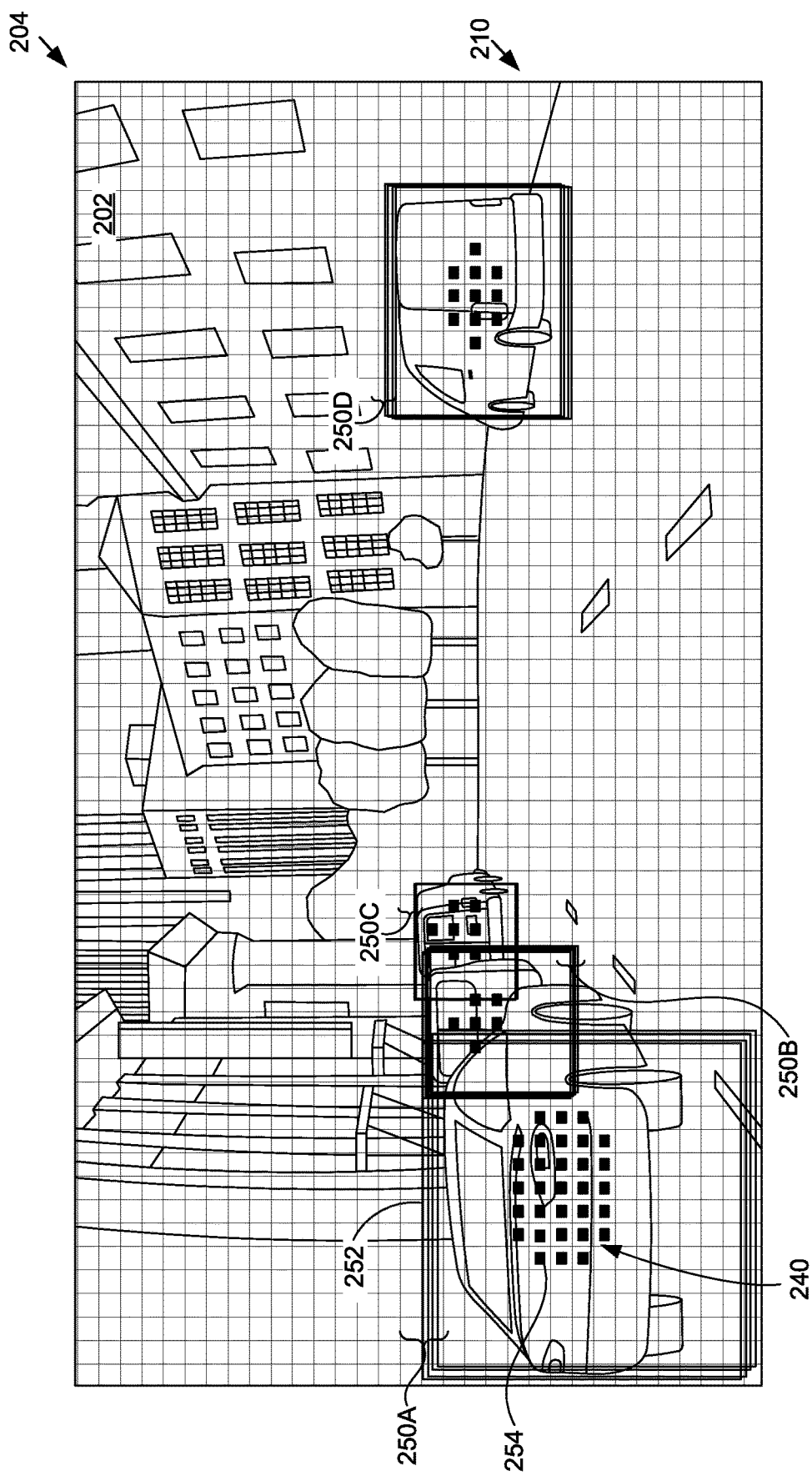
FIG. 2A is an illustration of an image overlaid with visual elements that correspond to detected objects, in accordance with some embodiments of the present disclosure.
Figure 2B:
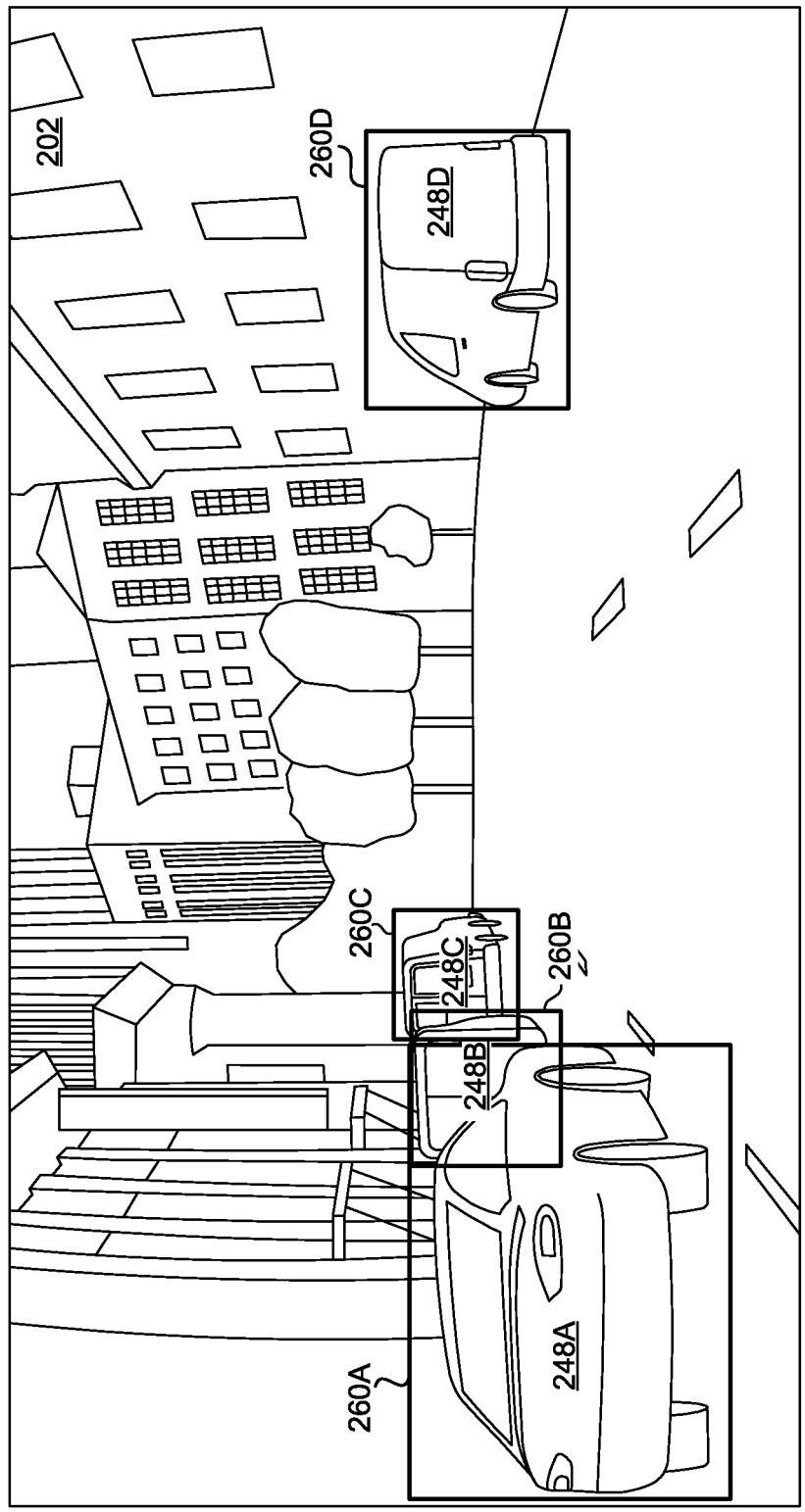
FIG. 2B is an illustration of an image overlaid with visual elements that correspond to clusters of detected objects, in accordance with some embodiments of the present disclosure.

With reference to FIGS. 2A and 2B, FIG. 2A is an illustration of an image overlaid with visual elements that correspond to detected objects, and FIG. 2B is an illustration of the image overlaid with visual elements that correspond to clusters of the detected objects, in accordance with some embodiments of the present disclosure. The sensor data and/or image data that the communications manager 104 provides to the object detector 106 may be generated in an environment 202 and may include image data representative of a field(s) of view of respective cameras of the vehicle 1500 in the environment 202, which may include one or more images, such as an image 204.

The image 204 depicts regions of the environment 202, where the regions may include any number of objects, examples of which include objects 248A, 248B, 248C, and 248D, which are labeled in FIG. 2B. The objects may comprise any combination of vehicles, people (e.g., pedestrians), motorcycles, bicyclists, trees, animals, buildings, signs, structures, and/or other objects within the environment 202. While the example of sensor data is provided, in other examples, such as where the object detection system 100 is not used in conjunction with a vehicle and/or camera, the sensor data may not be employed. For example, the image 204 could correspond to image data that was not generated by a sensor 1480. In these cases, the image 204 may be a digital rendering, or other image from which objects may be detected (which may not correspond to physical objects in an environment).

The sensor data and/or image data may be provided by the communications manager 104 to the object detector 106, which may analyze the sensor data (e.g., the image data) to generate detected object data. The detected object data may be representative of detections, by the object detector 106, of objects in the field of view and/or the image 204 (which may also be referred to as detected objects). The detected objects may or may not correspond to actual objects depicted in the field of view and/or the image 204. For example, some of the detected objects may correspond to false detections made by the object detector 106. Further, some of the detected objects may correspond to the same object depicted in the field of view and/or the image 204.

The object detector 106 may comprise one or more machine learning models trained to generate the detected object data from features extracted from the sensor data (e.g., the image data). In some examples, the object detector 106 is configured to determine a set of detected object data (e.g., a coverage value and detected object region and/or location) for each spatial element region of a field of view and/or image. Locations and areas of the spatial element regions may be defined by corresponding spatial elements (e.g., outputs) of the object detector 106. For example, the spatial element regions for the same spatial element for different field of view(s) and/or images may be in a same location and a same area, which corresponds to the spatial element. In various examples, a spatial element may also refer to a grid cell, an output cell, a super-pixel, and/or an output pixel of the object detector 106.

In various examples, the spatial elements may form a grid of spatial element regions. For example, FIG. 2A visually indicates, as an example, a grid 210 of spatial elements of the object detector 106. The spatial element regions, such as a spatial element region 254, may be defined by the grid. For example, each grid-cell may contain a spatial element region of a spatial element. In other examples, grid-based spatial elements may not be used. Further, the spatial elements may not necessarily define contiguous spatial element regions, may not necessarily define rectangular-shaped spatial element regions, and/or may not cover all regions of a field of view and/or image.

In some examples, for a single image 204 or frame, or a set of images or frames, each spatial element of the object detector 106 may provide the detected object data for a corresponding detected object. In other examples, one or more spatial elements may not provide detected object data. The detected object data may be representative of, for example, a location of the detected object in the field of view and/or the image 204, such as coordinates of the detected object in the field of view and/or the image 204. Additionally or alternatively, the detected object data for the detected object may be representative of a detected object region that corresponds to the detected object. For example, the detected object region may be a region in the field of view and/or the image 204 in which the object detector 106 detects and/or predicts the object. In some examples, the object detector 106 may generate the detected object region as a shape that bounds the detected object. For example, each detected object region may be a bounding box around the detected object. The object detector 106 may, in some examples, represent the detected object region using the location(s) of the detected object. For example, the object detector 106 may provide a set of the locations that define the shape of the detected object region.

In the example of FIG. 2A, each detected object region may be provided by the object detector 106 as a set of bounding box coordinates. For example, visual elements that correspond to detected object regions 250A, detected object regions 250B, detected object regions 250C, and detected object regions 250D are shown to illustrate at least some of the bounding boxes at the bounding box coordinates (e.g., the four corner points of a bounding box) for different spatial elements (e.g., indicated with shaded cells).

The detected object data provided by the object detector 106 for a detected object may be representative of, for example, a coverage value of the detected object. The coverage value may represent a likelihood or probability that an object is depicted at least partially at a location corresponding to the location(s) of the detected object (e.g., within a detected object region of the detected object).

Another example of the detected object data, which may be provided by the object detector 106, includes depth data representative of a depth (or 3D location) of the detected object in the field(s) of view, image(s), and/or the environment 202 (e.g., with respect to the sensors used to capture the sensor data). A further example of the detected object data includes visibility data representative of an amount of the detected object that is visible and/or whether a particular portion of the detected object is visible. For example, visibility data may be representative of bottom and/or width visibility states and/or values, which may respectively predict whether the bottom/height or width of an object is visible. For example, an object may be occluded from one or multiple sides, and/or truncated out of the field(s) of view of a sensor(s).

A further example of the detected object data includes orientation data representative of an orientation of the detected object in the field(s) of view, image(s) and/or the environment 202. The orientation may comprise an orientation value(s) capturing an angle at which an object of interest (e.g. a car) appears, with respect to an origin that lies on the sensor(s), such as a camera. In some examples, the object detector 106 is trained to predict both sine and cosine values of the angle, as opposed to the raw orientation itself. This may improve the accuracy of the predictions.

In some examples, at least some of the detected object data for different spatial element regions may correspond to the same object depicted in the field of view and/or image data, such as due to proximities between the spatial element regions. For example, the object detector 106 may determine the detected objects regions 250A for different spatial element regions based on the object 248A, the detected objects regions 250B for different spatial element regions based on the object 248B, the detected objects regions 250C for different spatial element regions based on the object 248C, and the detected objects regions 250D for different spatial element regions based on the object 248D. In examples, any number of detected objects and detected object regions (or more generally locations) may correspond to a particular object depicted in the field of view and/or sensor data (e.g., image data).

The detected object clusterer 108 may be used to associate the detected objects that may correspond to the same object depicted in the field of view and/or sensor data with one another in order for the object detection system 100 to form aggregated detections for particular objects. For example, the detected object clusterer 108 may apply a clustering algorithm to detected objects provided by the object detector 106 to form a first cluster of detected objects that corresponds to the detected objects regions 250A, a second cluster of detected objects that corresponds to the detected objects regions 250B, a third cluster of detected objects that corresponds to the detected objects regions 250C, and a fourth cluster of detected objects that corresponds to the detected objects regions 250D.

In some cases, prior to the detected objects being clustered by the detected object clusterer 108, the detected object filter 116A may filter detected objects from the output of the object detector 106 based at least in part on associated coverage values and/or other criteria (e.g., any of the various information described herein that may be represented by the detected object data or extracted therefrom). The detected objects that remain may then be provided to the detected object clusterer 108 for clustering. This may conserve processing power by reducing the number of detected objects that are clustered. For example, the detected objects that are filtered out may be unlikely to correspond to actual objects, or may be redundant. The visual elements of FIG. 2A may correspond to the detected objects that remain after the filtering performed by the detected object filter 116A. In other examples, the detected object filter 116A may not be used and each detected object provided by the object detector 106 may be clustered by the detected object clusterer 108.

Additionally or alternatively, the detected object filter 116A may filter the detected objects based at least in part on the associated detected object regions. For example, a detected object may be filtered based at least in part on a size of its detected object region (e.g., using a size threshold). This may be useful in examples where the object detector 106 includes one or more specialized components or parameters optimized to detect objects in different sizes ranges. For example, a first portion of the object detector 106 may be trained or configured to output object detections for a first size range, and a second portion of the object detector 106 may be trained or configured to output object detections for a second size range. The detected object filter 116A may filter detected objects provided by those components of the object detector 106 that are outside of the size range (and/or have coverage values below a threshold value).

Additionally or alternatively, the threshold(s) used by the detected object filter 116A to filter the detected objects (e.g., size thresholds or coverage value thresholds) may be based at least in part on a class of the detected object. For example, the object detector 106 may be trained to output, for a detected object, a portion of the detected object data that is representative of a detected object class value or identifier (ID), which indicates a class of a detected object. Example classes may include, without limitation, cars, motorcycles, pedestrians, and/or cyclists, although any number and type of classes may be used. Each threshold (or set of thresholds) could, for example, be specific to or otherwise be based on a particular target class.

The detected object clusterer 108 may form any number of clusters of detected objects by applying a clustering algorithm(s) to the outputs of the object detector 106 for the detected objects (e.g., after filtering). For example, the clusters of detected objects may respectively correspond to detected object regions 260A, 260B, 260C, and 260D in FIG. 2B. To cluster detected objects, the detected object clusterer 108 may cluster the locations (e.g. detected object regions) of the detected objects together. This may be, for example, based at least in part on the coverage values associated with the locations and/or other detected object data described herein. In some examples, the detected object clusterer 108 uses a Density-Based Spatial Clustering of Applications with Noise (DBSCAN) algorithm. Other examples include non-maximum suppression or groupRectangles algorithms.

The clustering algorithm may include a parameter(s) specifying a maximum allowed distance (e.g., pairwise) between two detected object locations for them to be considered part of the same cluster. The clustering algorithm may also include a minimum coverage to cluster parameter where spatial elements that have coverage values that are below this threshold are discarded and not considered during clustering. The clustering algorithm may also include a minimum object height parameter where spatial elements that have detected object regions with a height below this threshold may be discarded and not considered during clustering. The clustering algorithm may also include a minimum samples parameter where, if the sum of the coverage values of detected objects that make up a cluster falls below this value, the cluster is discarded. The clustering algorithm may perform a search over a portion of the hyper-space formed by the above parameters.

Inputs to the clustering algorithm (e.g., for DBSCAN) may include pairwise distances among the locations (e.g., bounding boxes) of the detected objects, along with the coverage values associated with the locations. The coverage values may be used as sample weights for the clustering algorithm. Outputs of the clustering algorithm may include labels of the locations of the detected objects, such that all locations that are clustered together may have the same label. The clustering algorithms—which may be used by the detected object clusterer 108—may be parametrized by hyperparameters, such as a parameter that controls the neighborhood size for each detected object and/or minimum aggregate sample weight that forms a valid cluster. The pairwise distance of two detected object regions b1 and b2 may be computed as: d(b1, b2)=1.0−IOU(b1, b2), where IOU refers to intersection-over-union. This may refer to the ratio of the area of the intersection between two detected object regions over the area of their union.

The object detection system 100 may determine aggregated detected object data for each cluster, which may be similar to outputs described herein of the object detector 106 for a particular detected object, but may correspond to the cluster. A cluster or group of detected objects may also be referred to as an aggregated detected object. The object detection system 100 may determine a location(s) for the aggregated detected object, based at least in part on the locations of the detected objects in the cluster. For example, the location may be an average and/or weighted average (e.g., by coverage value) of the locations. As another example, the location that has the highest coverage value may be used as the location for the aggregated detected object. The detected object regions 260A, 260B, 260C, and 260D in FIG. 2B correspond to examples of locations for aggregated detected objects.

It may further be desirable for the object detection system 100 to determine a likelihood and/or probability that an aggregated detected object corresponds to an object depicted at least partially in the field(s) of view and/or image(s). In one approach, the maximum coverage value of detected object of a cluster may be used as the confidence value. While this approach may be used in some examples described herein, this approach may lead to false detections, as the maximum coverage value may only correspond to a small portion of the image(s) and/or field(s) of view. Another approach may use a sum of the coverage values of the detected objects of the cluster as the confidence value. While this approach may be used in some examples described herein, because the sum is unbounded, the sum may not be directly interpreted as a confidence or probability measure, which may also lead to false detections. In this regard, the confidence score generator 112 may be used to determine a confidence score for a cluster that may be directly interoperable as a likelihood or probability that an aggregated detected object corresponds to an object depicted at least partially in the field(s) of view and/or image(s).

The confidence score generator 112 may generate a confidence score for a cluster or aggregated detection based at least in part on features associated with at least the aggregated detection. For example, the confidence score generator 112 may comprise one or more machine learning models (e.g., a neural network(s)) trained to generate the confidence score based at least in part on the features. The feature determiner 110 may detect and/or generate features based at least in part on the detected object data associated with the aggregated detection. The features may be used as inputs to the machine learning model(s). Further, the machine learning model(s) may output confidence score data representative of the confidence score (e.g. a scalar value). For example, for a given image(s) or frame(s), the confidence score generator 112 may be used to generate a confidence score for each of the aggregated detections (or combinations thereof).

While some examples of a machine learning model(s) that may be used for the confidence score generator 112 and/or other components described herein (e.g., the object detector 106) may refer to specific types of machine learning models (e.g., neural networks), it is contemplated that examples of the machine learning models described herein may, for example and without limitation, include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In some cases, the detected object filter 116B may be used to filter aggregated detections based on associated coverage scores and/or other criteria (e.g., any of the various information described herein that may be represented by the associated detected object data, aggregated detected object data, or extracted therefrom). For example, an aggregated detection may be retained based at least in part on the confidence score exceeding a threshold (e.g., an adjustable value). This filtering may be performed to reduce false positives.

In some examples, the object detection system 100 may employ multi-scale inferencing using the object detector 106. In multi-scale inferencing, the object detector 106 may infer the same images multiple times at different scales (e.g., in parallel). Raw detections may be merged together and passed to the detected object filter 116A or the detected object clusterer 108 for further processing, as in FIG. 1B.

The aggregated detections and any associated aggregated detection data may be used for various purposes. Non-limiting examples include video surveillance, video or image editing, video or image search or retrieval, object tracking, weather forecasting (e.g., using RADAR data), medical imaging (e.g., using ultrasound or magnetic resonance imaging (MRI) data), and/or autonomous driving. In some examples, the aggregated detections may be used for obstacle perception for an autonomous vehicle, such as the vehicle 1500. For example, the object detection system 100 may be included in an obstacle perceiver of the vehicle 1500, where at least some of the aggregated detections may be obstacles that are perceived using the obstacle perceiver.

In some examples, the object tracker 114 may be used to track objects and/or detected objects (e.g., aggregated detected objects) across frames (e.g., video frames) and/or images, such as in a time-domain. For example, the object tracker 114 may determine at least a first detected object and a second detected object are the same object depicted across sequential frames (e.g., consecutive frames in time) represented by the sensor data and/or image data. This may be based, at least in part, on the confidence scores associated with the aggregated detected objects. As another example, the object tracker 114 may determine at least a first detected object and a second detected object are the same object captured by different sensors (e.g., of the vehicle 1500) and/or in different images (e.g., and merge or fuse the detections) represented by the sensor data and/or image data. As an example, the object tracker 114 may use the confidence scores and/or aggregated object data to fuse or merge detections of objects (e.g., using the process of FIG. 1B) derived from one or more sensors and/or sensor types (e.g., a camera or array of cameras producing image data) with detections of objects (e.g., using the process of FIG. 1B) determined from one or more other sensors and/or sensor types (e.g., LIDAR and/or RADAR sensors).

Examples of a Machine Learning Model(s) for Object Detection

Figure 3:
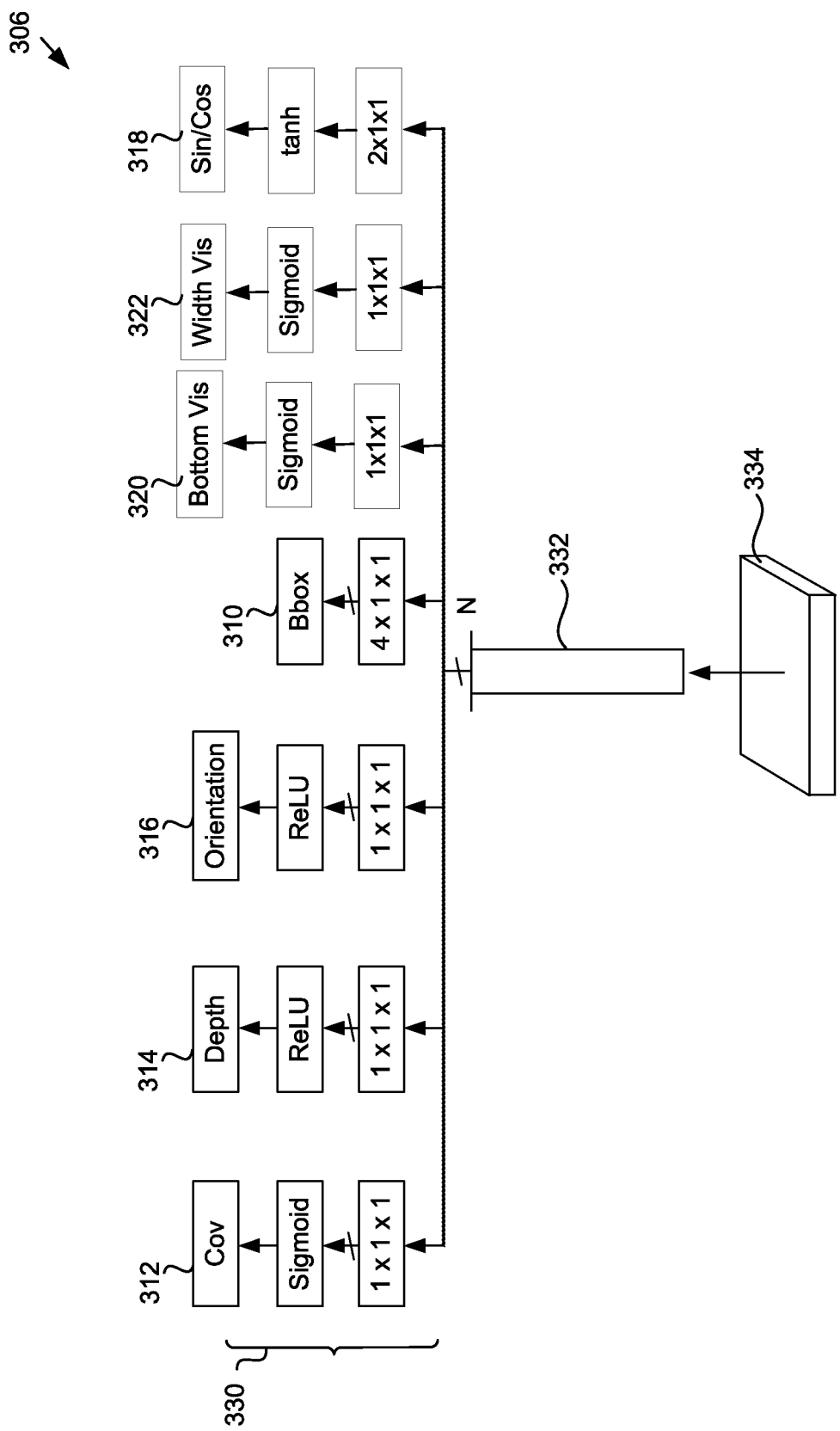
FIG. 3 is an illustration including an example object detector, in accordance with some embodiments of the present disclosure.

Now referring to FIG. 3, FIG. 3 is an illustration including an example object detector 306, in accordance with some embodiments of the present disclosure. As an example, the object detector 306 may be used as the object detector 106 of FIGS. 1A and 1B, or other types of object detectors could be used. The object detector 306 includes a neural network(s), such as a CNN(s) used for object detection. The CNN(s) may use a gridbox or other architecture, as illustrated in FIG. 3, with N (e.g., 256, 512, or 1024) number of spatial elements. In the architecture, the fully connected layers and/or average pooling layers used for image classification at the top of the network may be replaced by a convolutional layer with outputs for each spatial cell (corresponding to a spatial element). Examples of the outputs for a spatial cell (e.g., correspond to the spatial element region 254 of FIG. 2A) are shown in FIG. 3 and include any combination of the detected object data described herein. In the particular example shown, the outputs include location data 310, coverage data 312, depth data 314, orientation data 316, orientation data 318, bottom or height visibility data 320, and width visibility data 322.

The orientation data 316 and the orientation data 318 are two examples of orientation data, only one of which may be used in some examples. Each may be representative of an orientation of the detected object in the image(s) such as an orientation value(s) capturing an angle at which an object of interest (e.g. a car) appears, with respect to an origin that lies on the sensor(s), such as a camera. The orientation data 318 may be representative of both sine and cosine values of the angle and may be provided using a Hyperbolic Tangent (tan h) activation function. The orientation data 316 may be representative of a raw orientation itself (e.g., an angle), and may be provided using a Rectified Linear Unit (ReLU) activation function. FIG. 3 shows particular activation functions for the various outputs of the object detector 306 as examples only. Generally, any of the outputs shown may be provided using one or more of ReLU, leaky ReLU, sigmoid, tan h, Exponential Linear Unit (ELU), and/or other activation functions.

The location data 310 may represent any number of location coordinates defining a detected object region, such as four coordinates that correspond to the corners of a bounding box region. The location coordinates may be provided in various possible formats, such as left, bottom, top, and right coordinates. Another example of a format includes center coordinates (e.g., x, y) along with the width and height of the spatial element region. In some examples, the location data 310 may be provided using anchor boxes. For example, while a 4×1×1 layer is shown, multiple layers may be provided for different anchor box types (e.g., for different sizes and/or orientations of detected objects).

The coverage data 312 may represent a coverage value for the spatial cell. The coverage value may be interpreted as a measure of "objectness" (or a likelihood of the spatial cell corresponding to an object) in the corresponding spatial element region. By way of example, the coverage value may be provided using a sigmoid activation function.

The depth data 314 may be representative of a depth value that corresponds to a distance or depth (or 3D location) of the detected object from the sensor(s), such as from a camera(s). The depth value may be provided using a ReLU activation function, by way of example.

The bottom or height visibility data 320 may be representative of a value that indicates whether a bottom or height of the detected object is completely visible or partially occluded (or truncated by the image). In other examples, the value may indicate an amount of the bottom of height of the detected object that is visible, occluded, or truncated. The value may be provided using a sigmoid activation function, as an example.

Similarly, the width visibility data 322 may be representative of a value that indicates whether a width of the detected object is completely visible or partially occluded (or truncated by the image). In other examples, the value may indicate an amount of the width of the detected object that is visible, occluded, or truncated. The value may be provided using a sigmoid activation function, as an example.

The outputs of the object detector 106 (e.g., an output layer(s) 330 of the neural network(s)) may typically be provided for each spatial element (e.g., grid or spatial cell) and may be referred to as "raw" outputs or detections for a detected object. Any combination of the various raw outputs or detections may be what the detected object filter 116A uses to filter the detected objects provided by the object detector 306. For example, various thresholds may be used as cutoffs for any combination of the various outputs. Further, although not shown, the outputs may include class data representative of a class of the detected object, and different thresholds may be used for different classes. The object detector 306 may be extended to multiple object classes by replicating the output layer 330 structure accordingly or modifying the depth of each output according to the number of classes. Also 3×3 or any other convolution sizes could be used instead of 1×1 as depicted in FIG. 3.

As mentioned herein, the detected object filter 116A may filter the detected objects based at least in part on sizes of the associated detected object regions. To illustrate the forgoing, the object detector 306 may comprise multiple heads each with the task of predicting (e.g., in parallel) its own set of detected objects (e.g., bounding boxes, coverage values, and/or other outputs described herein). A first head may be larger (e.g., have a larger stride such as 16) than a second head (e.g., having a stride of 8) such that it is more suited to detecting medium to large sized objects depicted in the image 204, while the second head is more suited to detecting small to medium sized objects depicted in the image 204. While each head may have its own output layer(s) 330, the outputs may be filtered differently by the detected object filter 116A, so as to leverage the capabilities of each head, which may result in higher quality raw detected objects used for clustering. For examples, the detected object filter 116A may filter out detected objects provided by the second head based at least in part on the detected objects having detected object regions greater than a threshold size. In some examples, the detected object filter 116A may retain at least some of the detected objects for the second head where the detected object regions are greater than the threshold size, but may use a higher threshold for the associated coverage values. In other examples, the detected objects may be filtered regardless of the coverage values.

The object detector 306 may process an image (e.g., a picture), by breaking the image down into simplified blocks of a certain size. If the image was originally a high definition image (e.g., with a spatial resolution of 1920 pixels by 1080 pixels or greater), the object detector 306 may reduce the image to a feature map with lower spatial resolution (e.g., of 60 pixels by 30 (super)pixels). Where the pixels in the feature map may correspond to pixel blocks (e.g., 16×16) in the pixel space (e.g., non-overlapping) of the input image. In a multi-headed configuration, the object detector 306 may reduce the image multiple times (e.g., twice). One reduction may be to a first lower resolution feature map (e.g., 60×30). This may correspond to processing, for example, 16×16 pixel blocks (e.g., non-overlapping) in the pixel space of the input image. Another reduction may be to a second lower resolution feature map (e.g., 120×60). This may correspond to processing, for example, 8×8 pixel blocks (e.g., non-overlapping) in the pixel space of the input image.

The first lower resolution feature map may be better for identifying large objects in the image (e.g., the rear end of a close car) than the second lower resolution feature map due to larger pixel blocks. The second lower resolution feature map may be better for identifying small objects in the image (e.g., a basketball that just rolled into the street, or the front end of a van in the distance) due to smaller pixel blocks.

The object detector 306 may comprise a deep neural network (DNN). In some examples, the DNN includes the output layer(s) 330, intermediate layers 332, and an input layer(s) 334. In some examples, the DNN is eighteen layers deep, but the DNN could be any number of layers deep.

For inference, the input layer(s) 334 of the object detector 306 may take one or several images, depending whether batching is used. For example, multiple images may be input at the same time when, for example, batching is used at inference time to infer multiple input images simultaneously, mini-batching is used during training of the object detector 306, and/or when video processing is used such that the object detector 306 processes multiple frames consecutive or sequential in time.

Many types of images or formats may be used as inputs, for example, compressed images such as in Joint Photographic Experts Group (JPEG) or Luminance/Chrominance (YUV) formats, compressed images as frames stemming from a compressed video format such as H.264 or H.265/High Efficiency Video Coding (HEVC), raw images such as originating from Red Clear Clear Blue (RCCB), Red Clear Clear Clear (RCCC) or other type of imaging sensor. It Different formats and/or resolutions could be used for training the object detector 306 than for inferencing (deployment).

Images input to the object detector 306 may be represented and loaded in memory in the form of a multi-dimensional array/matrix (also referred to as tensor, and more specifically an input tensor). The array size may be computed/represented as W×H×C, where W stands for the image width in pixels, H stands for the height in pixels and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the object detector 306. This ordering may be chosen to maximize training and/or inference performance.

A pre-processing image pipeline may be employed to process a raw image(s) acquired by a sensor(s) to produce an input image(s) to the input layer(s) 334. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order).

Where noise reduction is employed, it may include bilateral denoising in the Bayer domain Where demosaicing is employed, it may include bilinear interpolation. Where histogram computing is employed, it may involve computing a histogram for the C channel, and may be merged with the decompanding or noise reduction in some examples. Where adaptive global tone mapping is employed, it may include performing an adaptive gamma-log transform. This may include calculating a histogram, getting a mid-tone level, and estimating a maximum luminance with the mid-tone level.

The intermediate layers 332 may include a feature extractor comprising convolutional layers and pooling layers, or in some examples may not include pooling layers at all. One or more of the convolutional layers may perform strided convolutions. The feature extractor may be configured to construct a hierarchical representation of the input image(s) with each layer building a level of abstraction which increases the higher/farther the layer in the DNN is located from the input layer(s) 334. The output of a final convolutional feature map of the feature extractor may be used as an input to a subsequent output layer(s) 330.

In some examples, the intermediate layers 332 include one or more up-sampling layers as part of the feature extractor, which may be located at the top of the feature extractor, and/or in other locations. The up-sampling layers may increase the spatial resolution at their output when compared to their input. An up-sampling layer may comprise a deconvolution layer, although it may not perform a deconvolution operation strictly speaking. Alternative denominations for an up-sampling layer includes a transpose convolutional layer or a fractionally strided convolutional layer.

In some examples, the feature extractor of the object detector 306 may include one or more recurrent convolutional layers such as Gated Recurrent Units (GRU) or Long-Term Short-Term Memory (LSTM) units, which may be either single dimensional or multi-dimensional convolutional recurrent units. Further, skip-connections or residual connections may be used for connecting non-consecutive layers of the feature extractor. Additionally, concatenation operators may be used as part of the feature extractor. Various types of activation functions may be used such as (and not limited to): ReLU, leaky ReLU, sigmoid, tan h, and ELU. Batch normalization layers may also be used.

The output layer(s) 330 (or ensemble of layers) may predict/output any of the various detected object data described herein. Assuming the object detector 306 outputs predictions for a number C of object classes of interest. The subsequent output layer(s) 330 may apply a set of convolutional filters (e.g., 1×1 or 3×3, but not limited to these examples) onto the output of a last or final convolutional feature map prior to the output layer(s) 330. Assuming, in an example, non-limiting embodiment, the final feature map at the output of the output layer(s) 330 has spatial resolution Wout×Hout. Then, each of the spatial elements on this feature map may output for each of the C considered classes any of the various detected object data described herein with respect to the output layer(s) 330.

By way of example, assuming an input of size 960×480×3 (e.g., a width of 960 pixels, height of 480 pixels, and 3 color channels) is input to the object detector 306, each output cell (e.g., grid cell) may correspond to a pixel area (e.g., 16×16) in the input image. This pixel area may correspond to a spatial element region described herein, and may be based on the stride of the DNN. In this example, the output layer(s) 330 may include an array of size 60×30×(1+4)×C. An array/matrix (e.g., multi-dimensional matrix) that corresponds to the output layer(s) 330 may be referred to as an output tensor of the object detector 306.

Examples of a Machine Learning Model(s) for Determining Detection Confidence Scores The confidence score generator 112 (and by extension, confidence scores generated by the confidence score generator 112) may be used in many different potential applications, non-limiting examples of which include video surveillance, video or image editing, video or image search or retrieval, object tracking, weather forecasting (e.g., using RADAR data), medical imaging (e.g., using ultrasound or magnetic resonance imaging (MRI) data), and/or autonomous driving. In the context of autonomous driving, aggregated detected objects that have sufficient confidence scores may describe areas in the field(s) of view and/or image(s) that include an object that is relevant to driving the vehicle 1500, and may be combined with other types of information (such as data from other sensors like LIDAR or RADAR, or information calculated by other systems in the vehicle 1500). For example, confidence scores may indicate to the vehicle 1500 there is a 0.95 (95%) probability that there is an object (like another vehicle) directly ahead of the vehicle 1500 at a particular location relative to the vehicle, but only a 0.03 (3%) probability that there is a relevant object over a ground plane, such as a cloud, which is likely not relevant to the immediate operation of the vehicle 1500.

The confidence score generator 112 may generate a confidence score for a cluster or aggregated detection based at least in part on features associated with at least the aggregated detection. The features may be provided using the feature determiner 110. The confidence score generator 112 may take a vector(s) (e.g., a single vector) of features as its input(s) and output a confidence score(s). A confidence score may be a single scalar value, such as in a range of 0 to 1. Using a scalar value, the confidence score may be directly interpretable as a probability of a false detection.

The confidence score generator 112 may comprise one or more machine learning models (e.g., a neural network(s)) trained to generate the confidence score(s) based at least in part on the features. The confidence score generator 112 may, for example, regress a confidence score based at least in part on outputs from the detected object clusterer 108. The confidence score generator 112 may be implemented as or using a feedforward neural network(s), such as a Multi-Layer Perceptron (MLP) network.

FIG. 1B shows a non-limiting example where the confidence score generator 112 comprises an MLP. The MLP may include a single hidden layer; however, this is just an example and the number of hidden layers could be different, such as two or three. Further, the number of nodes per layer could be dimensioned in various different ways. For example, FIG. 1B shows seven input nodes (including node 140), one per input feature, however, this is just one non-limiting example. Also, where features are computed directly from pixels/frame elements and/or image or sensor data (e.g., input pixels/frame elements to the object detector 106), the confidence score generator 112 may include one or more convolutional layers in addition to or instead of the MLP.

In some examples, detections extracted from an input frame or image to the object detector 106 (e.g., after filtering by the detected object filter 116A) may be provided to the confidence score generator 112 jointly. Duplicate detections could be removed. In these examples, the input features for the confidence score generator 112 could all be jointly extracted by the feature determiner 110 from the detections and fed into the confidence score generator 112. The confidence score generator 112 may comprise a Recurrent Neural Network (RNN) that receives the features. This may be beneficial in examples where the number of detections per frame may be variable. Any form of RNN(s) could be used, such as Long Short Term Memory (LSTM) or Gated Recurrent Unit (GRU), for example. However, an MLP may still be used, such as by dimensioning an input vector to the confidence score generator 112 according to a maximum number of detections per frame. Unused entries may be filled with zeroes and/or other dummy values.

Training the confidence score generator 112 may include, for example, clustering outputs of the object detector 106 (e.g., using the detected object clusterer 108 and/or the detected object filter 116A). Based on any combination of the aggregated detected object data associated with the clusters, the feature determiner 110 may determine the features and provide the features as inputs to the confidence score generator 112. Ground truth labeling may be used to label the clusters as false positives or true positives. During training, false positives may be assigned a label '0' while true positives may be assigned a label '1' for the confidence score. Using this approach, outputs from the confidence score generator 112 (e.g., corresponding to a single output node 142 in some examples) may be compared to the ground truth labels. The comparisons may be used to compute error terms and the error terms may be used by a backpropagation algorithm to adjust the weights of the machine learning model(s). The confidence score generator 112 may be trained with a sigmoid activation function (also called a logistic activation function) and/or cross entropy loss (also called logistic loss). Training may be performed offline, in some examples, and only a forward pass may be run when the confidence score generator 112 is deployed (e.g., using pre-trained and pre-loaded weights). When trained, the confidence value may be used to judge which detections (e.g., clustered detections) correspond to false positive detections.

The features that the feature determiner 110 provides to the confidence score generator 112 may be based on a variety of potential factors. To determine a confidence score for an aggregated detection, the feature determiner 110 may extract one or more features from, or determine the one or more features for, the aggregated detection and may apply those features to the confidence score generator 112. A feature for an aggregated detection may be based at least in part on the aggregated detected object data, such as a location and/or detected object region assigned to the aggregated detection, an orientation value(s) assigned to the aggregated detection, a visibility value(s) (e.g., height and/or width) assigned to the aggregated detection, a depth value(s) assigned to the aggregated detection, and/or other information associated the aggregated detection. Additionally, or alternatively, a feature for an aggregated detection may be based at least in part on the detected object data for any of the various detected objects that correspond to the cluster, such as a location and/or detected object region, a visibility value(s) (e.g., height and/or width), a depth value(s), and/or other information associated the detected objects. For example, a feature may correspond to a height, a width, an area, a center point or midpoint (e.g., x and y, which may correspond to separate features in some examples), and/or other dimension of a detected object region assigned to the aggregated detection.

In some examples, the feature determiner 110 computes a statistic(s) (e.g., a statistical value(s)), and provides the statistic(s), or data derived therefrom as a feature. Examples of statistics include a sum, a mean, an average, a Histogram of Orientated Gradients (HOG), a maximum, a minimum, a standard deviation, a mode, a variance, a median, a range, and/or other statistical aspect of the coverage values of at least some of the detected objects of the cluster. Further examples of statistics include a sum, a mean, a HOG, an average, a maximum, a minimum, a standard deviation, a variance, a mode, a median, a range, and/or other statistical aspect of the locations (e.g., detected object region coordinates) and/or detected object regions of at least some of the detected objects of the cluster. For example, the statistic may correspond to a height, a width, an area, a center point or midpoint (e.g., x, y), and/or other dimension of the detected object regions. In some examples, the statistic is based on an IOU between detected object regions, such as a maximum IOU between detected object regions (an example equation for computing an IOU is provided herein). Another example of a statistic is a number of the detected objects that are part of the cluster. Further, statistics, such as a sum, a mean, an average, a standard deviation, a mode, a variance, a median, a range, and/or other statistical aspect may be computed from any of the various detected object data described herein, such as a statistic on depth, visibility, orientation, etc.

The feature determiner 110 may determine one or more features from one or more regions of the sensor data applied to the object detector 106, such as spatial element regions (or detected object regions) that correspond to the detected object(s) or aggregated detected object(s) described above. For example, where it is described herein that a statistic may be computed based at least in part on a detected object region, that statistic may be computed from corresponding input pixels or portions of sensor data (e.g., to the object detector 106) and/or features in the object detector 106 (e.g., NN layers, such as one or more output or CNN layers).

For example, the feature determiner 110 may analyze pixels of an image(s) used to determine the cluster to determine a feature value(s). Additionally or alternatively, the feature determiner 110 may provide at least some of those pixels or spatial element regions (or detected object regions) or pixels derived therefrom to one or more convolutional layers as features of the confidence score generator 112 (in examples where the confidence score generator 112 includes a convolutional layer). Additionally or alternatively, these features may be computed from features of the object detector 106, such as from features of one or more of the CNN layers (e.g., the last layer before the output layer(s) 330 of the object detector 306). One such example of a statistic that may be computed for a detected object region includes a HOG. This may be computed (e.g., directly) from corresponding elements of the last CNN before the output layer(s) 330 and/or from corresponding input pixels to the object detector 106. Statistics and/or features (e.g. non-statistical) for detected object regions (or aggregated detected object regions) may correspond to color, chroma, luma, pixel, and/or other data values for those regions. Further, any of the various statistical types described herein (e.g., variance, mean, etc.) and may be computed from any of those data values or other corresponding values of the regions.

Any of the various statistics herein may be weighted by, for example, the associated coverage values and/or detected object regions for the detected objects. For example, the feature determiner 110 may weight a height, a width, an area, or a center point or midpoint for a detected object by its coverage value in computing a variance for the cluster. Any other feature or element thereof described herein may be weighted similarly when computed from detected objects of a cluster. Further, any of the various features of element(s) thereof described herein for determining a confidence score for a cluster may be computed using detected objects that may or may not be part of the cluster. As an example, the variance or other statistic for a feature could be for each detected object (or subset thereof) from the object detector 106, each detected object (or subset thereof) after filtering by the detected object filter 116A, and/or each detected object (or subset thereof) of one or more other clusters.

In some examples, a feature may be based at least in part on a feature map of the coverage values of the object detector 106. For example, an entire coverage feature map could be provided as a feature (e.g., as an activity map). In one example, a feature may be based at least in part on a sum of the coverage values provided by the object detector 106 that correspond to each cluster determined by the detected object clusterer 108.

The feature determiner 110 may in some examples determine at least one feature for the confidence score generator 112 based at least in part on inertial measurement unit (IMU) output data associated with at least one sensor that provides the sensor data that may be used by the object detector 106 to detect objects. For example, the IMU may be of the vehicle 1500. As another example, where the sensor data is from a handheld video camera or other device, the IMU may be of that device. The IMU output data may, for example, be correlated with or correspond to an orientation of the device in the environment.

While distance data for a detected object and/or an aggregated detected object is described herein as potentially being a predicted or inferred output of the object detector 106, the distance, depth, or 3D location of a detected object and/or an aggregated detected object may be derived in other manners. For example, the distance data may be determined from the object detector 106, another machine learning model(s), and/or at least one sensor, such as a LIDAR sensor(s), a RADAR sensor(s), and/or a stereo camera(s) (e.g., of the vehicle 1500). In some examples, the distance data may be representative of a distance that is measured using at least one of the sensors. Distance data derived using any combination of these approaches may be used by the feature determiner 110 to determine a distance-based feature for the confidence score generator 112.

The feature determiner 110 may in some examples determine at least one feature for the confidence score generator 112 based at least in part on a ground plane estimate of the environment 202. This ground plane estimate may be determined, for example, by a subsystem of an advanced driver assistance system (ADAS) of the vehicle 1500 that is separate from the object detection system 100. Using a ground plane estimate, the confidence score generator 112 may learn to detect false positives for detected objects with respect to a ground plane, such as that cars or other ground-based objects are typically adjacent to the ground plane.

In some examples, the feature determiner 110 may determine one or more of the features based at least in part on any of the various factors described herein across frames (e.g., video frames) and/or images, such as in a time-domain. For example, the object tracker 114 may associate aggregated detected objects and/or detected objects across frames (e.g., clusters and/or clusters that have a confidence score that exceeds a threshold value). This may include the object tracker 114 determining at least a first detected object and a second detected object are a same object(s) depicted across sequential frames represented by the sensor data and/or image data. The object tracker 114 may further compute at least one value of the same object(s) based at least in part on the first detected object and the second detected object. This value may be computed for the same object(s) across any number of frames, and may be updated over time as new frames may be generated. One or more of the features may be based at least in part on the at least one value.

As an example, the at least one value may correspond to a number of frames in which the tracked object(s) (e.g., that corresponds to the cluster for which the confidence score is being computed) has been detected. For example, the at least one value may correspond to a covariance of a state estimate of the tracked object(s) (e.g., visibility state, etc.). The state estimate may be provided by a probabilistic state estimator for the objects, such as a Kalman Filter. Further examples include statistics of features and/or values within the detected object regions of the tracked object(s). For example, any of the various statistics and features described herein that involve multiple detected objects (e.g., of the same cluster) could be used as a feature or for a feature that corresponds to the tracked object(s) (e.g., by similarly analyzing the detected object data across frames for the same object(s)).

Further examples include the value(s) corresponding to correlation of the tracked object(s) with a model of object appearance. For example, the value could indicate how similar the tracked object and/or portions thereof appear across frames. The value(s) may additionally or alternatively correspond to estimated kinematics of the tracked object and/or trajectories of the tracked object.

Examples of Training a Machine Learning Model(s) for Object Detection

The object detector 106 (or the object detector 306) may be trained using various possible approaches. In some examples, the object detector 106 may be trained in a fully supervised manner Training images together with their labels may be grouped in minibatches, where the size of the minibatches may be a tunable hyperparameter, in some examples. Each minibatch may be passed to an online data augmentation layer which may apply transformations to images in that minibatch. The data augmentation may be used to alleviate possible overfitting of the object detector 106 to the training data. The data augmentation transformations may include (but are not limited to) spatial transformations such as left-right flipping, zooming-in/-out, random translations, etc., color transformations such as hue, saturation and contrast adjustment, or additive noise. Labels may be transformed to reflect corresponding transformations made to training images.

Augmented images may be passed to the object detector 106 to perform forward pass computations. The object detector 106 may perform feature extraction and prediction on a per spatial element basis (e.g., prediction of object classes, bounding boxes, and/or other outputs on a per grid square basis). Loss functions may simultaneously measure the error in the tasks of predicting the various outputs (e.g., the object coverage for each object class and regressing object bounding box coordinates, or more generally in all tasks when additional outputs are included).

The component losses for the various outputs may be combined together in a single loss function that applies to the whole minibatch (see further discussion of potential cost functions). Then, backward pass computations may take place to recursively compute gradients of the cost function with respect to trainable parameters (typically at least the weights and biases of the object detector 106, but not limited to this as there may be other trainable parameters, e.g. when batch normalization is used). Forward and backward pass computations may typically be handled by a deep learning framework and software stack underneath.

A parameter update for the object detector 106 may then take place. An optimizer may be used to make an adjustment to trainable parameters. Examples include stochastic gradient descent, or stochastic gradient descent with a momentum term. The main hyperparameter connected to the optimizer may be the learning rate. There may also be other hyperparameters depending on the optimizer.

Images in the dataset may be presented in a random order for each epoch during training, which may lead to faster convergence. An epoch may refer to the number of forward/backward pass iterations used to show each image of the dataset once to the object detector 106 under training. The whole process 'forward-pass—backward-pass—parameter update' may be iterated until convergence of the trained parameters. Convergence may be assessed by observing the value of the loss function decrease to a sufficiently low value on both the training and validation sets, and determining that iterating further would not decrease the loss any further. Other metrics could be used to assess convergence, such as average precision computed over a validation set.

During training, validation may be performed periodically. This may involve checking the average values of the loss function over images in a validation set (separate from the training set). Additionally, other metrics may be used to assess the convergence of the learning process. For instance, end-to-end metrics may be computed based on final clustered detections. To that end, the rest of the post-processing pipeline may be applied as part of the validation process. A metric that may be used for at least some outputs is an Average Precision (AP) metric. Other outputs may have other associated metrics. During validation one or more metrics may be computed to measure the performance of the object detector 106 against the validation dataset.

As mentioned herein, each of the outputs of the object detector 106 (e.g., of the output layer(s) 330 or otherwise discussed herein) may be associated with a separate loss function used for training. Any suitable loss function(s) may be used. Examples of suitable loss functions follow:

$$L(y,x)=|y-f_w(x)| \tag{L1}$$

$$L(y,x)=(y-f_w(x))^2 \tag{L2}$$

$$L(y,x)=-y\,\log(f_w(x))-(1-y)\log(1-f_w(x)) \quad \text{(Binary Cross-Entropy)}$$

In the above equations, the ground truth is denoted by y, the object detector 106 output with weights W for input x is denoted by $f_w(x)$.

As examples, a weighted (L1) loss function may be used for the location data 310 (e.g., bounding box coordinates), a weighted (Binary Cross-Entropy) or (L2) loss function may be used for the coverage data 312 (e.g., a coverage value), a weighted (L1) loss function may be used for the orientation data 316 (or the orientation data 318) and the depth data 314, and a weighted (L2) loss function may be used for the height visibility data 320, and the width visibility data 322 (e.g., occlusion/truncation flags).

For the individual cost functions, an example of a suitable weighting scheme may include, for positive and negative spatial elements (e.g., grid cells), which may refer to those containing and not containing ground truth targets respectively, weighting those spatial elements differently when calculating the overall cost function. For example, having a larger weight on the negative spatial elements than the positive spatial elements may result in the network learning "empty" space (e.g., absence of object of interest) better, resulting in less false positive detections. This approach may be used for the coverage data 312.

Another example of the individual cost functions, includes, for the individual spatial elements (e.g., grid cells), weighting the loss by the corresponding (normalized) coverage because ground truth exists for the output only in the spatial elements where coverage ground truth is larger than zero. In spatial elements where coverage ground truth is zero, the loss for the output may hence go to zero. This approach may be used for all other outputs aside from the coverage data 312.

After being weighted, the losses may be averaged over the spatial elements (and detected object region coordinates in case of a detected object region) to end up with a single scalar loss for each output and each target class. Additionally, in multi-head networks there may be different scalar losses corresponding to each head. For training purposes, these individual losses may then combined into a single scalar as further described herein.

As described herein, in some examples there may be separate loss/cost values for each combination of output, target class, and head of the object detector 106. These cost components may be weighted and summed into a single scalar for network training purposes. One approach to the weighting may be to select a fixed set of weights and perform a simple weighted sum of the cost components. Using this approach it may be challenging to appropriately set the weights, as the number of different weight parameters may be large. This may result in searching for optimum weight values through training with each possible combination, which can be a heavy burden. In some approaches equal weights may be used between target classes and also between different heads. This may result in an accurately trained network while still leaving open the choice of weights between different outputs.

In any example, a weighting scheme may be employed that includes the setting of a target ratio between the cost components. This may be interpreted as the importance of the different outputs compared to the coverage output. This may also make weight selection independent of, for example, the dataset that might otherwise impact the choice.

Without loss of generality, an auto-weight scheme is explained for the location data 310 cost, and more specifically bounding box cost. The weights for other outputs may be derived in the same way. The auto-weight scheme may adjust the cost weights adaptively/automatically when given only the target ratios for the weighted losses. The bounding box cost and corresponding cost weight can be denoted as $L_{bbox}$ and $w_{bbox}$, respectively, and the same for coverage as $L_{cov}$ and $w_{cov}$. The weights w may be chosen using:

$$K_{bbox} = \frac{L_{bbox} w_{bbox}}{L_{cov} w_{cov}}$$

where $K_{bbox}$ is the target ratio for the weighted losses. In order to make the weights sum to one, the following may be used for the bounding box and coverage weight:

$$w_{bbox} = \frac{K_{bbox} L_{cov}}{K_{bbox} L_{cov} + L_{bbox}}$$

$$w_{cov} = \frac{L_{bbox}}{K_{bbox} L_{cov} + L_{bbox}}$$

This rule may be used periodically, such as once per training epoch, to set the weights. The costs in the update rule may be calculated from the training data set to prevent overfitting to the validation data. Using this approach, the weights may be set adaptively such that after convergence the desired target ratio for the weighted losses may be achieved.

Examples of Ground Truth Generation for Object Detection

Figure 4:
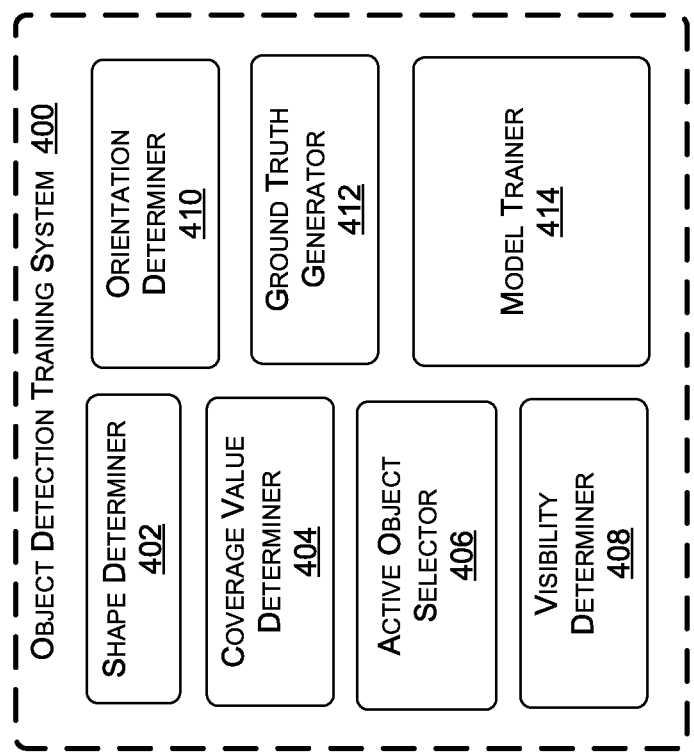
FIG. 4 is an illustration including an example object detection training system, in accordance with some embodiments of the present disclosure.

Referring now to FIG. 4, FIG. 4 is an illustration including an example object detection training system 400, in accordance with some embodiments of the present disclosure. The object detection training system 400 includes a shape determiner 402, a coverage value determiner 404, an active object selector 406, a visibility determiner 408, an orientation determiner 410, a ground truth generator 412, and a model trainer 414.

Aspects of the present disclosure provide approaches for the ground truth generator 412 to generate ground truth data that may be used by the model trainer 414 to train machine learning models for object detection. For example, the ground truth data may be used to train the object detector 106, the object detector 306, or another machine learning model. Further, the ground truth data may be used by the model trainer 414 in combination with any of the various approaches to training described herein, or using other different training approaches. Further while ground truth tensors and output tensors (e.g., of an object detector) may be described as examples, those terms may more generally apply to ground truth data and output data.

For the model trainer 414 to form differentiable loss functions for training outputs of a machine learning model (e.g., the object detector 106), the ground truth generator 412 may form ground truth tensors that are of the same shape as output tensors of the object detector 106. In a more general sense, ground truth data generated by the ground truth generator 412 may include the same, similar, or corresponding elements as the output data of a model being trained. In some examples, the ground truth generator 412 forms the ground truth data using ground truth object labels, which each may correspond to an object depicted in a training image (or more generally a training frame). As examples, an object label for an object (e.g., a ground truth object) may include data representative of any combination of the various outputs from the output layer(s) 330 of the object detector 306 or otherwise described herein with respect to detected object data (e.g. for a spatial element). As an example, an object label could include a location of the object (e.g., an object region, which may be in the form of coordinates), along with other attributes of the object that are to be predicted by the object detector 106, such as (but not limited to) class identifier, distance to the object, orientation of the object, occlusion or visibility state (e.g., height and width) of the object, etc.

Disclosed approaches to ground truth generation may improve the accuracy of object detection using the object detector 106 by allowing the coverage value determiner 404 to associate an object (e.g., object label), such as a ground truth object region of the object, with multiple spatial element regions (e.g., using an elliptical or other shaped ground truth that corresponds to multiple spatial element regions) for training Using this approach, the coverage value determiner 404 may assign coverage values for a ground truth object to multiple spatial elements in the ground truth data (e.g., guided by a shape determined by the shape determiner 402).

Once trained, the object detector 106 may tend to provide multiple positive detections for different spatial elements that correspond to the same object represented in the sensor data (e.g., the image data). A positive detection may refer to a detected object that has a coverage value that exceeds a threshold value, or that may otherwise correspond to an aggregated detected object (e.g., that remains after the detected object filter 116A and/or the detected object clusterer 108). For example, in FIG. 2A, a positive detection region 240 is shown that corresponds to the object 248A. The positive detected region 240 may form an elliptical detection region in examples where an ellipse was used as a shape for training the object detector 106. Thus, the coverage values output by the object detector 106, once trained, may be highly indicative of shapes used to train the object detector 106.

Additionally or alternatively, disclosed approaches to ground truth generation may improve the accuracy of object detection using the object detector 106 by allowing the coverage value determiner 404 to associate soft coverage values (e.g., in a range from 1 to 0) with spatial element regions in ground truth data used to train the object detector 106. This may be used to train the object detector 106 to provide higher confidence values for some spatial element regions than others in various scenarios in which may be difficult for the object detector 106 to provide a definitive prediction. In various examples, the coverage value determiner 404 may account for these scenarios when determining coverage values for the spatial elements during training.

As mentioned, the coverage value determiner 404 may associate an object (e.g., object label), such as a ground truth object region of the object, with multiple spatial element regions (e.g., using an elliptical or other shaped ground truth that corresponds to multiple spatial element regions) for training. The coverage value determiner 404 may use the shape determiner 402 to determine which of the spatial element regions of a training image to associate with the object.

Figure 5A:
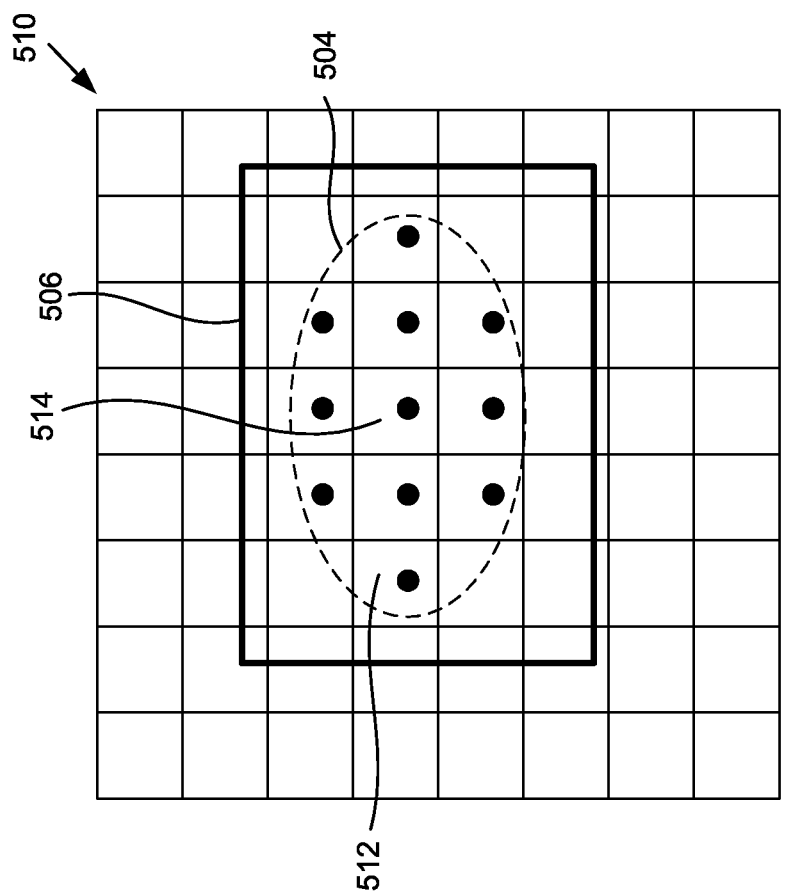
FIG. 5A is an illustration including an example of a shape and object region that may be used to assign coverage values to spatial element regions, in accordance with some embodiments of the present disclosure.

Referring now to FIG. 5A, FIG. 5A is an illustration including an example of a shape 504 and an object region 506 that may be used to assign coverage values to spatial element regions, in accordance with some embodiments of the present disclosure. The shape determiner 402 may determine a location and dimensions of the shape 504 relative to spatial element regions 510 of a training image (and/or ground truth tensor). Each spatial element region may be represented as a cell in a grid, by way of example, which may correspond to a sub-region of the grid of spatial element regions of FIG. 2A. The coverage value determiner 404 may determine and assign coverage values to one or more of the spatial element regions 510 based at least in part on the one or more spatial element regions corresponding to at least a portion of the shape (e.g., a portion of the shape is within the spatial element region). For example, the spatial element regions 510 that correspond to at least a portion of the shape 504 are indicated in FIG. 5A by a point within the corresponding cell.

The coverage value determiner 404 may assign a hard or soft coverage value to any of these spatial element regions based at least in part on the spatial element regions corresponding to the shape 504. The coverage value determiner 404 may use this approach for any number of ground truth objects and corresponding shapes, such that spatial element regions that correspond to at least one shape may have higher coverage values than spatial element regions that do not correspond to any shape and/or ground truth object (e.g., the other spatial element regions may be assigned zero when they do not correspond to any ground truth object).

The ground truth generator 412 may populate elements of the ground truth data (e.g., ground truth tensor) that correspond to the spatial element region(s) of the training image with the associated coverage value(s). The ground truth generator 412 may also populate at least one element of the ground truth data that corresponds to the object region (or more generally object location) and/or other ground truth output data with at least one corresponding value that is representative of the ground truth object data (e.g., at least one object region value, such as bounding box coordinates).

The shape determiner 402 may determine (e.g., compute) a location(s) and/or a dimension(s) of a shape based at least in part on (e.g., as a function of) the object region associated with the object and/or other attributes of the ground truth object data (e.g., class ID, orientation, etc.). For example, the shape determiner 402 may compute a size(s) for the shape 504 based at least in part on a dimension(s) of the object region 506. The shape 504, for example, may be a geometric shape, and the dimension(s) of the object region 506 may define one or more of the dimension(s) of the shape 504. For example, the shape 504 may be an ellipse, and the shape determiner 402 may compute the size of the ellipse based at least in part on a height and/or width of the object region 506. As an example, the y-radius r of the ellipse may be computed as r=max(minimum_radius, shape_scale*bounding_box_height/2). The parameter minimum_radius may represent a minimum radius for the ellipse (or other dimension for another shape). The parameter shape_scale may represent a scale factor for the ellipse. Further, the bounding_box_height may represent a height of the object region 506. The shape_scale and minimum_radius may be used as tunable hyperparameters.

In examples where the shape 504 is not an ellipse, a different formula may be used to compute the size of the shape. For example, the shape 504 may be a circle (e.g., a special case of an ellipse), a rectangle, and/or a super-ellipse. In various examples, a same shape may be used for all ground truth objects, or different shapes may be used. For example, the shape determiner 402 may select a shape type for the shape based at least in part on any of the various attributes associated with the object, such as a shape type of the object region, a class of the object (or subclass), a distance to the object, an orientation of the object, an occlusion state of the object, etc. Thus, for example, different classes may be associated with different shapes, such as ellipses for cars and rectangles for pedestrians. Additionally or alternatively, the shape determiner 402 may use different functions and/or parameters to compute the shape based on any combination of the object attributes (e.g. the minimum_radius or other similar parameter could be smaller for pedestrians than vehicles).

Also, while predefined shapes are described, in some examples, a shape may correspond to a shape of an object depicted in a training image. For example, the shape may have boundaries that correspond to boundaries of the depicted object. Portions of the shape may correspond to portions of the object depicted in the training image. In some examples, the shape may have been drawn over the object, and/or may correspond to a mask of the object (e.g., at least of the depicted portion thereof).

The shape determiner 402 may also determine (e.g., compute) a location(s) of a shape based at least in part on (e.g., as a function of) a location(s) of the ground truth object (e.g., of the object region associated with the object and/or other attributes of the ground truth object data (e.g., class ID, orientation, etc.). The shape determiner 402 may determine the location of the shape such that the shape 504 is included, at least partially within (e.g., completely within) the object region 506. For example, the shape determiner 402 may set a center and/or midpoint of the shape 504 to correspond to a center and/or midpoint of the object region 506. By setting a location of the shape 504 to a location within the object region 506, the shape determiner 402 may ensure the shape 504 is at least partially within the object region 506 by configuring size computation accordingly. Further, the shape determiner 402 may in some examples ensure the shape is completely within the object region 506. This may be ensured by the functions used to set the location and compute the size of the shape (e.g., so that dimensions are fractions of the object region 506 dimensions). As other examples, the shape determiner 402 could crop the shape to the object region 506 or otherwise fit the shape to the object region 506.

In some examples the coverage value determiner 404 may use the shape determiner 402 to assign and/or determine coverages values for spatial element regions of training images without using soft coverage values. In other examples, the coverage value determiner 404 may use the shape determiner 402 to assign and/or determine coverages values for spatial element regions of training images while using soft coverage values. In such examples, the coverage value determiner 404 may determine a soft coverage value for a spatial element region based at least in part on the particular portion of the shape that corresponds to the spatial element region. For example, a soft coverage value for the spatial element region 512 may be based at least in part on the spatial element region 512 corresponding to a boundary of the shape 504. A coverage value (e.g., a soft or hard coverage value) for the spatial element region 514 may also be based at least in part on the spatial element region 514 corresponding to an interior of the shape 504. As an example, spatial element regions that correspond an interior of a shape may be assigned a highest coverage value and spatial element regions that correspond to a border or boundary of the shape may be assigned a lower coverage value (e.g., greater than zero).

Figure 5B:
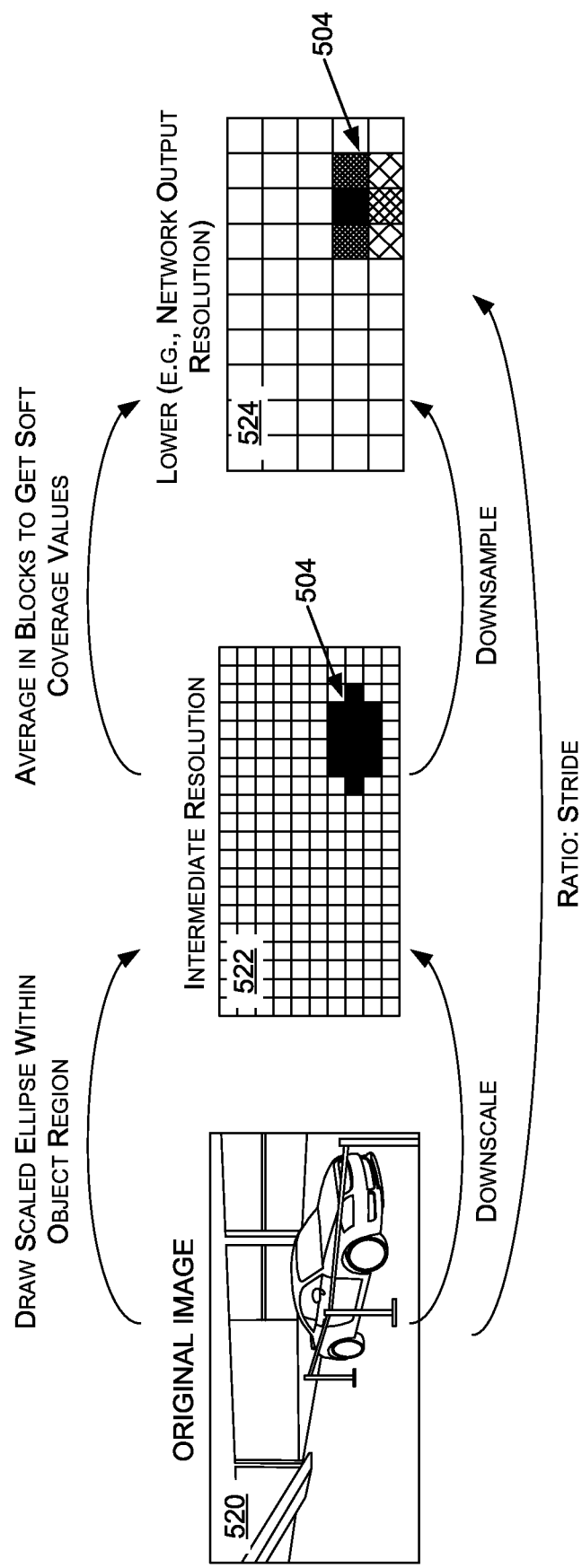
FIG. 5B is an illustration including an example of determining coverage values for spatial element regions, in accordance with some embodiments of the present disclosure.

FIG. 5B is an illustration including an example of determining coverage values for spatial element regions, in accordance with some embodiments of the present disclosure. The coverage value determiner 404 may use approaches described with respect to FIG. 5B to determine one or more coverages values for one or more spatial element regions in a training image. FIG. 5B shows a training image 520, which may comprise the spatial element regions 510 of FIG. 5A. The coverage value determiner 404 may render at least some of the shape 504 in image data 522 at a higher spatial resolution than is used to represent the spatial elements in the ground truth data (e.g., a higher spatial resolution than a ground truth tensor represented by the ground truth data). For example, the image data 522 may be representative of a tensor that has higher spatial resolution than an output tensor of the object detector 106 (but possibly lower than the training image 520). The coverage value determiner 404 may then downscale (e.g., downsample) the shape rendered in the image data 522 to a lower spatial resolution (e.g., of the ground truth tensor/output tensor) to generate image data 524 representative of at least an anti-aliased portion of the shape 504 (e.g., using a downscale ratio). The downscaling operation may automatically anti-alias the shape 504, in some examples.

The coverage value determiner 404 may determine coverage values for the spatial element regions that correspond to the shape 504 based at least in part on the anti-aliased values or elements of the shape 504. For example, where the image data 524 has the same resolution as the ground truth data, the anti-aliased values or elements of the shape 504 may have a one-to-one correspondence with coverage values (e.g., the more transparent the pixel, the lower the coverage value). Using this approach, portions toward the interior of the shape 504 may be not be anti-aliased, or otherwise may still represent high coverage values, while portions toward boundaries or borders of the shape 504 may be anti-aliased, representing lower coverage values. In other examples, one or more anti-aliased values may be directly computed without rendering the shape 504 at an intermediate resolution. Further, anti-aliased values may be computed for particular portions of the shape 504 (e.g., boundary portions), without computing all values of the shape 504 in some examples (e.g., hard coverage values may be used for interior portions of the shape 504).

The coverage value determiner 404 may determine anti-aliased values using any suitable approach, such as super-sample anti-aliasing, multisample anti-aliasing, fast approximate anti-aliasing, coverage sample anti-aliasing, and temporal sample anti-aliasing (e.g., based on multiple frames of sensor data). Also, while one shape 504 is shown, any number of shapes may similarly be included in the image data 522 and the image data 524 to generate anti-aliased values for multiple shapes in parallel.

Figure 6:
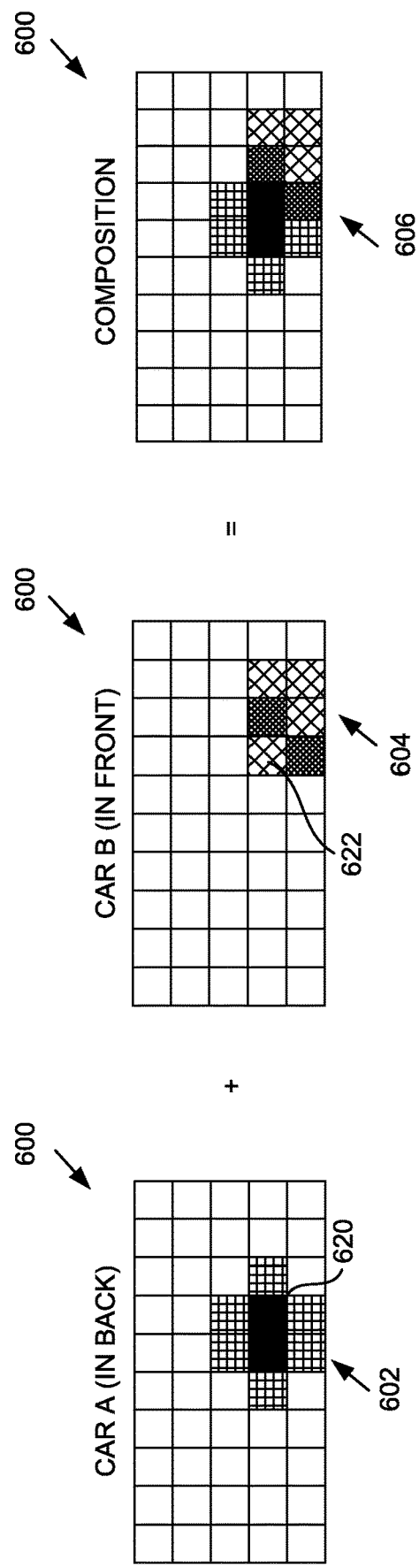
FIG. 6 is an illustration including an example of determining coverage values for spatial element regions that correspond to multiple objects, in accordance with some embodiments of the present disclosure.

In some examples, the coverage value determiner 404 may determine that more than one ground truth object and/or object region corresponds to the same spatial element region(s). This may be based at least in part on, for example, determining the spatial element region(s) depict a portion of each object. Additionally or alternatively, this may be based at least in part on determining shapes for each object at least partially overlap in the spatial element region(s). Referring now to FIG. 6, FIG. 6 is an illustration including an example of determining coverage values for spatial element regions that correspond to multiple objects, in accordance with some embodiments of the present disclosure. FIG. 6 shows spatial element regions 600 of a training image along with different potential coverage values that the coverage value determiner 404 may determine for the spatial element regions 600. In particular, FIG. 6 shows coverage values 602, coverage values 604, and coverage values 606. The coverage values 602 may correspond to coverage values that the coverage value determiner 404 may determine for a first ground truth object and/or object region (e.g., using the shape determiner 402). The coverage values 604 may correspond to coverage values that the coverage value determiner 404 may determine for a second ground truth object and/or object region (e.g., using the shape determiner 402). The coverage values 606 may correspond to coverage values that the coverage value determiner 404 may use to populate ground truth data. The coverage values 602 may correspond to an object that is depicted behind an object that correspond to the coverage values 602 in the sensor data and/or image data. Further the object corresponding to the coverage values 604 may partially occlude the object corresponding to the coverage values 602 (e.g., one object may be in front of the other).

As indicated in FIG. 6, the coverage value determiner 404 may determine that the object and/or object region that corresponds to the coverage values 602 and the object and/or the object region that corresponds to the coverage values 604 correspond to the same spatial element region(s). In such scenarios, the coverage value determiner 404 may use the active object selector 406 to select an active object from the multiple ground truth objects and/or object regions and assign a coverage value to the spatial object region(s) based at least in part on the active object. For example, the coverage value determiner 404 may use the coverage value of the active object as the coverage value of the spatial object region(s). As another example, the coverage value for the active object may be combined with the coverage value of at least one other conflicting object, but may be given greater weight (e.g., using a weighted average).

Using the active object selector 406, the coverage value determiner 404 may assign the coverage values 606 to the spatial element regions 600. The coverage values 606 may be selected from the coverage values 602 and/or the coverage values 604, and/or may be generated from coverage values 602 and/or the coverage values 604. In the example shown, the active object selector 406 may select an active object for each spatial element region, and the coverage value determiner 404 may use the coverage value for the selected object as the coverage value for the coverage values 606. In other examples, the active object selector 406 may select an active object for multiple spatial element regions (e.g., all of the spatial element regions that correspond to the objects), rather than selecting the spatial element regions individually.

The coverage values 602 and the coverage values 604 may include soft and/or hard coverage values and may be determined using approaches described herein, or other approaches. Further while the coverage values 602 and the coverage values 604 each comprise multiple coverage values, the coverage value determiner 404 may use the active object selector 406 to determine a coverage value for a spatial element region where each object and/or object region corresponds to a single spatial element and coverage value. In these examples, the coverage value determiner 404 may not necessarily use the shape determiner 402. For example, the coverage value determiner 404 may use a single coverage value for each object and/or object region (e.g., for the midpoint of the object region). Also, while the coverage values 602 and the coverage values 604 are shown, at least some of those values need not be computed by the coverage value determiner 404. For example, where the coverage value of an active object is used as the coverage value for a spatial element region, a coverage value for a non-active object may not need to be computed.

The active object selector 406 may select an object as an active object based at least in part on one or more attributes and/or criteria associated with the object and/or other objects that correspond to the same spatial element region(s). Examples include, without limitation, the coverage value(s) for the object(s), a class identifier(s) of the object, a distance(s) to the object(s), an orientation(s) of the object(s), and/or an occlusion state(s) (e.g., height and width) and/or occlusion amounts of the object(s), etc. As further examples, at least one of any of the various attributes of the objects may be analyzed by the active object selector 406 across training images (e.g., sequentially and/or in a time domain).

As examples, the active object selector 406 may select an object as an active object based at least in part on the coverage value (e.g., a soft or hard coverage value) for the object being greater than the coverage value (e.g., a soft coverage value) for another object that corresponds to the spatial element region(s). The coverage values 606 may correspond to a result of using such as approach. Additionally or alternatively, the active object selector 406 may select an object as an active object based at least in part on determining the object is depicted closer in the image data than the other object that corresponds to the spatial element region(s). This may be determined, for example, from the distance ground truth data associated with each object. For example, this criteria may be used to resolve ties and may be determined by looking at the distance ground truth value of the object labels. In examples, the active object may be selected (e.g., to resolve ties) based at least in part on determining the bottom edge its object region is closest to a bottom edge of the training image (e.g., where distance information is unavailable). This approach may approximate the distance-based criteria, such as when a ground plane or surface is approximately planar, a camera that captured the training image is upright, and the objects rest on the ground plane surface.

Using the active object selector 406, the coverage value determiner 404 may in some examples form a dead-zone area around at least some of the shape that corresponds to the active object when determining coverage values based on the active object. Where the active object selector 406 is used to select objects for both determining a dead-zone area and determining a coverage value, different rules or criteria may be used for each task. The dead-zone area may be used to spatially separate, in the ground truth data, coverage values that correspond to the active object from coverage values that correspond to a non-active object associated with the training image. This may train the object detector 106 to more reliably disambiguate nearby objects.

Figure 7:
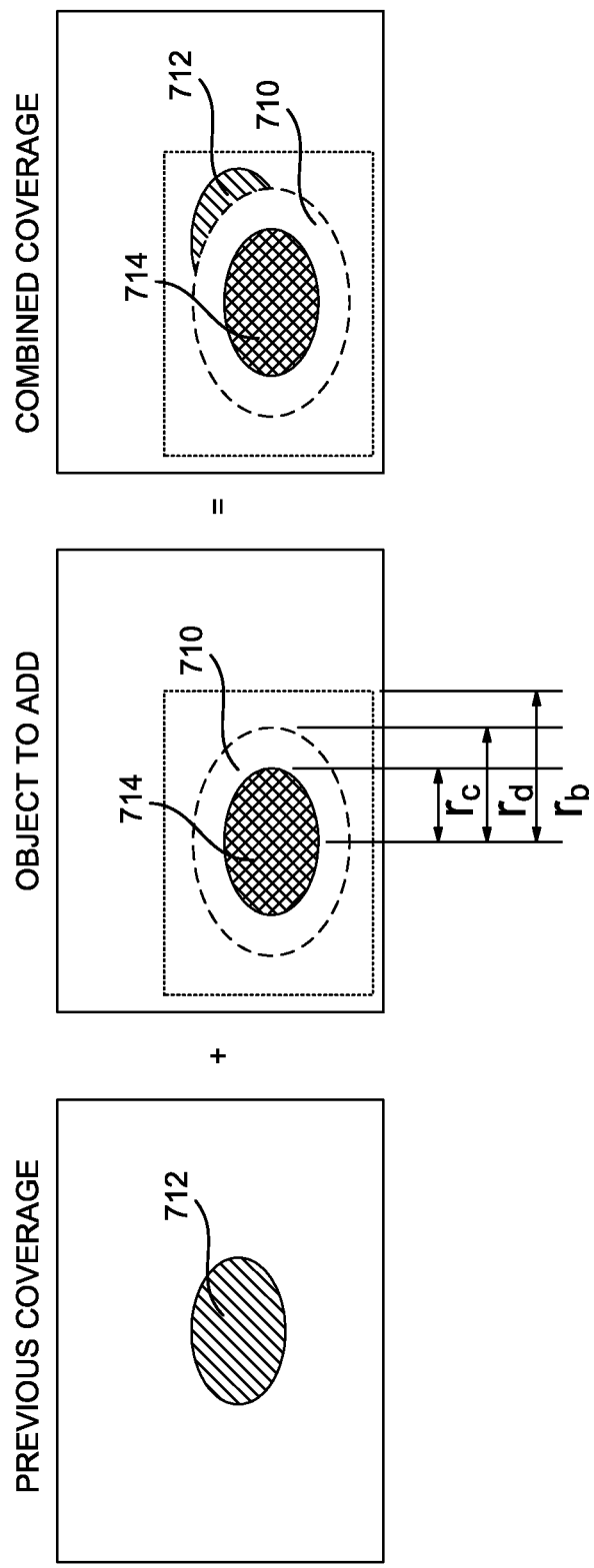
FIG. 7 is an illustration including an example of determining coverage values for spatial element regions using a dead-zone area, in accordance with some embodiments of the present disclosure.

Referring now to FIG. 7, FIG. 7 is an illustration including an example of determining coverage values for spatial element regions using a dead-zone area 710. In FIG. 7, a shape 712 may correspond to a non-active object and a shape 714 may correspond to an active object. The shape 712 and the shape 714 may partially overlap one another spatially. Based at least in part on the shape 714 corresponding to an active object, the coverage value determiner 404 may determine the dead-zone area 710 at least for portions of the shape 714 that intersect with or are adjacent to the shape 712 (e.g., within a defined distance). The coverage value determiner 404 may determine a coverage value for a spatial element region(s) based at least in part on the spatial element region corresponding to the dead-zone area. For example, for spatial element regions that correspond to a dead-zone area, the coverage value determiner 404 may assign a default value (e.g., zero) or may compute a coverage value that is lower than the coverage value would have been had the spatial element region not corresponded to the dead-zone area (e.g., using a reduction weight for the coverage value computation). Using such an approach, the coverage values 606 may have included an additional region of zero or reduced coverage values for a dead-zone area. The distance of a dead-zone area from a boundary of a shape of an active object may be a fixed or computed value (e.g., based on a size or dimension of one or more of the shapes). For example, the shape of the dead-zone area may be a parametric function of the shape and/or object region of the object.

As an example of the operation of the object detection training system 400, for every spatial element of the ground truth data (e.g., an output ground truth tensor), the coverage value determiner 404 may compute coverage values for every object in the image in the spatial element region of the training image that corresponds to the spatial element. The active object selector 406 may analyze these coverage values to select an active object as the object with the highest coverage value in the spatial element region. If there is a tie (for soft coverage values), or coverage values are substantially similar (e.g., within a defined range of one another), the object that is closest to the camera may be selected. The ground truth generator 412 may store the coverage value of the active object to corresponding element(s) of the ground truth data. Further, the ground truth generator 412 may store one or more values that define the object region of the active object to corresponding element(s) of the ground truth data. The ground truth generator 412 may also store any other ground truth attributes associated with the active object to corresponding elements of the ground truth data for the spatial element.

To determine the ground truth values corresponding to the object region, the ground truth generator 412 may determine the edges of the object region. For example, bounding box edges may be determined from a ground truth label that is defined as four values [L, T, R, B] that are the coordinates of the left (L), top (T), right (R), and bottom (B) edges of a bounding box given, for example, in the output pixel space. Assume for this example that that the spatial element center coordinates are X and Y. The ground truth values for bounding box outputs may include at least four values [B1, B2, B3, B4], obtained by applying functions to the label coordinates and spatial element center coordinates. These functions may be parametric, and may include parameters that are hyperparameters of a training procedure tuned and cross validated for output accuracy of the object detector 106. Examples of the functions are:

$$B1=k1*(X-L)$$

$$B2=k2*(Y-T)$$

$$B3=k3*(R-X)$$

$$B4=k4*(B-Y),$$

where k1, k2, k3 and k4 are tunable hyperparameters. These functions may be configured such that the ground truth values encode scaled distances between the object edges and spatial element center. In other examples, the ground truth values may encode a position of the object region center relative to the spatial element center, along with the height, width, and/or other dimensions of the object region. In general, for the bounding box example and given the spatial element center, any one-to-one mapping between [L, T, R, B] and [B1, B2, B3, B4] may be used.

Where the ground truth generator 412 uses distance data to train the object detector 106, a ground truth value(s) for object distance may be formed by applying a function to the distance between the object and the camera. The function may be parametric in a similar fashion as the functions used for bounding box coordinates described herein. For example, the function may comprise D=k_Dpostlog*log (k_Dprelog*distance_to_object), where k_Dpostlog and k_Dprelog are tunable hyperparameters and log denotes the logarithmic function.

Where the ground truth generator 412 uses orientation data to train the object detector 106, a ground truth value(s) for object orientation may be formed using ground truth labels that include at least front and/or rear (and/or left and/or side) markers. In some examples the object region coordinates may also be used, such as for vehicle type classes. Front and rear markers may be represented as fractions along the width of the object region, which divide the object region into a front/back+left/right side of the vehicle. The ground truth generator 412 may translate these markers to an angle.

Figure 8A:
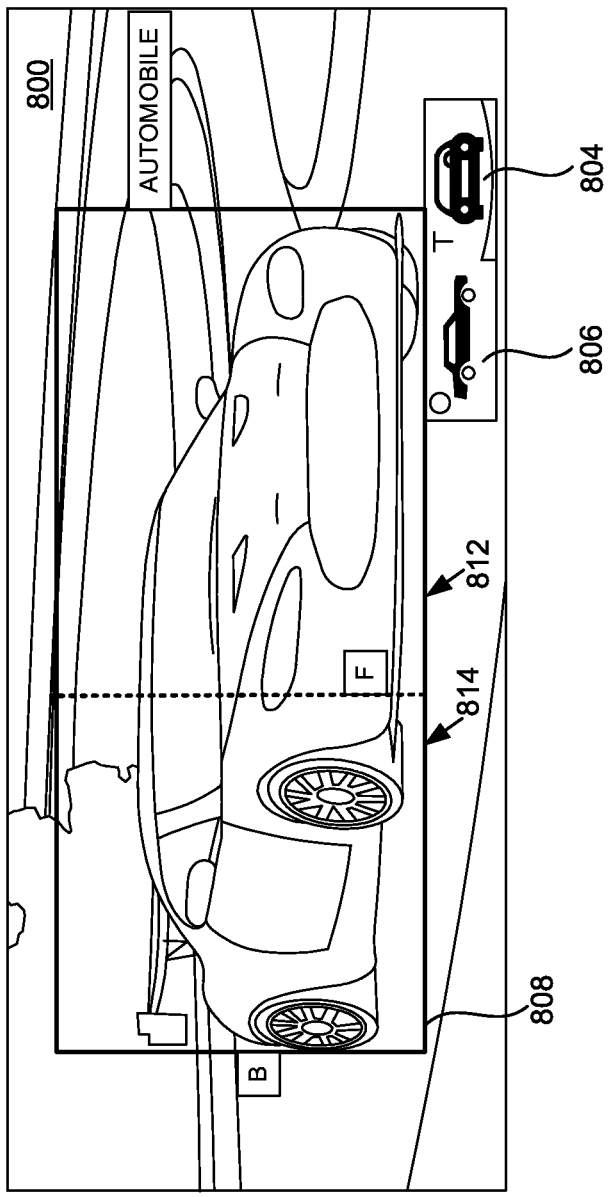
FIG. 8A is an illustration including examples of ground truth labels for a training image that may be used for determining an orientation of an object, in accordance with some embodiments of the present disclosure.

FIG. 8A is an illustration including examples of ground truth labels 804 and 806 for a training image 800 that may be used for determining an orientation of an object, in accordance with some embodiments of the present disclosure. Where only a front or a rear of the object are visible in the training image, the rear (or front) marker may be set to a flag that indicates such a position (e.g., corresponding to the ground truth label 804). In the example of FIG. 8A, the ground truth label 804 may correspond to a front marker 812, and the ground truth label 806 may correspond to a side marker 814. The markers may define fractions of an object region 808 associated with the object (e.g., an object region label). The ground truth generator 412 may use these fractions to determine the angle of the object. For example, the ground truth generator 412 may use these fractions to linearly interpolate an angle from which the camera sees the object (angles may be interpreted from a top down view). In some examples a different reference may be used for the angle.

Figure 8B:
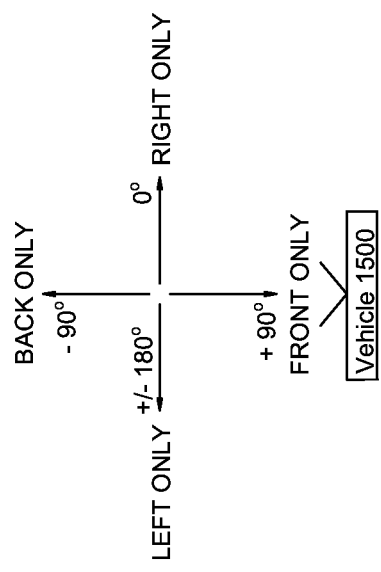
FIG. 8B is an illustration used to describe examples of determining an orientation of an object, in accordance with some embodiments of the present disclosure.

FIG. 8B is an illustration used to describe examples of determining an orientation of an object, in accordance with some embodiments of the present disclosure. If an object is seen to be directly moving away from the camera (indicated by the vehicle 1500 in FIG. 8A), with only its rear visible, then it may be assigned an angle of −90°. The angle prediction task may be framed as a regression on the sine and cosine values of this angle. These sine and cosine values may correspond to the orientation data 318 of FIG. 3. In other examples, the angle may be represented in any suitable form, such as using a single value. The ground truth generator 412 may use the same orientation values for each spatial element that corresponds to the object (e.g., active object). In contrast, in some examples, different object region coordinates may be used for spatial elements that correspond to the same object.

Figure 9:
FIG. 9 is an illustration used to describe examples of determining visibility or occlusion of an object, in accordance with some embodiments of the present disclosure.

For one or more classes, the ground truth generator 412 may set the cost weights to zero such that there is no loss for the orientation head for that class. This may be used, for example, for classes where front and rear markers are not easily added, such as pedestrians or people. It is noted that the ground truth generator 412 may not use front and rear markers in all examples, and the orientation value(s) may be determined in different ways. For example, an objects orientation may be derived from sensor data associated with the training image, such as using LIDAR 3D point clouds at the time of capture of the training image. Distance values for ground truth data may also be obtained using LIDAR sensors and/or other sensors (e.g., depth sensors) at the time of capture of the training image.

Where the ground truth generator 412 uses visibility or occlusion data to train the object detector 106, a ground truth value(s) for object visibility or occlusion may be determined from visibility flags. For example, the ground truth generator 412 may use a taxonomy of truncation and occlusion flags to determine whether an entire bottom and width of an object is covered. Referring now to FIG. 9, FIG. 9 is an illustration used to describe examples of determining visibility or occlusion of an object, in accordance with some embodiments of the present disclosure. FIG. 9 shows an occluder 904 of an object 906 and an occluder 908 of an object 910, which may be used to demonstrate different possible visibility states for width flags and bottom flags. The occluder 904 and the occluder 908 may be other objects or other elements of the environment. For the object 906, a bottom flag may indicate the bottom of the object 906 is at least partially visible and a width flag may indicate the width is partially occluded or truncated. For the object 910, a bottom flag may indicate the bottom of the object 910 is not at all visible and a width flag may indicate the width is completely visible. The visibility flag(s) of an object may be the same for each spatial element pertaining to the same object.

Figure 10A:
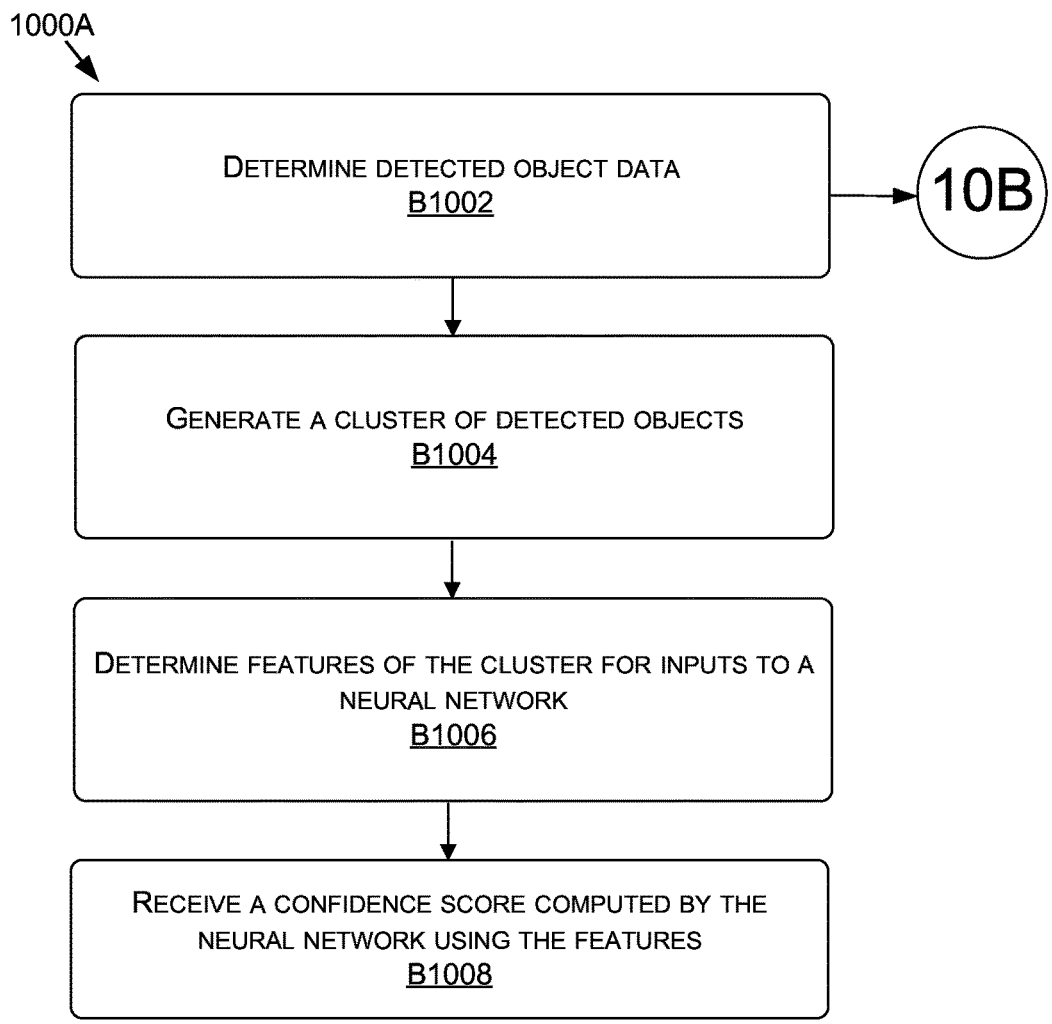
FIG. 10A is a flow diagram of a method for determining confidence scores of detected objects, in accordance with some embodiments of the present disclosure.

Now referring to FIG. 10A, FIG. 10A is a flow diagram showing a method 1000A for determining confidence scores of detected objects, in accordance with some embodiments of the present disclosure. Each block of the method 1000A, and other methods described herein, comprises a computing process that may be performed using any combination of hardware, firmware, and/or software. For instance, various functions may be carried out by a processor executing instructions stored in memory. The method 1000A may also be embodied as computer-usable instructions stored on computer storage media. The method 1000A may be provided by a standalone application, a service or hosted service (standalone or in combination with another hosted service), or a plug-in to another product, to name a few. Methods described herein may additionally or alternatively be executed by any one system, or any combination of systems, including, but not limited to, those described herein and are not limited to particular examples.

The method 1000A, at block B1002, includes determining detected object data. For example, the object detector 106 may determine, based at least in part on sensor data representative of a field of view of at least one sensor 1480, detected object data representative of locations (e.g., of the detected objects regions 250A, the detected objects regions 250B, the detected objects regions 250C, and the detected objects regions 250D) of detected objects in the field of view (e.g., of the environment 202).

The method 1000A, at block B1004, includes generating a cluster of detected objects. For example, the detected object clusterer 108 may generate a cluster of the detected objects based at least in part on the locations. Examples of four clusters may correspond to the detected objects regions 250A, the detected objects regions 250B, the detected objects regions 250C, and the detected objects regions 250D, respectively.

The method 1000A, at block B1006, includes determining features of the cluster for inputs to a neural network. For example, the feature determiner 110 may determine one or more features of the cluster that corresponds to the detected objects regions 250A and the detected object region 260A.

The method 1000A, at block B1008, includes receiving a confidence score computed by the neural network using the features. For example, the detected object filter 116B, the object tracker 114, and/or another component of the vehicle 1500 may receive a confidence score computed by the confidence score generator 112.

Figure 10B:
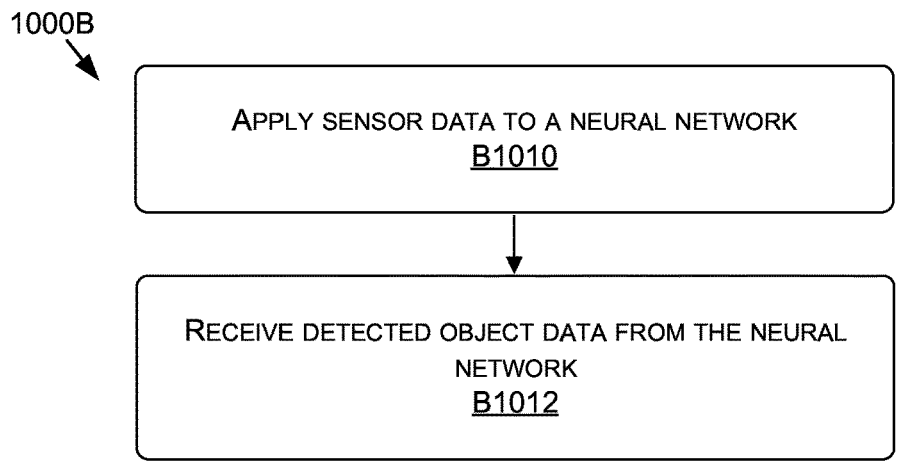
FIG. 10B is a flow diagram of a method for determining detected object data, in accordance with some embodiments of the present disclosure.

Now referring to FIG. 10B, FIG. 10B is a flow diagram showing a method 1000B for determining detected object data, in accordance with some embodiments of the present disclosure. The method 1000B may be used for block B1002 of the method 1000A.

The method 1000B, at block B1010, includes applying sensor data to a neural network. For example, the communications manager 104 may apply sensor data to the object detector 306 of FIG. 3. The sensor data may be representative of a field of view of at least one sensor 1480 of the vehicle 1500 in the environment 202.

The method 1000B, at block B1012, includes receiving detected object data from the neural network. For examples, the detected object filter 116A and/or the detected object clusterer 108 may receive the detected object data from the output layer(s) 330 of the object detector 306.

Figure 11:
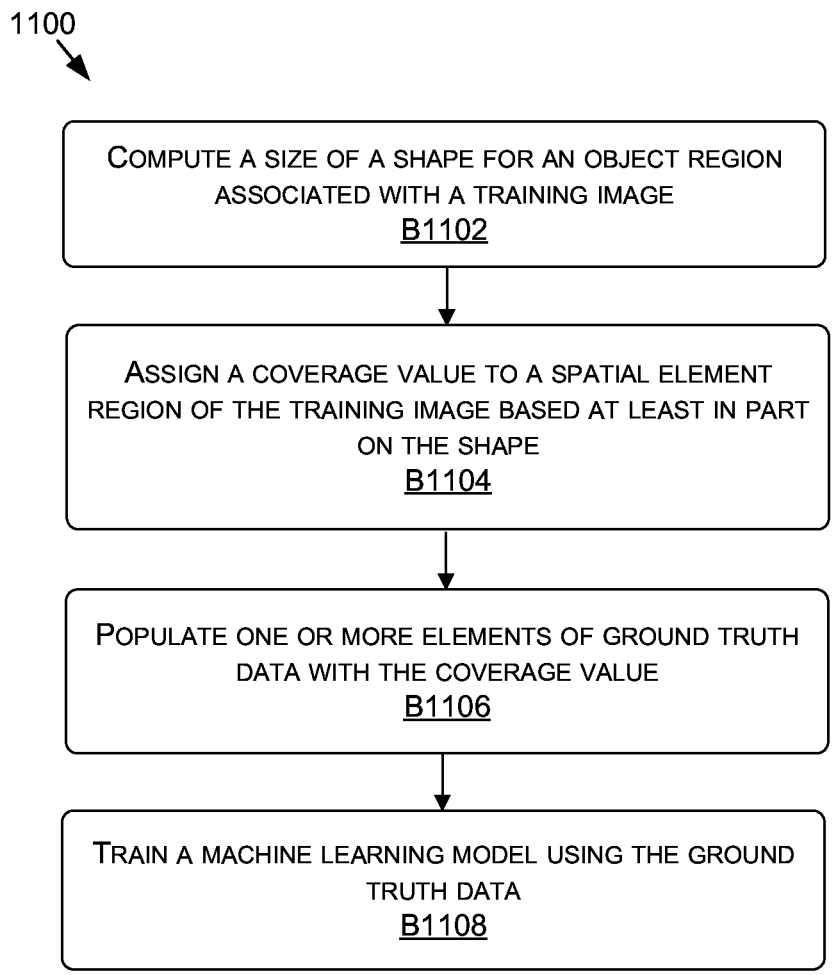
FIG. 11 is a flow diagram of a method for determining coverages values for training an object detector, in accordance with some embodiments of the present disclosure.

Now referring to FIG. 11, FIG. 11 is a flow diagram showing a method 1100 for determining coverages values for training an object detector, in accordance with some embodiments of the present disclosure.

The method 1100, at block B1102, includes computing a size of a shape for an object region associated with a training image. For example, the shape determiner 402 may computing a size for the shape 504 at least partially within the object region 506 associated with a training image for the object detector 306 based at least in part on a dimension of the object region 506.

The method 1100, at block B1104, includes assigning a coverage value to a spatial element region of the training image based at least in part on the shape. For example, the coverage value determiner 404 may assign a coverage value (e.g., a soft or hard coverage value) to the spatial element region 512 based at least in part on the spatial element region 512 corresponding to a portion of the shape 504.

The method 1100, at block B1106, includes populating elements of ground truth data with the coverage value. For example, the ground truth generator 412 may populate one or more elements of ground truth data (e.g., a ground truth tensor) that correspond to the spatial element region 512 of the training image with the coverage value. The ground truth generator 412 may also populate at least one element of the ground truth data that corresponds to the object region 506 with at least one object region value that is representative of the object region 506 (or one or more associated locations thereof).

The method 1100, at block B1108, includes training a machine learning model using the ground truth data. For example, the model training 414 may train the object detector 306 using the ground truth data.

Figure 12:
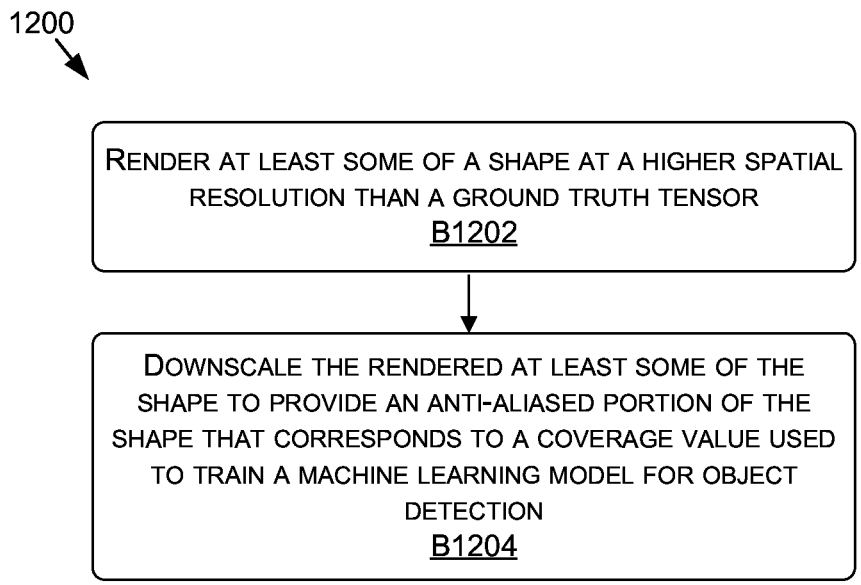
FIG. 12 is a flow diagram of a method for determining soft coverages values for training an object detector, in accordance with some embodiments of the present disclosure.

Now referring to FIG. 12, FIG. 12 is a flow diagram showing a method 1200 for determining soft coverages values for training an object detector, in accordance with some embodiments of the present disclosure.

The method 1200, at block B1202, includes rendering at least some of a shape at a higher spatial resolution that a ground truth tensor. For example, the coverage value determiner 404 may render the shape 504 in the image data 522 at a higher spatial resolution than is used to represent the spatial elements in ground truth data.

The method 1200, at block B1204, includes downscaling the rendered at least some of the shape to provide an anti-aliased portion of the shape that that corresponds to a coverage value used to train a machine learning model for object detection. For example, the coverage value determiner 404 may downsample the shape 504 in the image data 522 to a lower spatial resolution in the image data 524, such as a resolution used to represent the spatial elements in the ground truth data. The coverage value determiner 404 may determine one or more coverage values for the spatial elements from the downsampled shape.

Figure 13:
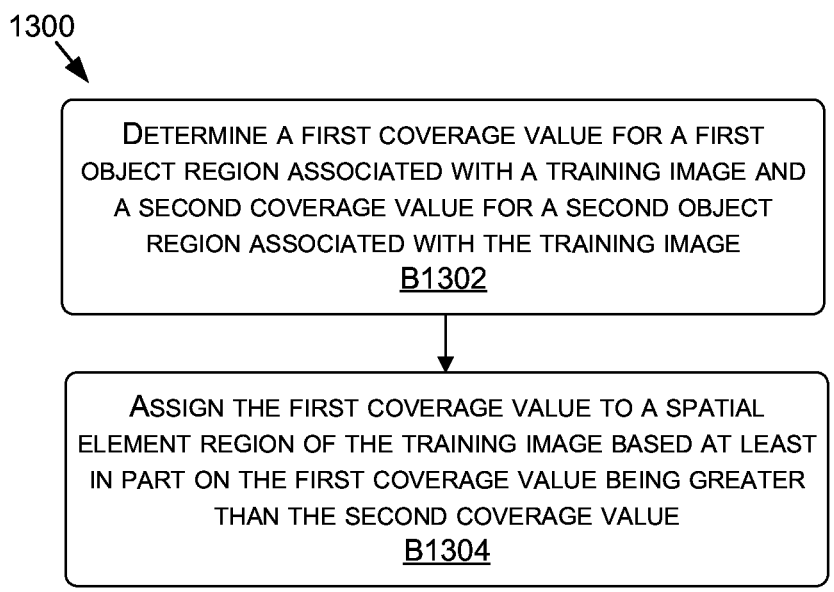
FIG. 13 is a flow diagram of a method for determining a coverages value used for training an object detector, in accordance with some embodiments of the present disclosure.

Now referring to FIG. 13, FIG. 13 is a flow diagram showing a method 1300 for determining a coverages value used for training an object detector, in accordance with some embodiments of the present disclosure.

The method 1300, at block B1302, includes determining a first coverage value for a first object region associated with a training image and a second coverage value for a second object region associated with the training image. For example, the coverage value determiner 404 may determine a coverage value 620 of FIG. 6 and a coverage value 622 of FIG. 6.

The method 1300, at block B1302, includes assigning the first coverage value to a spatial element region of the training image based at least in part on the first coverage value being greater than the second coverage value. For example, the active object selector 406 may select an object corresponding to the coverage value 620 as an active object based at least in part on the coverage value 620 being greater than the coverage value 622. The coverage value determiner 404 may assign the coverage value 620 to the spatial element region based at least in part on the coverage value 620 corresponding to the active object.

Example Operating Environment

The object detection system 100 and/or the object detection training system 400 may be implemented in an example operating environment 1400 of FIG. 14, in accordance with some embodiments of the present disclosure.

Among other components not illustrated, the operating environment 1400 includes a client device(s) 1420, a network(s) 1440, a server device(s) 1460, a sensor(s) 1480, and a data store(s) 1450. It should be understood that operating environment 1400 shown in FIG. 14 is an example of one suitable operating environment. Each of the components shown in FIG. 14 may be implemented via any type of computing device, such as one or more of computing device 1600 described in connection with FIG. 16, for example. These components may communicate with each other via the network 1440, which may be wired, wireless, or both. The network 1440 may include multiple networks, or a network of networks, but is shown in simple form so as not to obscure aspects of the present disclosure. By way of example, the network 1440 may include one or more wide area networks (WANs), one or more local area networks (LANs), one or more public networks such as the Internet, and/or one or more private networks. Where the network 1440 includes a wireless telecommunications network, components such as a base station, a communications tower, or even access points (as well as other components) may provide wireless connectivity. In any example, at least one network 1440 may correspond to the network(s) 1590 of FIG. 15D, described further below.

It should be understood that any number of the client devices 1420, the server devices 1460, the sensors 1480, and the data stores 1450 may be employed within the operating environment 1400 within the scope of the present disclosure. Each may be configured as a single device or multiple devices cooperating in a distributed environment.

Figure 15B:
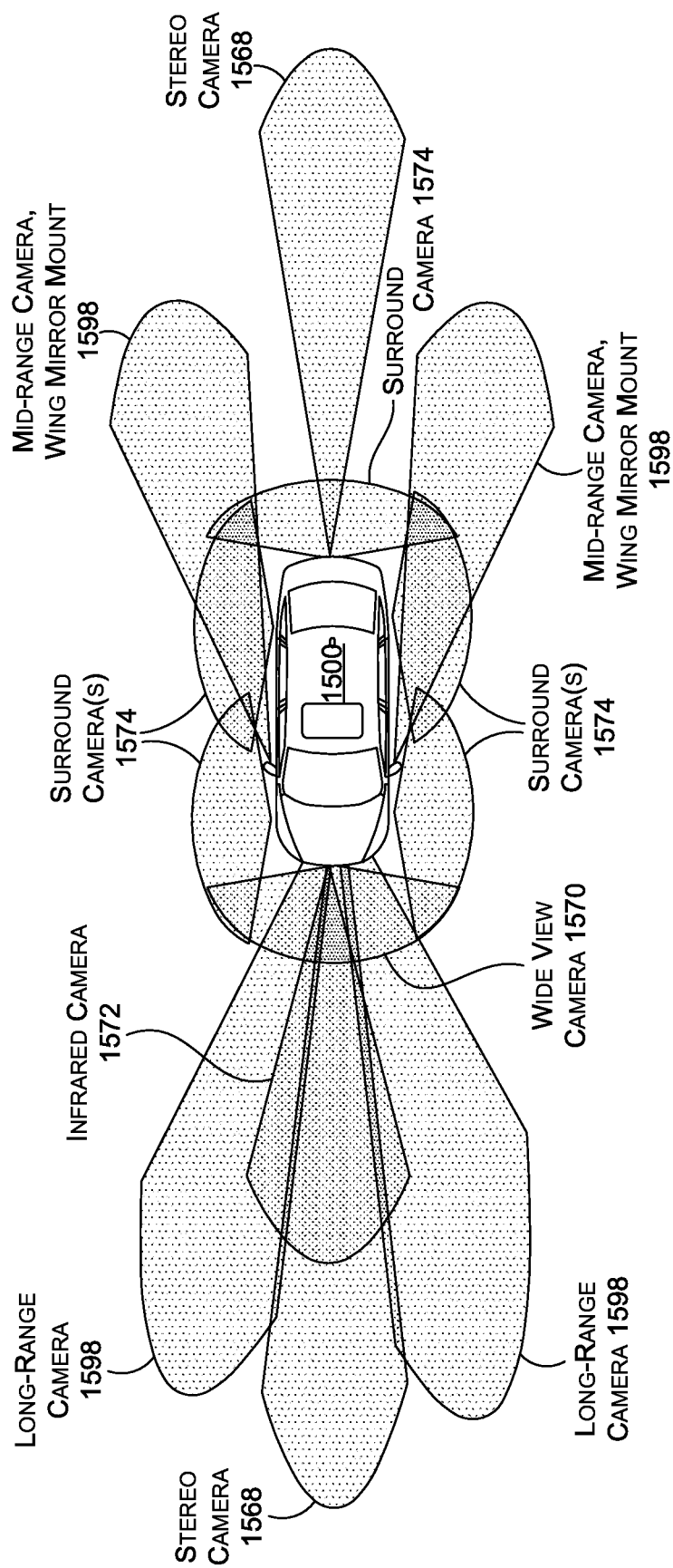
FIG. 15B is an example of camera locations and fields of view for the example autonomous vehicle of FIG. 15A, in accordance with some embodiments of the present disclosure.
Figure 15C:
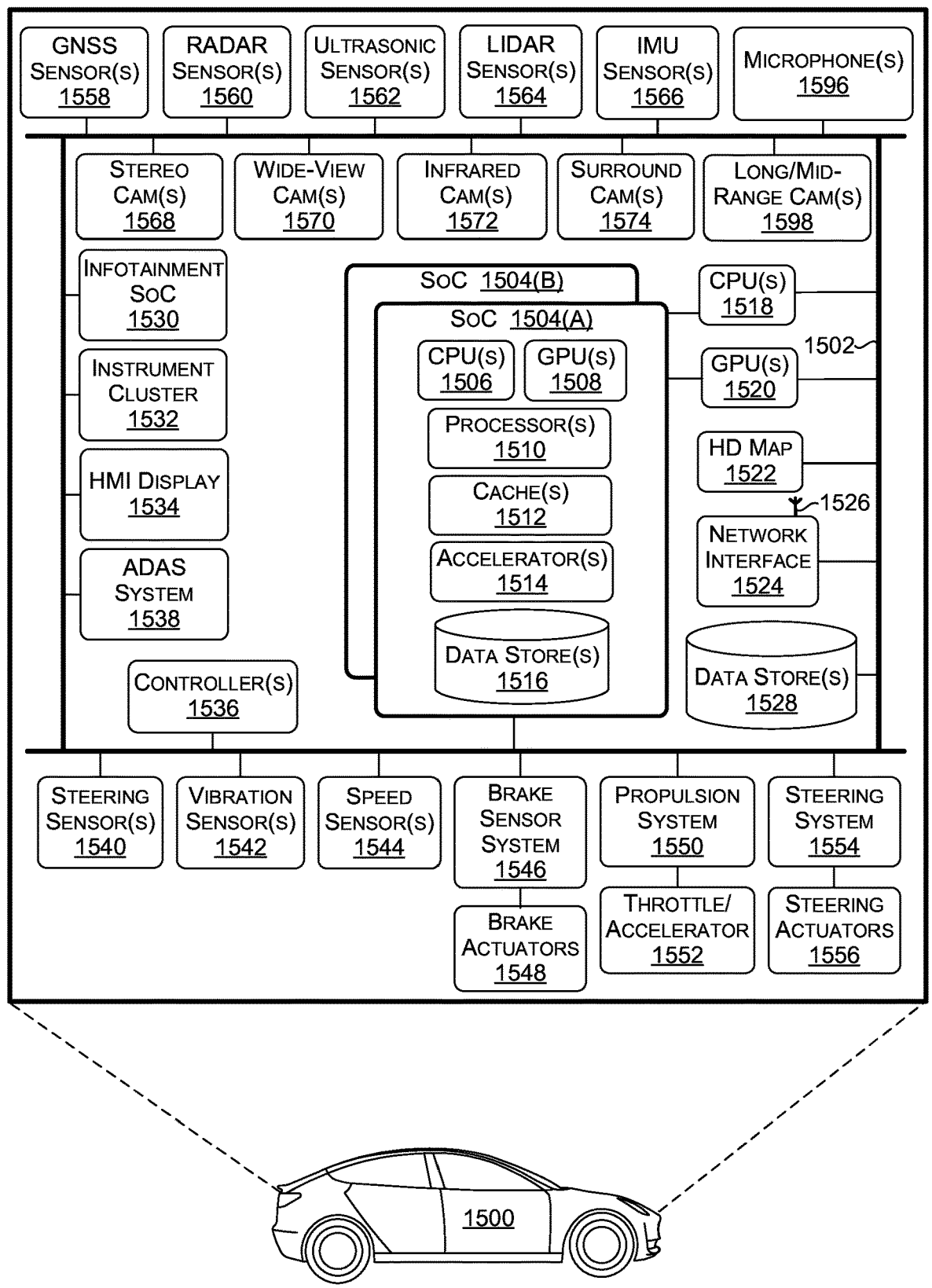
FIG. 15C is a block diagram of an example system architecture for the example autonomous vehicle of FIG. 15A, in accordance with some embodiments of the present disclosure.
Figure 15D:
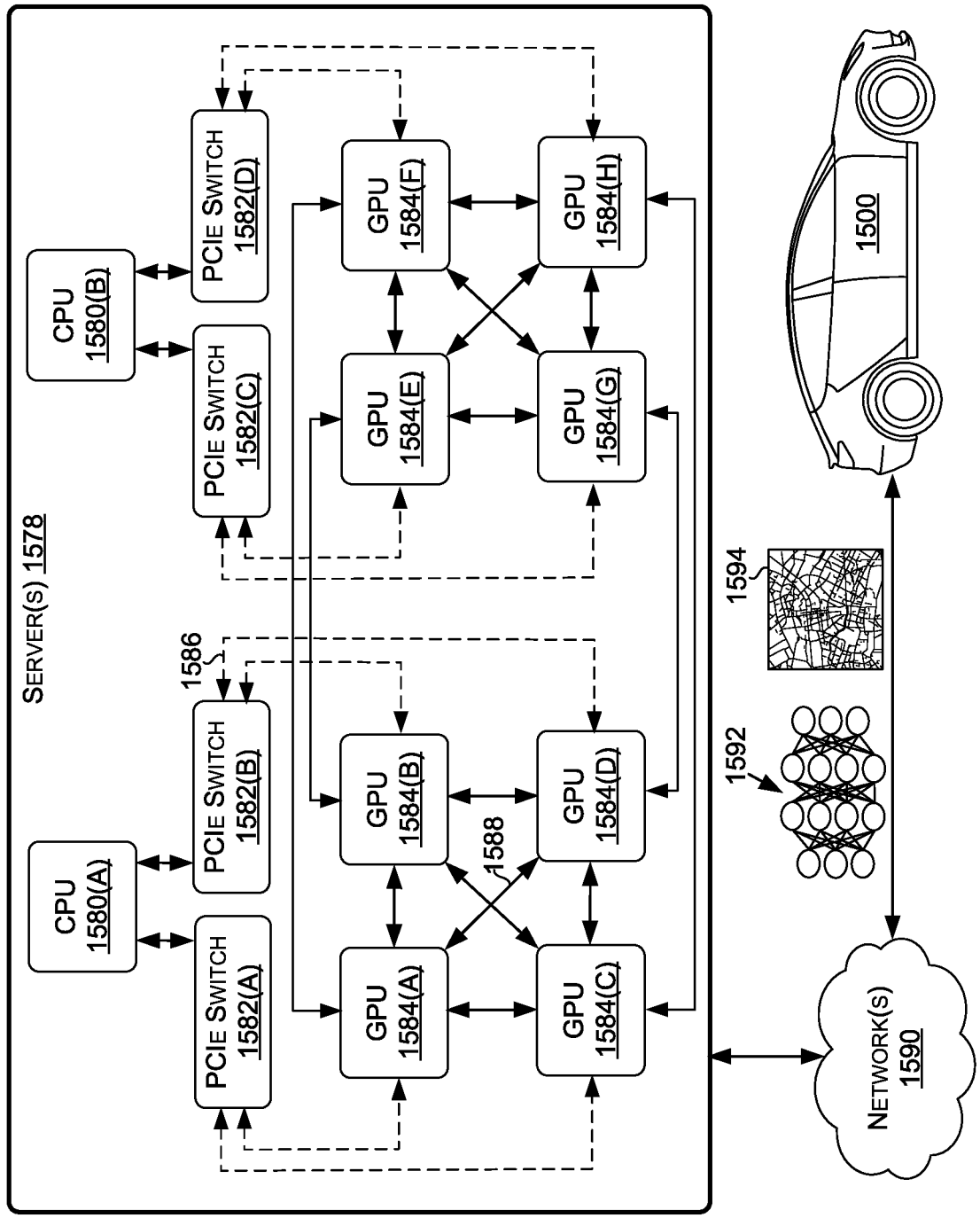
FIG. 15D is a system diagram for communication between cloud-based server(s) and the example autonomous vehicle of FIG. 15A, in accordance with some embodiments of the present disclosure.
Figure 16:
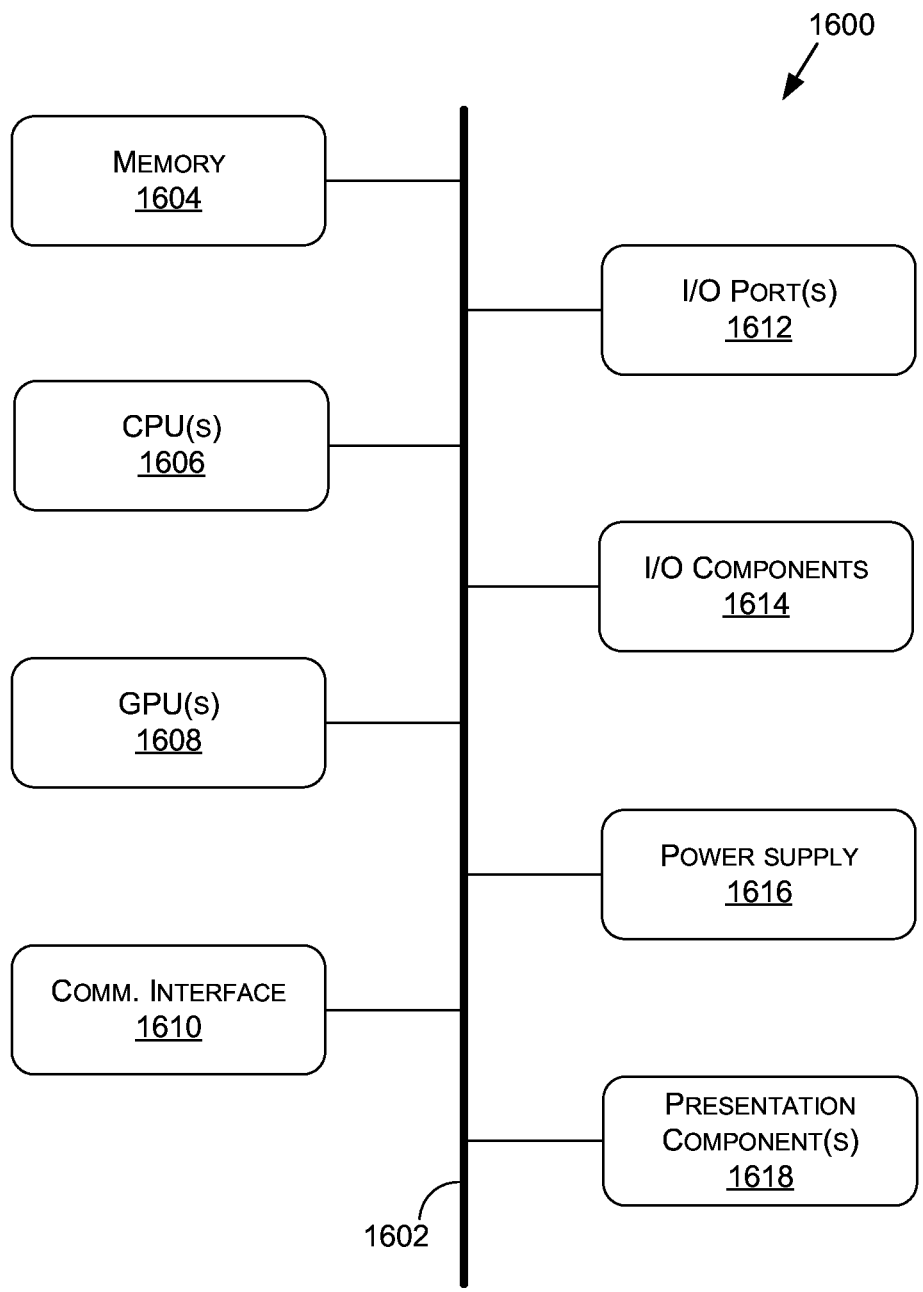
FIG. 16 is a block diagram of an example computing device suitable for use in implementing some embodiments of the present disclosure.

The client device(s) 1420 may include at least some of the components, features, and functionality of the example computing device 1600 described herein with respect to FIG. 16. By way of example and not limitation, a client device 1420 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. In any example, at least one client device 1420 may be part of a vehicle, such as the vehicle 1500 of FIGS. 15A-15D, described in further detail herein.

The client device(s) 1420 may include one or more processors, and one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the object detection system 100 of FIG. 1A.

The server device(s) 1460 may also include one or more processors, and one or more computer-readable media. The computer-readable media includes computer-readable instructions executable by the one or more processors. The instructions may, when executed by the one or more processors, cause the one or more processors to perform any combination and/or portion of the methods described herein and/or implement any portion of the functionality of the object detection system 100 of FIG. 1A. In any example, at least one server device 1460 may correspond to the server(s) 1578 of FIG. 15D, described in further detail herein.

The data store(s) 1450 may comprise one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the object detection system 100 of FIG. 1A. The data store(s) 1450 (or computer data storage) is depicted as a single component, but may be embodied as one or more data stores (e.g., databases) and may be at least partially in the cloud. One or more of the data store(s) 1450 may correspond to one or more of the data stores of FIG. 15C.

Although depicted external to the server device(s) 1460 and the client device(s) 1420, the data store(s) 1450 may be at least partially embodied on any combination of the server device(s) 1460 and/or the client device(s) 1420 (e.g., as memory 1604 (FIG. 16)). For example, some information may be stored on a client device(s) 1420, and other and/or duplicate information may be stored externally (e.g., on a server device(s) 1460). Thus, it should be appreciated that information in the data store(s) 1450 may be distributed in any suitable manner across one or more data stores for storage (which may be hosted externally). For example, the data store(s) 1450 may comprise at least some of the one or more computer-readable media of the server device(s) 1460 and/or at least some of the one or more computer-readable media of the client device(s) 1420.

The sensor(s) 1480 comprise at least one sensor capable of generating sensor data representative of at least some aspect of an environment. For example, the sensor(s) 1480 may generate the sensor data 102 of FIG. 1A. The sensor(s) 1480 may comprise any combination of a global navigation satellite systems (GNSS) sensor(s) (e.g., Global Positioning System (GPS) sensor(s)), RADAR sensor(s), ultrasonic sensor(s), LIDAR sensor(s), inertial measurement unit (IMU) sensor(s) (e.g., accelerometer(s), gyroscope(s), magnetic compass(es), magnetometer(s), etc.), microphone(s), stereo camera(s), wide-view camera(s) (e.g., fisheye cameras), infrared camera(s), surround camera(s) (e.g., 360 degree cameras), long-range and/or mid-range camera(s), speed sensor(s) (e.g., for measuring the speed of the vehicle 1500), vibration sensor(s), steering sensor(s), brake sensor(s) (e.g., as part of the brake sensor system), and/or other sensor types.

With reference to FIGS. 15A-15C, the sensor data 102 may be generated by, for example and without limitation, global navigation satellite systems (GNSS) sensor(s) 1568 (e.g., Global Positioning System sensor(s)), RADAR sensor(s) 1560, ultrasonic sensor(s) 1562, LIDAR sensor(s) 1564, inertial measurement unit (IMU) sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1598, speed sensor(s) 1544 (e.g., for measuring the speed of the vehicle 1500), vibration sensor(s) 1542, steering sensor(s) 1540, brake sensor(s) (e.g., as part of the brake sensor system 1546), and/or other sensor types.

In some examples, the sensor data 102 may be generated by forward-facing and/or side-facing cameras, such as a wide-view camera(s) 1570, a surround camera(s) 1574, a stereo camera(s) 1568, and/or a long-range or mid-range camera(s) 1598. In some examples, more than one camera or other sensor may be used to incorporate multiple fields of view (e.g., the field of view of the long-range cameras 1598, the forward-facing stereo camera 1568, and/or the forward facing wide-view camera 1570 of FIG. 15B).

Example Autonomous Vehicle

FIG. 15A is an illustration of an example autonomous vehicle 1500, in accordance with some embodiments of the present disclosure. The autonomous vehicle 1500 (alternatively referred to herein as the "vehicle 1500") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1500 may be capable of functionality in accordance with one or more of Level 3-Level 5 of the autonomous driving levels. For example, the vehicle 1500 may be capable of conditional automation (Level 3), high automation (Level 4), and/or full automation (Level 5), depending on the embodiment.

The vehicle 1500 may include components such as a chassis, a vehicle body, wheels (e.g., 2, 4, 6, 8, 18, etc.), tires, axles, and other components of a vehicle. The vehicle 1500 may include a propulsion system 1550, such as an internal combustion engine, hybrid electric power plant, an all-electric engine, and/or another propulsion system type. The propulsion system 1550 may be connected to a drive train of the vehicle 1500, which may include a transmission, to enable the propulsion of the vehicle 1500. The propulsion system 1550 may be controlled in response to receiving signals from the throttle/accelerator 1552.

A steering system 1554, which may include a steering wheel, may be used to steer the vehicle 1500 (e.g., along a desired path or route) when the propulsion system 1550 is operating (e.g., when the vehicle is in motion). The steering system 1554 may receive signals from a steering actuator 1556. The steering wheel may be optional for full automation (Level 5) functionality.

The brake sensor system 1546 may be used to operate the vehicle brakes in response to receiving signals from the brake actuators 1548 and/or brake sensors.

Controller(s) 1536, which may include one or more system on chips (SoCs) 1504 (FIG. 15C) and/or GPU(s), may provide signals (e.g., representative of commands) to one or more components and/or systems of the vehicle 1500. For example, the controller(s) may send signals to operate the vehicle brakes via one or more brake actuators 1548, to operate the steering system 1554 via one or more steering actuators 1556, to operate the propulsion system 1550 via one or more throttle/accelerators 1552. The controller(s) 1536 may include one or more onboard (e.g., integrated) computing devices (e.g., supercomputers) that process sensor signals, and output operation commands (e.g., signals representing commands) to enable autonomous driving and/or to assist a human driver in driving the vehicle 1500. The controller(s) 1536 may include a first controller 1536 for autonomous driving functions, a second controller 1536 for functional safety functions, a third controller 1536 for artificial intelligence functionality (e.g., computer vision), a fourth controller 1536 for infotainment functionality, a fifth controller 1536 for redundancy in emergency conditions, and/or other controllers. In some examples, a single controller 1536 may handle two or more of the above functionalities, two or more controllers 1536 may handle a single functionality, and/or any combination thereof.

The controller(s) 1536 may provide the signals for controlling one or more components and/or systems of the vehicle 1500 in response to sensor data received from one or more sensors (e.g., sensor inputs). The sensor data may be received from, for example and without limitation, global navigation satellite systems sensor(s) 1558 (e.g., Global Positioning System sensor(s)), RADAR sensor(s) 1560, ultrasonic sensor(s) 1562, LIDAR sensor(s) 1564, inertial measurement unit (IMU) sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1598, speed sensor(s) 1544 (e.g., for measuring the speed of the vehicle 1500), vibration sensor(s) 1542, steering sensor(s) 1540, brake sensor(s) (e.g., as part of the brake sensor system 1546), and/or other sensor types.

One or more of the controller(s) 1536 may receive inputs (e.g., represented by input data) from an instrument cluster 1532 of the vehicle 1500 and provide outputs (e.g., represented by output data, display data, etc.) via a human-machine interface (HMI) display 1534, an audible annunciator, a loudspeaker, and/or via other components of the vehicle 1500. The outputs may include information such as vehicle velocity, speed, time, map data (e.g., the HD map 1522 of FIG. 15C), location data (e.g., the vehicle's 1500 location, such as on a map), direction, location of other vehicles (e.g., an occupancy grid), information about objects and status of objects as perceived by the controller(s) 1536, etc. For example, the HMI display 1534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1500 further includes a network interface 1524 which may use one or more wireless antenna(s) 1526 and/or modem(s) to communicate over one or more networks. For example, the network interface 1524 may be capable of communication over LTE, WCDMA, UMTS, GSM, CDMA2000, etc. The wireless antenna(s) 1526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 15B is an example of camera locations and fields of view for the example autonomous vehicle 1500 of FIG. 15A, in accordance with some embodiments of the present disclosure. The cameras and respective fields of view are one example embodiment and are not intended to be limiting. For example, additional and/or alternative cameras may be included and/or the cameras may be located at different locations on the vehicle 1500.

The camera types for the cameras may include, but are not limited to, digital cameras that may be adapted for use with the components and/or systems of the vehicle 1500. The camera(s) may operate at automotive safety integrity level (ASIL) B and/or at another ASIL. The camera types may be capable of any image capture rate, such as 60 frames per second (fps), 1520 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1500 (e.g., front-facing cameras) may be used for surround view, to help identify forward facing paths and obstacles, as well aid in, with the help of one or more controllers 1536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1570 that may be used to perceive objects coming into view from the periphery (e.g., pedestrians, crossing traffic or bicycles). Although only one wide-view camera is illustrated in FIG. 15B, there may be any number of wide-view cameras 1570 on the vehicle 1500. In addition, long-range camera(s) 1598 (e.g., a long-view stereo camera pair) may be used for depth-based object detection, especially for objects for which a neural network has not yet been trained. The long-range camera(s) 1598 may also be used for object detection and classification, as well as basic object tracking.

One or more stereo cameras 1568 may also be included in a front-facing configuration. The stereo camera(s) 1568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1568 may be used in addition to, or alternatively from, those described herein.

Cameras with a field of view that include portions of the environment to the side of the vehicle 1500 (e.g., side-view cameras) may be used for surround view, providing information used to create and update the occupancy grid, as well as to generate side impact collision warnings. For example, surround camera(s) 1574 (e.g., four surround cameras 1574 as illustrated in FIG. 15B) may be positioned to on the vehicle 1500. The surround camera(s) 1574 may include wide-view camera(s) 1570, fisheye camera(s), 360 degree camera(s), and/or the like. Four example, four fisheye cameras may be positioned on the vehicle's front, rear, and sides. In an alternative arrangement, the vehicle may use three surround camera(s) 1574 (e.g., left, right, and rear), and may leverage one or more other camera(s) (e.g., a forward-facing camera) as a fourth surround view camera.

Cameras with a field of view that include portions of the environment to the rear of the vehicle 1500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1598, stereo camera(s) 1568), infrared camera(s) 1572, etc.), as described herein.

FIG. 15C is a block diagram of an example system architecture for the example autonomous vehicle 1500 of FIG. 15A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1500 in FIG. 15C are illustrated as being connected via bus 1502. The bus 1502 may include a Controller Area Network (CAN) data interface (alternatively referred to herein as a "CAN bus"). A CAN may be a network inside the vehicle 1500 used to aid in control of various features and functionality of the vehicle 1500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1502 is described herein as being a CAN bus, this is not intended to be limiting. For example, in addition to, or alternatively from, the CAN bus, FlexRay and/or Ethernet may be used. Additionally, although a single line is used to represent the bus 1502, this is not intended to be limiting. For example, there may be any number of busses 1502, which may include one or more CAN busses, one or more FlexRay busses, one or more Ethernet busses, and/or one or more other types of busses using a different protocol. In some examples, two or more busses 1502 may be used to perform different functions, and/or may be used for redundancy. For example, a first bus 1502 may be used for collision avoidance functionality and a second bus 1502 may be used for actuation control. In any example, each bus 1502 may communicate with any of the components of the vehicle 1500, and two or more busses 1502 may communicate with the same components. In some examples, each SoC 1504, each controller 1536, and/or each computer within the vehicle may have access to the same input data (e.g., inputs from sensors of the vehicle 1500), and may be connected to a common bus, such the CAN bus.

The vehicle 1500 may include one or more controller(s) 1536, such as those described herein with respect to FIG. 15A. The controller(s) 1536 may be used for a variety of functions. The controller(s) 1536 may be coupled to any of the various other components and systems of the vehicle 1500, and may be used for control of the vehicle 1500, artificial intelligence of the vehicle 1500, infotainment for the vehicle 1500, and/or the like.

The vehicle 1500 may include a system(s) on a chip (SoC) 1504. The SoC 1504 may include CPU(s) 1506, GPU(s) 1508, processor(s) 1510, cache(s) 1512, accelerator(s) 1514, data store(s) 1516, and/or other components and features not illustrated. The SoC(s) 1504 may be used to control the vehicle 1500 in a variety of platforms and systems. For example, the SoC(s) 1504 may be combined in a system (e.g., the system of the vehicle 1500) with an HD map 1522 which may obtain map refreshes and/or updates via a network interface 1524 from one or more servers (e.g., server(s) 1578 of FIG. 15D).

The CPU(s) 1506 may include a CPU cluster or CPU complex (alternatively referred to herein as a "CCPLEX"). The CPU(s) 1506 may include multiple cores and/or L2 caches. For example, in some embodiments, the CPU(s) 1506 may include eight cores in a coherent multi-processor configuration. In some embodiments, the CPU(s) 1506 may include four dual-core clusters where each cluster has a dedicated L2 cache (e.g., a 2 MB L2 cache). The CPU(s) 1506 (e.g., the CCPLEX) may be configured to support simultaneous cluster operation enabling any combination of the clusters of the CPU(s) 1506 to be active at any given time.

The CPU(s) 1506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster can be independently power-gated when all cores are power-gated. The CPU(s) 1506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1508 may include an integrated GPU (alternatively referred to herein as an "iGPU"). The GPU(s) 1508 may be programmable and may be efficient for parallel workloads. The GPU(s) 1508, in some examples, may use an enhanced tensor instruction set. The GPU(s) 1508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1508 may include at least eight streaming microprocessors. The GPU(s) 1508 may use compute application programming interface(s) (API(s)). In addition, the GPU(s) 1508 may use one or more parallel computing platforms and/or programming models (e.g., NVIDIA's CUDA).

The GPU(s) 1508 may be power-optimized for best performance in automotive and embedded use cases. For example, the GPU(s) 1508 may be fabricated on a Fin field-effect transistor (FinFET). However, this is not intended to be limiting and the GPU(s) 1508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1508 to access the CPU(s) 1506 page tables directly. In such examples, when the GPU(s) 1508 memory management unit (MMU) experiences a miss, an address translation request may be transmitted to the CPU(s) 1506. In response, the CPU(s) 1506 may look in its page tables for the virtual-to-physical mapping for the address and transmits the translation back to the GPU(s) 1508. As such, unified memory technology may allow a single unified virtual address space for memory of both the CPU(s) 1506 and the GPU(s) 1508, thereby simplifying the GPU(s) 1508 programming and porting of applications to the GPU(s) 1508.

In addition, the GPU(s) 1508 may include an access counter that may keep track of the frequency of access of the GPU(s) 1508 to memory of other processors. The access counter may help ensure that memory pages are moved to the physical memory of the processor that is accessing the pages most frequently.

The SoC(s) 1504 may include any number of cache(s) 1512, including those described herein. For example, the cache(s) 1512 may include an L3 cache that is available to both the CPU(s) 1506 and the GPU(s) 1508 (e.g., that is connected both the CPU(s) 1506 and the GPU(s) 1508). The cache(s) 1512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1504 may include one or more accelerators 1514 (e.g., hardware accelerators, software accelerators, or a combination thereof). For example, the SoC(s) 1504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1508 and to off-load some of the tasks of the GPU(s) 1508 (e.g., to free up more cycles of the GPU(s) 1508 for performing other tasks). As an example, the accelerator(s) 1514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1508, and by using an inference accelerator, for example, a designer may target either the DLA(s) or the GPU(s) 1508 for any function. For example, the designer may focus processing of CNNs and floating point operations on the DLA(s) and leave other functions to the GPU(s) 1508 and/or other accelerator(s) 1514.

The accelerator(s) 1514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1514 (e.g., the hardware acceleration cluster) may include a computer vision network on-chip and SRAM, for providing a high-bandwidth, low latency SRAM for the accelerator(s) 1514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 612508 standards, although other standards and protocols may be used.

In some examples, the SoC(s) 1504 may include a real-time ray-tracing hardware accelerator, such as described in U.S. patent application Ser. No. 16/101,1232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1566 output that correlates with the vehicle 1500 orientation, distance, 3D location estimates of the object obtained from the neural network and/or other sensors (e.g., LIDAR sensor(s) 1564 or RADAR sensor(s) 1560), among others.

The SoC(s) 1504 may include data store(s) 1516 (e.g., memory). The data store(s) 1516 may be on-chip memory of the SoC(s) 1504, which may store neural networks to be executed on the GPU and/or the DLA. In some examples, the data store(s) 1516 may be large enough in capacity to store multiple instances of neural networks for redundancy and safety. The data store(s) 1512 may comprise L2 or L3 cache(s) 1512. Reference to the data store(s) 1516 may include reference to the memory associated with the PVA, DLA, and/or other accelerator(s) 1514, as described herein.

The SoC(s) 1504 may include one or more processor(s) 1510 (e.g., embedded processors). The processor(s) 1510 may include a boot and power management processor that may be a dedicated processor and subsystem to handle boot power and management functions and related security enforcement. The boot and power management processor may be a part of the SoC(s) 1504 boot sequence and may provide runtime power management services. The boot power and management processor may provide clock and voltage programming, assistance in system low power state transitions, management of SoC(s) 1504 thermals and temperature sensors, and/or management of the SoC(s) 1504 power states. Each temperature sensor may be implemented as a ring-oscillator whose output frequency is proportional to temperature, and the SoC(s) 1504 may use the ring-oscillators to detect temperatures of the CPU(s) 1506, GPU(s) 1508, and/or accelerator(s) 1514. If temperatures are determined to exceed a threshold, the boot and power management processor may enter a temperature fault routine and put the SoC(s) 1504 into a lower power state and/or put the vehicle 1500 into a chauffeur to safe stop mode (e.g., bring the vehicle 1500 to a safe stop).

The processor(s) 1510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1510 may further include a real-time camera engine that may include a dedicated processor subsystem for handling real-time camera management.

The processor(s) 1510 may further include a high-dynamic range signal processor that may include an image signal processor that is a hardware engine that is part of the camera processing pipeline.

The processor(s) 1510 may include a video image compositor that may be a processing block (e.g., implemented on a microprocessor) that implements video post-processing functions needed by a video playback application to produce the final image for the player window. The video image compositor may perform lens distortion correction on wide-view camera(s) 1570, surround camera(s) 1574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1508 is not required to continuously render new surfaces. Even when the GPU(s) 1508 is powered on and active doing 3D rendering, the video image compositor may be used to offload the GPU(s) 1508 to improve performance and responsiveness.

The SoC(s) 1504 may further include a mobile industry processor interface (MIPI) camera serial interface for receiving video and input from cameras, a high-speed interface, and/or a video input block that may be used for camera and related pixel input functions. The SoC(s) 1504 may further include an input/output controller(s) that may be controlled by software and may be used for receiving I/O signals that are uncommitted to a specific role.

The SoC(s) 1504 may further include a broad range of peripheral interfaces to enable communication with peripherals, audio codecs, power management, and/or other devices. The SoC(s) 1504 may be used to process data from cameras (e.g., connected over Gigabit Multimedia Serial Link and Ethernet), sensors (e.g., LIDAR sensor(s) 1564, RADAR sensor(s) 1560, etc. that may be connected over Ethernet), data from bus 1502 (e.g., speed of vehicle 1500, steering wheel position, etc.), data from GNSS sensor(s) 1558 (e.g., connected over Ethernet or CAN bus). The SoC(s) 1504 may further include dedicated high-performance mass storage controllers that may include their own DMA engines, and that may be used to free the CPU(s) 1506 from routine data management tasks.

The SoC(s) 1504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1504 may be faster, more reliable, and even more energy-efficient and space-efficient than conventional systems. For example, the accelerator(s) 1514, when combined with the CPU(s) 1506, the GPU(s) 1508, and the data store(s) 1516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1508.

In some examples, a CNN for facial recognition and vehicle owner identification may use data from camera sensors to identify the presence of an authorized driver and/or owner of the vehicle 1500. The always on sensor processing engine may be used to unlock the vehicle when the owner approaches the driver door and turn on the lights, and, in security mode, to disable the vehicle when the owner leaves the vehicle. In this way, the SoC(s) 1504 provide for security against theft and/or carjacking.

In another example, a CNN for emergency vehicle detection and identification may use data from microphones 1596 to detect and identify emergency vehicle sirens. In contrast to conventional systems, that use general classifiers to detect sirens and manually extract features, the SoC(s) 1504 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 1558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1562, until the emergency vehicle(s) passes.

The vehicle may include a CPU(s) 1518 (e.g., discrete CPU(s), or dCPU(s)), that may be coupled to the SoC(s) 1504 via a high-speed interconnect (e.g., PCIe). The CPU(s) 1518 may include an X86 processor, for example. The CPU(s) 1518 may be used to perform any of a variety of functions, including arbitrating potentially inconsistent results between ADAS sensors and the SoC(s) 1504, and/or monitoring the status and health of the controller(s) 1536 and/or infotainment SoC 1530, for example.

The vehicle 1500 may include a GPU(s) 1520 (e.g., discrete GPU(s), or dGPU(s)), that may be coupled to the SoC(s) 1504 via a high-speed interconnect (e.g., NVIDIA's NVLINK). The GPU(s) 1520 may provide additional artificial intelligence functionality, such as by executing redundant and/or different neural networks, and may be used to train and/or update neural networks based at least in part on input (e.g., sensor data) from sensors of the vehicle 1500.

The vehicle 1500 may further include the network interface 1524 which may include one or more wireless antennas 1526 (e.g., one or more wireless antennas for different communication protocols, such as a cellular antenna, a Bluetooth antenna, etc.). The network interface 1524 may be used to enable wireless connectivity over the Internet with the cloud (e.g., with the server(s) 1578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1500 information about vehicles in proximity to the vehicle 1500 (e.g., vehicles in front of, on the side of, and/or behind the vehicle 1500). This functionality may be part of a cooperative adaptive cruise control functionality of the vehicle 1500.

The network interface 1524 may include a SoC that provides modulation and demodulation functionality and enables the controller(s) 1536 to communicate over wireless networks. The network interface 1524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1500 may further include data store(s) 1528 which may include off-chip (e.g., off the SoC(s) 1504) storage. The data store(s) 1528 may include one or more storage elements including RAM, SRAM, DRAM, VRAM, Flash, hard disks, and/or other components and/or devices that may store at least one bit of data.

The vehicle 1500 may further include GNSS sensor(s) 1558. The GNSS sensor(s) 1558 (e.g., GPS and/or assisted GPS sensors), to assist in mapping, perception, occupancy grid generation, and/or path planning functions. Any number of GNSS sensor(s) 1558 may be used, including, for example and without limitation, a GPS using a USB connector with an Ethernet to Serial (RS-232) bridge.

The vehicle 1500 may further include RADAR sensor(s) 1560. The RADAR sensor(s) 1560 may be used by the vehicle 1500 for long-range vehicle detection, even in darkness and/or severe weather conditions. RADAR functional safety levels may be ASIL B. The RADAR sensor(s) 1560 may use the CAN and/or the bus 1502 (e.g., to transmit data generated by the RADAR sensor(s) 1560) for control and to access object tracking data, with access to Ethernet to access raw data in some examples. A wide variety of RADAR sensor types may be used. For example, and without limitation, the RADAR sensor(s) 1560 may be suitable for front, rear, and side RADAR use. In some example, Pulse Doppler RADAR sensor(s) are used.

The RADAR sensor(s) 1560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1500 surroundings at higher speeds with minimal interference from traffic in adjacent lanes. The other two antennae may expand the field of view, making it possible to quickly detect vehicles entering or leaving the vehicle's 1500 lane.

Mid-range RADAR systems may include, as an example, a range of up to 1460 m (front) or 80 m (rear), and a field of view of up to 42 degrees (front) or 1450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1500 may further include ultrasonic sensor(s) 1562. The ultrasonic sensor(s) 1562, which may be positioned at the front, back, and/or the sides of the vehicle 1500, may be used for park assist and/or to create and update an occupancy grid. A wide variety of ultrasonic sensor(s) 1562 may be used, and different ultrasonic sensor(s) 1562 may be used for different ranges of detection (e.g., 2.5 m, 4 m). The ultrasonic sensor(s) 1562 may operate at functional safety levels of ASIL B.

The vehicle 1500 may include LIDAR sensor(s) 1564. The LIDAR sensor(s) 1564 may be used for object and pedestrian detection, emergency braking, collision avoidance, and/or other functions. The LIDAR sensor(s) 1564 may be functional safety level ASIL B. In some examples, the vehicle 1500 may include multiple LIDAR sensors 1564 (e.g., two, four, six, etc.) that may use Ethernet (e.g., to provide data to a Gigabit Ethernet switch).

In some examples, the LIDAR sensor(s) 1564 may be capable of providing a list of objects and their distances for a 360-degree field of view. Commercially available LIDAR sensor(s) 1564 may have an advertised range of approximately 1400 m, with an accuracy of 2 cm-3 cm, and with support for a 1400 Mbps Ethernet connection, for example. In some examples, one or more non-protruding LIDAR sensors 1564 may be used. In such examples, the LIDAR sensor(s) 1564 may be implemented as a small device that may be embedded into the front, rear, sides, and/or corners of the vehicle 1500. The LIDAR sensor(s) 1564, in such examples, may provide up to a 1420-degree horizontal and 35-degree vertical field-of-view, with a 200 m range even for low-reflectivity objects. Front-mounted LIDAR sensor(s) 1564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1564 may be less susceptible to motion blur, vibration, and/or shock.

The vehicle may further include IMU sensor(s) 1566. The IMU sensor(s) 1566 may be located at a center of the rear axle of the vehicle 1500, in some examples. The IMU sensor(s) 1566 may include, for example and without limitation, an accelerometer(s), a magnetometer(s), a gyroscope(s), a magnetic compass(es), and/or other sensor types. In some examples, such as in six-axis applications, the IMU sensor(s) 1566 may include accelerometers and gyroscopes, while in nine-axis applications, the IMU sensor(s) 1566 may include accelerometers, gyroscopes, and magnetometers.

In some embodiments, the IMU sensor(s) 1566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1566 may enable the vehicle 1500 to estimate heading without requiring input from a magnetic sensor by directly observing and correlating the changes in velocity from GPS to the IMU sensor(s) 1566. In some examples, the IMU sensor(s) 1566 and the GNSS sensor(s) 1558 may be combined in a single integrated unit.

The vehicle may include microphone(s) 1596 placed in and/or around the vehicle 1500. The microphone(s) 1596 may be used for emergency vehicle detection and identification, among other things.

The vehicle may further include any number of camera types, including stereo camera(s) 1568, wide-view camera(s) 1570, infrared camera(s) 1572, surround camera(s) 1574, long-range and/or mid-range camera(s) 1598, and/or other camera types. The cameras may be used to capture image data around an entire periphery of the vehicle 1500. The types of cameras used depends on the embodiments and requirements for the vehicle 1500, and any combination of camera types may be used to provide the necessary coverage around the vehicle 1500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 15A and FIG. 15B.

The vehicle 1500 may further include vibration sensor(s) 1542. The vibration sensor(s) 1542 may measure vibrations of components of the vehicle, such as the axle(s). For example, changes in vibrations may indicate a change in road surfaces. In another example, when two or more vibration sensors 1542 are used, the differences between the vibrations may be used to determine friction or slippage of the road surface (e.g., when the difference in vibration is between a power-driven axle and a freely rotating axle).

The vehicle 1500 may include an ADAS system 1538. The ADAS system 1538 may include a SoC, in some examples. The ADAS system 1538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1560, LIDAR sensor(s) 1564, and/or a camera(s). The ACC systems may include longitudinal ACC and/or lateral ACC. Longitudinal ACC monitors and controls the distance to the vehicle immediately ahead of the vehicle 1500 and automatically adjust the vehicle speed to maintain a safe distance from vehicles ahead. Lateral ACC performs distance keeping, and advises the vehicle 1500 to change lanes when necessary. Lateral ACC is related to other ADAS applications such as LCA and CWS.

CACC uses information from other vehicles that may be received via the network interface 1524 and/or the wireless antenna(s) 1526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link In general, the V2V communication concept provides information about the immediately preceding vehicles (e.g., vehicles immediately ahead of and in the same lane as the vehicle 1500), while the I2V communication concept provides information about traffic further ahead. CACC systems may include either or both I2V and V2V information sources. Given the information of the vehicles ahead of the vehicle 1500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1500 crosses lane markings A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1500 if the vehicle 1500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1500 is backing up. Some RCTW systems include AEB to ensure that the vehicle brakes are applied to avoid a crash. RCTW systems may use one or more rear-facing RADAR sensor(s) 1560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1500, the vehicle 1500 itself must, in the case of conflicting results, decide whether to heed the result from a primary computer or a secondary computer (e.g., a first controller 1536 or a second controller 1536). For example, in some embodiments, the ADAS system 1538 may be a backup and/or secondary computer for providing perception information to a backup computer rationality module. The backup computer rationality monitor may run a redundant diverse software on hardware components to detect faults in perception and dynamic driving tasks. Outputs from the ADAS system 1538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based at least in part on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1504.

In other examples, ADAS system 1538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1538 may be fed into the primary computer's perception block and/or the primary computer's dynamic driving task block. For example, if the ADAS system 1538 indicates a forward crash warning due to an object immediately ahead, the perception block may use this information when identifying objects. In other examples, the secondary computer may have its own neural network which is trained and thus reduces the risk of false positives, as described herein.

The vehicle 1500 may further include the infotainment SoC 1530 (e.g., an in-vehicle infotainment system (IVI)). Although illustrated and described as a SoC, the infotainment system may not be a SoC, and may include two or more discrete components. The infotainment SoC 1530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 1500. For example, the infotainment SoC 1530 may radios, disk players, navigation systems, video players, USB and Bluetooth connectivity, carputers, in-car entertainment, WiFi, steering wheel audio controls, hands free voice control, a heads-up display (HUD), an HMI display 1534, a telematics device, a control panel (e.g., for controlling and/or interacting with various components, features, and/or systems), and/or other components. The infotainment SoC 1530 may further be used to provide information (e.g., visual and/or audible) to a user(s) of the vehicle, such as information from the ADAS system 1538, autonomous driving information such as planned vehicle maneuvers, trajectories, surrounding environment information (e.g., intersection information, vehicle information, road information, etc.), and/or other information.

The infotainment SoC 1530 may include GPU functionality. The infotainment SoC 1530 may communicate over the bus 1502 (e.g., CAN bus, Ethernet, etc.) with other devices, systems, and/or components of the vehicle 1500. In some examples, the infotainment SoC 1530 may be coupled to a supervisory MCU such that the GPU of the infotainment system may perform some self-driving functions in the event that the primary controller(s) 1536 (e.g., the primary and/or backup computers of the vehicle 1500) fail. In such an example, the infotainment SoC 1530 may put the vehicle 1500 into a chauffeur to safe stop mode, as described herein.

The vehicle 1500 may further include an instrument cluster 1532 (e.g., a digital dash, an electronic instrument cluster, a digital instrument panel, etc.). The instrument cluster 1532 may include a controller and/or supercomputer (e.g., a discrete controller or supercomputer). The instrument cluster 1532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1530 and the instrument cluster 1532. In other words, the instrument cluster 1532 may be included as part of the infotainment SoC 1530, or vice versa.

FIG. 15D is a system diagram for communication between cloud-based server(s) and the example autonomous vehicle 1500 of FIG. 15A, in accordance with some embodiments of the present disclosure. The system 1576 may include server(s) 1578, network(s) 1590, and vehicles, including the vehicle 1500. The server(s) 1578 may include a plurality of GPUs 1584(A)-1284(H) (collectively referred to herein as GPUs 1584), PCIe switches 1582(A)-1582(H) (collectively referred to herein as PCIe switches 1582), and/or CPUs 1580(A)-1580(B) (collectively referred to herein as CPUs 1580). The GPUs 1584, the CPUs 1580, and the PCIe switches may be interconnected with high-speed interconnects such as, for example and without limitation, NVLink interfaces 1588 developed by NVIDIA and/or PCIe connections 1586. In some examples, the GPUs 1584 are connected via NVLink and/or NVSwitch SoC and the GPUs 1584 and the PCIe switches 1582 are connected via PCIe interconnects. Although eight GPUs 1584, two CPUs 1580, and two PCIe switches are illustrated, this is not intended to be limiting. Depending on the embodiment, each of the server(s) 1578 may include any number of GPUs 1584, CPUs 1580, and/or PCIe switches. For example, the server(s) 1578 may each include eight, sixteen, thirty-two, and/or more GPUs 1584.

The server(s) 1578 may receive, over the network(s) 1590 and from the vehicles, image data representative of images showing unexpected or changed road conditions, such as recently commenced road-work. The server(s) 1578 may transmit, over the network(s) 1590 and to the vehicles, neural networks 1592, updated neural networks 1592, and/or map information 1594, including information regarding traffic and road conditions. The updates to the map information 1594 may include updates for the HD map 1522, such as information regarding construction sites, potholes, detours, flooding, and/or other obstructions. In some examples, the neural networks 1592, the updated neural networks 1592, and/or the map information 1594 may have resulted from new training and/or experiences represented in data received from any number of vehicles in the environment, and/or based at least in part on training performed at a datacenter (e.g., using the server(s) 1578 and/or other servers).

The server(s) 1578 may be used to train machine learning models (e.g., neural networks) based at least in part on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1590, and/or the machine learning models may be used by the server(s) 1578 to remotely monitor the vehicles.

In some examples, the server(s) 1578 may receive data from the vehicles and apply the data to up-to-date real-time neural networks for real-time intelligent inferencing. The server(s) 1578 may include deep-learning supercomputers and/or dedicated AI computers powered by GPU(s) 1584, such as a DGX and DGX Station machines developed by NVIDIA. However, in some examples, the server(s) 1578 may include deep learning infrastructure that use only CPU-powered datacenters.

The deep-learning infrastructure of the server(s) 1578 may be capable of fast, real-time inferencing, and may use that capability to evaluate and verify the health of the processors, software, and/or associated hardware in the vehicle 1500. For example, the deep-learning infrastructure may receive periodic updates from the vehicle 1500, such as a sequence of images and/or objects that the vehicle 1500 has located in that sequence of images (e.g., via computer vision and/or other machine learning object classification techniques). The deep-learning infrastructure may run its own neural network to identify the objects and compare them with the objects identified by the vehicle 1500 and, if the results do not match and the infrastructure concludes that the AI in the vehicle 1500 is malfunctioning, the server(s) 1578 may transmit a signal to the vehicle 1500 instructing a fail-safe computer of the vehicle 1500 to assume control, notify the passengers, and complete a safe parking maneuver.

For inferencing, the server(s) 1578 may include the GPU(s) 1584 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 16 is a block diagram of an example computing device 1600 suitable for use in implementing some embodiments of the present disclosure. Computing device 1600 may include a bus 1602 that directly or indirectly couples the following devices: memory 1604, one or more central processing units (CPUs) 1606, one or more graphics processing units (GPUs) 1608, a communication interface 1610, input/output (I/O) ports 1612, input/output components 1614, a power supply 1616, and one or more presentation components 1618 (e.g., display(s)).

Although the various blocks of FIG. 16 are shown as connected via the bus 1602 with lines, this is not intended to be limiting and is for clarity only. For example, in some embodiments, a presentation component 1618, such as a display device, may be considered an I/O component 1614 (e.g., if the display is a touch screen). As another example, the CPUs 1606 and/or GPUs 1608 may include memory (e.g., the memory 1604 may be representative of a storage device in addition to the memory of the GPUs 1608, the CPUs 1606, and/or other components). In other words, the computing device of FIG. 16 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 16.

The bus 1602 may represent one or more busses, such as an address bus, a data bus, a control bus, or a combination thereof. The bus 1602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1604 may include any of a variety of computer-readable media. The computer-readable media may be any available media that may be accessed by the computing device 1600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1600. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1606 may be configured to execute the computer-readable instructions to control one or more components of the computing device 1600 to perform one or more of the methods and/or processes described herein. The CPU(s) 1606 may each include one or more cores (e.g., one, two, four, eight, twenty-eight, seventy-two, etc.) that are capable of handling a multitude of software threads simultaneously. The CPU(s) 1606 may include any type of processor, and may include different types of processors depending on the type of computing device 1600 implemented (e.g., processors with fewer cores for mobile devices and processors with more cores for servers). For example, depending on the type of computing device 1600, the processor may be an ARM processor implemented using Reduced Instruction Set Computing (RISC) or an x86 processor implemented using Complex Instruction Set Computing (CISC). The computing device 1600 may include one or more CPUs 1606 in addition to one or more microprocessors or supplementary co-processors, such as math co-processors.

The GPUb(s) 1608 may be used by the computing device 1600 to render graphics (e.g., 3D graphics). The GPU(s) 1608 may include hundreds or thousands of cores that are capable of handling hundreds or thousands of software threads simultaneously. The GPU(s) 1608 may generate pixel data for output images in response to rendering commands (e.g., rendering commands from the CPU(s) 1606 received via a host interface). The GPU(s) 1608 may include graphics memory, such as display memory, for storing pixel data. The display memory may be included as part of the memory 1604. The GPU(s) 1608 may include two or more GPUs operating in parallel (e.g., via a link). When combined together, each GPU 1608 may generate pixel data for different portions of an output image or for different output images (e.g., a first GPU for a first image and a second GPU for a second image). Each GPU may include its own memory, or may share memory with other GPUs.

In examples where the computing device 1600 does not include the GPU(s) 1608, the CPU(s) 1606 may be used to render graphics.

The communication interface 1610 may include one or more receivers, transmitters, and/or transceivers that enable the computing device 1600 to communicate with other computing devices via an electronic communication network, included wired and/or wireless communications. The communication interface 1610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1612 may enable the computing device 1600 to be logically coupled to other devices including the I/O components 1614, the presentation component(s) 1618, and/or other components, some of which may be built in to (e.g., integrated in) the computing device 1600. Illustrative I/O components 1614 include a microphone, mouse, keyboard, joystick, game pad, game controller, satellite dish, scanner, printer, wireless device, etc. The I/O components 1614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1600. The computing device 1600 may be include depth cameras, such as stereoscopic camera systems, infrared camera systems, RGB camera systems, touchscreen technology, and combinations of these, for gesture detection and recognition. Additionally, the computing device 1600 may include accelerometers or gyroscopes (e.g., as part of an inertia measurement unit (IMU)) that enable detection of motion. In some examples, the output of the accelerometers or gyroscopes may be used by the computing device 1600 to render immersive augmented reality or virtual reality.

The power supply 1616 may include a hard-wired power supply, a battery power supply, or a combination thereof. The power supply 1616 may provide power to the computing device 1600 to enable the components of the computing device 1600 to operate.

The presentation component(s) 1618 may include a display (e.g., a monitor, a touch screen, a television screen, a heads-up-display (HUD), other display types, or a combination thereof), speakers, and/or other presentation components. The presentation component(s) 1618 may receive data from other components (e.g., the GPU(s) 1608, the CPU(s) 1606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    applying, to a first neural network, sensor data representative of a frame that depicts a field of view of at least one sensor of a vehicle in an environment;
    receiving, from the first neural network, detected object data representative of detections of an object and locations of the detections in the frame, the detections corresponding to an output class of the first neural network;
    clustering the detections into one or more clusters based at least in part on distances between the locations;

determining features of a cluster of the one or more clusters for use as inputs of a second neural network;

receiving output data representative of a confidence score computed by the second neural network based at least in part on the inputs, the confidence score representative of a probability that the cluster corresponds to the object in the frame and that the cluster represents a positive detection of the output class in the frame.

2. The method of claim 1, further comprising:
determining at least a first detection and a second detection are a same object depicted across sequential frames represented by the sensor data; and
computing at least one value of the object based at least in part on the first detection and the second detection, wherein at least one of the features corresponds to the at least one value based at least in part on the cluster being associated with the same object.

3. The method of claim 1, further comprising:
determining, from the cluster, a bounding shape of a region of the object in the frame from a plurality of the locations that correspond to a plurality of the detections in the cluster:
computing a statistic corresponding to at least the plurality of the locations and a quantity of at least the plurality of the detections, wherein at least a first of the features corresponds to the statistic, at least a second of the features corresponds to one or more dimensions of the bounding shape, and the confidence score is further representative of a probability the bounding shape and the region corresponds to the object in the frame.

4. The method of claim 1, wherein one or more of the features is based at least in part on vehicle state data representative of a state of the vehicle based at least in part on additional sensor data received from one or more of the at least one sensor or at least one alternative sensor.

5. The method of claim 1, wherein the detections of the cluster comprise a detected object region, and one or more of the features is based at least in part on computing a statistic of one or more of input pixels to the first neural network used to determine at least one of: the detected object data, or features of at least one layer of the first neural network.

6. The method of claim 1, wherein the clustering is based at least in part on coverage values of the detections, each coverage value indicating a likelihood a detection of the detections corresponds to the object depicted in the field of view, and the method further comprises computing a statistical value corresponding to an average of the coverage values, wherein the statistical value is included in the features of the cluster provided as the inputs to the second neural network.

7. A method comprising:
determining, based at least in part on sensor data representative of a frame that depicts a field of view of at least one sensor, detected object data representative of locations of detections of an object in the frame, the detections corresponding to an output class of one or more machine learning models;
generating a cluster of the detections based at least in part on di stances between the locations;
determining features of the cluster for use as inputs to a neural network; and
receiving output data representative of a confidence score computed by the neural network based at least in part on the inputs, the confidence score representative of a probability that the cluster corresponds to the object in the frame and that the cluster represents a positive detection of the output class in the frame.

8. The method of claim 7, wherein the neural network is a multi-layer perceptron neural network.

9. The method of claim 7, wherein the locations of the detections are represented by outputs of a convolutional neural network that determines the locations based at least in part on the sensor data.

10. The method of claim 7, wherein the at least one sensor is of a vehicle and one or more of the features is based at least in part on distance data representative of a distance of the vehicle from the object, the distance data based at least in part on additional sensor data received from one or more of the at least one sensor or at least one alternative sensor of the vehicle.

11. The method of claim 7, wherein at least one of the features is based at least in part on coverage values of the detections of the cluster, each coverage value indicating, for a detection of the detections, a likelihood the detection corresponds to an object depiction in the field of view.

12. The method of claim 7, wherein at least one of the features represents a height of a detected object region that corresponds to the detections of the cluster, a width of the detected object region, or a central location of the detected object region.

13. The method of claim 7, wherein one or more of the features is based at least in part one at least one estimated parameter of a ground plane in the field of view.

14. The method of claim 7, wherein the detections of the cluster are detected in a same frame representing the field of view.

15. The method of claim 7, wherein the generating the cluster of the detections comprises clustering the detections into a plurality of clusters using a clustering algorithm that is based at least on similarities between the locations and the cluster is of the plurality of clusters.

16. The method of claim 7, wherein the neural network is a second neural network and the detected object data is output from a first neural network that is trained to output multiple detections for a same object within a frame of input data.

17. A computer-implemented system comprising:
one or more processors; and
one or more memory devices that store instructions that, when executed by the one or more processors, cause the one or more processors to execute operations comprising:
grouping detections of an object in a field of view of at least one sensor into an aggregated detection of the object that corresponds to a plurality of the detections based at least on locations of the plurality of the detections, the detections corresponding to an output class of one or more machine learning models;
determining, from the locations of the plurality of the detections, a bounding shape of the aggregated detection;
determining a feature of the aggregated detection from the plurality of the detections for use as an input of a neural network; and
receiving output data representative of a confidence score computed by the neural network based at least in part on the input, the confidence score representative of a probability that the bounding shape corresponds to the object within the field of view and that the aggregated detection is a positive detection of the output class in the frame.

18. The system of claim 17, wherein each of the detections correspond to a same frame of the field of view and the probability is that the bounding shape corresponds to the object within the same frame of the field of view.

19. The system of claim 17, wherein the feature comprises one or more dimensions of the bounding shape and the one or more dimensions are computed from dimensions of bounding shapes of the plurality of the detections.

20. The system of claim 17, wherein the neural network is trained to minimize the probability when the aggregated detection is a false positive detection and maximize the probability when the aggregated detection is a true positive detection.

21. The system of claim 17, wherein the feature comprises a count of the plurality of the detections that correspond to the aggregated detection.

* * * * *